US007690998B2

(12) United States Patent
Okada

(10) Patent No.: US 7,690,998 B2
(45) Date of Patent: Apr. 6, 2010

(54) GAMING MACHINE

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 1170 days.

(21) Appl. No.: 11/284,085

(22) Filed: Nov. 22, 2005

(65) Prior Publication Data

US 2006/0116192 A1 Jun. 1, 2006

(30) Foreign Application Priority Data

Nov. 26, 2004 (JP) ........................... P2004-342396
Nov. 26, 2004 (JP) ........................... P2004-342397
Nov. 26, 2004 (JP) ........................... P2004-342398
Nov. 26, 2004 (JP) ........................... P2004-342399

(51) Int. Cl.
*A63F 13/00* (2006.01)

(52) U.S. Cl. .............................. 463/43; 463/20; 463/44

(58) Field of Classification Search .................. 463/20, 463/25, 26, 29, 31, 32, 43, 44
See application file for complete search history.

(56) References Cited

U.S. PATENT DOCUMENTS 6,526,158 B1 * 2/2003 Goldberg .................... 382/115
2002/0151366 A1 10/2002 Walker et al.
2003/0054878 A1 * 3/2003 Benoy et al. .................. 463/29
2003/0195031 A1 * 10/2003 O'Donovan et al. ........... 463/16
2004/0014518 A1 1/2004 Iwamoto
2004/0142742 A1 * 7/2004 Schneider et al. ............. 463/25
2005/0119052 A1 * 6/2005 Russell et al. ................. 463/42
2006/0019743 A1 * 1/2006 Roemer ....................... 463/26
2006/0019745 A1 * 1/2006 Benbrahim .................. 463/29

FOREIGN PATENT DOCUMENTS

EP 1 367 550 A2 12/2003
EP 1 367 551 A2 12/2003
EP 1 383 092 A2 1/2004
GB 2 334 4569 A 8/1999
JP 2003-275364 9/2003
JP 2003-340139 A 12/2003
JP 2004-49408 A 2/2004
JP 2004-195009 7/2004
JP 2004-202108 7/2004
RU 12035 U1 12/1999
WO 03-025828 A2 3/2003

* cited by examiner

*Primary Examiner*—James S. McClellan
(74) *Attorney, Agent, or Firm*—Arent Fox LLP

(57) ABSTRACT

A gaming machine includes: an information reading unit that reads object information from a reading object provided with a storage medium in which the object information is stored, the reading object being mountable on the gaming machine; a game processing unit that performs game processing to provide to a player a game in a plurality of game states including a base game state and a bonus game state in which a grater advantage is provided to the player than in the base game state; and a display unit that displays an effect related to the game, wherein the game processing unit controls a frequency of occurrence of the effect to be displayed on the display unit during the game based on the object information read from the reading object by the information reading unit.

18 Claims, 34 Drawing Sheets

*FIG. 5*

| RANDOM NUMBER VALUE | WINNING COMBINATION | AWARD |
|---|---|---|
| 0-9 | JOKER | BONUS GAME |
| 10-32 | 7-7-7 | 100 |
| 33-35 | 3BAR-3BAR-3BAR | 5 |
| 36-58 | 2BAR-2BAR-2BAR | 3 |
| 59-203 | BAR-BAR-BAR | 2 |
| 204-257 | CHERRY-CHERRY-CHERRY | 1 |
| 258-1270 | LOSS | 0 |

FIG. 9

| IC CHIP DATA | | CHARACTER DISPLAY | ENEMY CHARACTER DISPLAY | BACKGROUND DISPLAY |
|---|---|---|---|---|
| NO TOY FIGURE | - | NONE | NONE | NORMAL |
| | - | NONE | NONE | NORMAL |
| TOY FIGURE (WARRIOR) | FREQUENCY OF USAGE 0-100 | WARRIOR | ENEMY CHARACTER (A) | JUNGLE |
| | FREQUENCY OF USAGE 101- | WARRIOR | ENEMY CHARACTER (B) | LABYRINTH |
| TOY FIGURE (WIZARD) | FREQUENCY OF USAGE 0-100 | WIZARD | ENEMY CHARACTER (A) | JUNGLE |
| | FREQUENCY OF USAGE 101- | WIZARD | ENEMY CHARACTER (B) | LABYRINTH |
| TOY FIGURE (ARCHER) | FREQUENCY OF USAGE 0-100 | ARCHER | ENEMY CHARACTER (A) | JUNGLE |
| | FREQUENCY OF USAGE 101- | ARCHER | ENEMY CHARACTER (B) | LABYRINTH |

FIG. 15A

DURING BASE GAME

| IC CHIP DATA | | PREMIER EFFECT | NO EFFECT |
|---|---|---|---|
| NO TOY FIGURE | - | 0-6 | 7-127 |
| | - | 0-6 | 7-127 |
| TOY FIGURE (WARRIOR) | FREQUENCY OF USAGE 0-100 | 0-20 | 21-127 |
| | FREQUENCY OF USAGE 101- | 0-39 | 40-127 |
| TOY FIGURE (WIZARD) | FREQUENCY OF USAGE 0-100 | 0-6 | 7-127 |
| | FREQUENCY OF USAGE 101- | 0-20 | 21-127 |
| TOY FIGURE (ARCHER) | FREQUENCY OF USAGE 0-100 | 0-39 | 40-127 |
| | FREQUENCY OF USAGE 101- | 0-63 | 40-127 |

FIG. 15B

DURING BONUS GAME

| IC CHIP DATA | | PREMIER EFFECT | NO EFFECT |
|---|---|---|---|
| NO TOY FIGURE | - | 0-6 | 7-127 |
| | - | 0-6 | 7-127 |
| TOY FIGURE (WARRIOR) | FREQUENCY OF USAGE 0-100 | 0-39 | 40-127 |
| | FREQUENCY OF USAGE 101- | 0-39 | 40-127 |
| TOY FIGURE (WIZARD) | FREQUENCY OF USAGE 0-100 | 0-39 | 40-127 |
| | FREQUENCY OF USAGE 101- | 0-63 | 64-127 |
| TOY FIGURE (ARCHER) | FREQUENCY OF USAGE 0-100 | 0-20 | 21-127 |
| | FREQUENCY OF USAGE 101- | 0-39 | 40-127 |

*FIG. 20A*

IN THE CASE OF TOY FIGURE (WARRIOR)

| | SWORD | HELMET | SHIELD | RANDOM NUMBER VALUE |
|---|---|---|---|---|
| PATTERN (A) | 10 | 20 | 5 | 0-42 |
| PATTERN (B) | 5 | 10 | 20 | 43-85 |
| PATTERN (C) | 20 | 5 | 10 | 86-127 |

*FIG. 20B*

IN THE CASE OF TOY FIGURE (WIZARD)

| | STAFF | CRYSTAL BALL | BOOK | RANDOM NUMBER VALUE |
|---|---|---|---|---|
| PATTERN (A) | 10 | 20 | 5 | 0-42 |
| PATTERN (B) | 5 | 10 | 20 | 43-85 |
| PATTERN (C) | 20 | 5 | 10 | 86-127 |

*FIG. 21A* 1-100 ROUNDS OF BASE GAME AFTER BONUS GAME ENDS

| IC CHIP DATA | | PREMIER EFFECT | NO EFFECT |
|---|---|---|---|
| NO TOY FIGURE | - | 0-6 | 7-127 |
| | - | 0-6 | 7-127 |
| TOY FIGURE (WARRIOR) | FREQUENCY OF USAGE 0-100 | 0-6 | 7-127 |
| | FREQUENCY OF USAGE 101- | 0-20 | 21-127 |
| TOY FIGURE (WIZARD) | FREQUENCY OF USAGE 0-100 | 0-20 | 21-127 |
| | FREQUENCY OF USAGE 101- | 0-39 | 40-127 |
| TOY FIGURE (ARCHER) | FREQUENCY OF USAGE 0-100 | 0-39 | 40-127 |
| | FREQUENCY OF USAGE 101- | 0-63 | 64-127 |

*FIG. 21B* 101-200 ROUNDS OF BASE GAME AFTER BONUS GAME ENDS

| IC CHIP DATA | | PREMIER EFFECT | NO EFFECT |
|---|---|---|---|
| NO TOY FIGURE | - | 0-6 | 7-127 |
| | - | 0-6 | 7-127 |
| TOY FIGURE (WARRIOR) | FREQUENCY OF USAGE 0-100 | 0-39 | 40-127 |
| | FREQUENCY OF USAGE 101- | 0-63 | 64-127 |
| TOY FIGURE (WIZARD) | FREQUENCY OF USAGE 0-100 | 0-6 | 7-127 |
| | FREQUENCY OF USAGE 101- | 0-20 | 21-127 |
| TOY FIGURE (ARCHER) | FREQUENCY OF USAGE 0-100 | 0-20 | 21-127 |
| | FREQUENCY OF USAGE 101- | 0-63 | 40-127 |

*FIG. 21C* 201-300 ROUNDS OF BASE GAME AFTER BONUS GAME ENDS

| IC CHIP DATA | | PREMIER EFFECT | NO EFFECT |
|---|---|---|---|
| NO TOY FIGURE | - | 0-6 | 7-127 |
| | - | 0-6 | 7-127 |
| TOY FIGURE (WARRIOR) | FREQUENCY OF USAGE 0-100 | 0-20 | 21-127 |
| | FREQUENCY OF USAGE 101- | 0-39 | 40-127 |
| TOY FIGURE (WIZARD) | FREQUENCY OF USAGE 0-100 | 0-39 | 40-127 |
| | FREQUENCY OF USAGE 101- | 0-63 | 64-127 |
| TOY FIGURE (ARCHER) | FREQUENCY OF USAGE 0-100 | 0-6 | 7-127 |
| | FREQUENCY OF USAGE 101- | 0-20 | 21-127 |

FIG. 32

| | | NO ACCESSORY | ACCESSORY (SWORD) |
|---|---|---|---|
| NO TOY FIGURE | | LOTTERY TABLE (a) | LOTTERY TABLE (a) |
| TOY FIGURE (WARRIOR) | FREQUENCY OF USAGE 0-100 | LOTTERY TABLE (b) | LOTTERY TABLE (e) |
| | FREQUENCY OF USAGE 101- | LOTTERY TABLE (B) | LOTTERY TABLE (E) |
| TOY FIGURE (WIZARD) | FREQUENCY OF USAGE 0-100 | LOTTERY TABLE (c) | LOTTERY TABLE (h) |
| | FREQUENCY OF USAGE 101- | LOTTERY TABLE (C) | LOTTERY TABLE (H) |
| TOY FIGURE (ARCHER) | FREQUENCY OF USAGE 0-100 | LOTTERY TABLE (d) | LOTTERY TABLE (k) |
| | FREQUENCY OF USAGE 101- | LOTTERY TABLE (D) | LOTTERY TABLE (K) |

| | | ACCESSORY (STAFF) | ACCESSORY (BOW) | ACCESSORY (EVIL SWORD) |
|---|---|---|---|---|
| NO TOY FIGURE | | LOTTERY TABLE (a) | LOTTERY TABLE (a) | LOTTERY TABLE (a) |
| TOY FIGURE (WARRIOR) | FREQUENCY OF USAGE 0-100 | LOTTERY TABLE (f) | LOTTERY TABLE (f) | LOTTERY TABLE (g) |
| | FREQUENCY OF USAGE 101- | LOTTERY TABLE (F) | LOTTERY TABLE (F) | LOTTERY TABLE (G) |
| TOY FIGURE (WIZARD) | FREQUENCY OF USAGE 0-100 | LOTTERY TABLE (i) | LOTTERY TABLE (h) | LOTTERY TABLE (j) |
| | FREQUENCY OF USAGE 101- | LOTTERY TABLE (I) | LOTTERY TABLE (H) | LOTTERY TABLE (J) |
| TOY FIGURE (ARCHER) | FREQUENCY OF USAGE 0-100 | LOTTERY TABLE (k) | LOTTERY TABLE (l) | LOTTERY TABLE (m) |
| | FREQUENCY OF USAGE 101- | LOTTERY TABLE (K) | LOTTERY TABLE (L) | LOTTERY TABLE (M) |

FIG. 33

LOTTARY TABLE (b)

| RANDOM NUMBER VALUE | WINNING COMBINATION | AWARD |
|---|---|---|
| 0-9 | JOKER | BUNUS GAME |
| 10-37 | 7-7-7 | 100 |
| 38-70 | 3BAR-3BAR-3BAR | 5 |
| 71-93 | 2BAR-2BAR-2BAR | 3 |
| 94-238 | BAR-BAR-BAR | 2 |
| 239-292 | CHERRY-CHERRY-CHERRY | 1 |
| 293-1270 | LOSS | 0 |

FIG. 34

LOTTARY TABLE (c)

| RANDOM NUMBER VALUE | WINNING COMBINATION | AWARD |
|---|---|---|
| 0-9 | JOKER | BUNUS GAME |
| 10-42 | 7-7-7 | 100 |
| 43-45 | 3BAR-3BAR-3BAR | 5 |
| 46-68 | 2BAR-2BAR-2BAR | 3 |
| 69-213 | BAR-BAR-BAR | 2 |
| 214-267 | CHERRY-CHERRY-CHERRY | 1 |
| 268-1270 | LOSS | 0 |

FIG. 35

LOTTARY TABLE (d)

| RANDOM NUMBER VALUE | WINNING COMBINATION | AWARD |
|---|---|---|
| 0-9 | JOKER | BUNUS GAME |
| 10-37 | 7-7-7 | 100 |
| 38-40 | 3BAR-3BAR-3BAR | 5 |
| 41-73 | 2BAR-2BAR-2BAR | 3 |
| 74-228 | BAR-BAR-BAR | 2 |
| 229-282 | CHERRY-CHERRY-CHERRY | 1 |
| 283-1270 | LOSS | 0 |

FIG. 36

LOTTARY TABLE (e)

| RANDOM NUMBER VALUE | WINNING COMBINATION | AWARD |
|---|---|---|
| 0-19 | JOKER | BUNUS GAME |
| 20-47 | 7-7-7 | 100 |
| 48-80 | 3BAR-3BAR-3BAR | 5 |
| 81-103 | 2BAR-2BAR-2BAR | 3 |
| 104-248 | BAR-BAR-BAR | 2 |
| 249-302 | CHERRY-CHERRY-CHERRY | 1 |
| 303-1270 | LOSS | 0 |

FIG. 37

LOTTARY TABLE (f)

| RANDOM NUMBER VALUE | WINNING COMBINATION | AWARD |
|---|---|---|
| 0-9 | JOKER | BUNUS GAME |
| 10-39 | 7-7-7 | 100 |
| 40-74 | 3BAR-3BAR-3BAR | 5 |
| 75-99 | 2BAR-2BAR-2BAR | 3 |
| 100-246 | BAR-BAR-BAR | 2 |
| 247-302 | CHERRY-CHERRY-CHERRY | 1 |
| 303-1270 | LOSS | 0 |

FIG. 38

LOTTARY TABLE (g)

| RANDOM NUMBER VALUE | WINNING COMBINATION | AWARD |
|---|---|---|
| 0-7 | JOKER | BUNUS GAME |
| 8-37 | 7-7-7 | 100 |
| 38-70 | 3BAR-3BAR-3BAR | 5 |
| 71-85 | 2BAR-2BAR-2BAR | 3 |
| 86-228 | BAR-BAR-BAR | 2 |
| 229-280 | CHERRY-CHERRY-CHERRY | 1 |
| 281-1270 | LOSS | 0 |

FIG. 39

LOTTARY TABLE (B)

| RANDOM NUMBER VALUE | WINNING COMBINATION | AWARD |
|---|---|---|
| 0-12 | JOKER | BUNUS GAME |
| 13-43 | 7-7-7 | 100 |
| 44-79 | 3BAR-3BAR-3BAR | 5 |
| 80-105 | 2BAR-2BAR-2BAR | 3 |
| 106-243 | BAR-BAR-BAR | 2 |
| 244-310 | CHERRY-CHERRY-CHERRY | 1 |
| 311-1270 | LOSS | 0 |

FIG. 40

LOTTARY TABLE (E)

| RANDOM NUMBER VALUE | WINNING COMBINATION | AWARD |
|---|---|---|
| 0-22 | JOKER | BUNUS GAME |
| 23-53 | 7-7-7 | 100 |
| 54-89 | 3BAR-3BAR-3BAR | 5 |
| 90-115 | 2BAR-2BAR-2BAR | 3 |
| 116-253 | BAR-BAR-BAR | 2 |
| 254-320 | CHERRY-CHERRY-CHERRY | 1 |
| 321-1270 | LOSS | 0 |

FIG. 41

LOTTARY TABLE (F)

| RANDOM NUMBER VALUE | WINNING COMBINATION | AWARD |
|---|---|---|
| 0-12 | JOKER | BUNUS GAME |
| 13-45 | 7-7-7 | 100 |
| 46-83 | 3BAR-3BAR-3BAR | 5 |
| 84-111 | 2BAR-2BAR-2BAR | 3 |
| 112-253 | BAR-BAR-BAR | 2 |
| 254-320 | CHERRY-CHERRY-CHERRY | 1 |
| 321-1270 | LOSS | 0 |

FIG. 42

LOTTARY TABLE (G)

| RANDOM NUMBER VALUE | WINNING COMBINATION | AWARD |
|---|---|---|
| 0-10 | JOKER | BUNUS GAME |
| 11-39 | 7-7-7 | 100 |
| 40-73 | 3BAR-3BAR-3BAR | 5 |
| 74-97 | 2BAR-2BAR-2BAR | 3 |
| 98-233 | BAR-BAR-BAR | 2 |
| 234-298 | CHERRY-CHERRY-CHERRY | 1 |
| 299-1270 | LOSS | 0 |

GAMING MACHINE

CROSS-REFERENCE TO THE RELATED APPLICATION(S)

The present application is based upon and claims a priority from four prior Japanese Patent Applications No. 2004-342396, No. 2004-342397, No. 2004-342398, and No. 2004-342399, all filed on Nov. 26, 2004, the entire contents of which are incorporated herein by reference.

BACKGROUND

1. Field of the Invention

The present invention relates to a gaming machine, and more particularly to a gaming machine having information reading unit for reading information stored in a reading object.

2. Description of the Related Art

A gaming machine (a so-called video game machine), which enables a game to proceed and performs a visual and audial effects (hereinafter simply recited as "effect") related to the game by using an image displayed on a display, has heretofore drawn a player's attention.

In addition, use of three-dimensional toy figures representing characters from a TV animated cartoon, a home video game, and the like has recently increased in popularity.

In view of such circumstances, a gaming machine has been developed on which a game is played using a card-like recording medium capable of recording information or a figure having a recording medium embedded therein, which attracts a player's attention.

As such a gaming machine, a gaming machine is described in JP-A-2003-340139. The gaming machine is configured as a so-called medal game machine, wherein a medal mounting platform is disposed. A medal with an IC chip formed together with a figure is mounted on the medal mounting platform, thereby performing a data read/write between data stored in the medal and the gaming machine.

The gaming machine operates when the medal embedded with the IC chip formed together with the figure is mounted on the mounting platform.

However, in the gaming machine described in JP-A-2003-340139, the medal embedded with IC chip is used to store parameter values of a character from the game and the interrupted situation of the game. Information stored in the IC chip embedded medal is used only for simply proceeding with the game, which therefore produces only a change such that the character from the game grows stronger even though the data is updated. There is therefore the problem in which the game may become monotonous.

In additions in the gaming machine described in JP-A-2003-340139, the medal embedded with IC chip formed together with the figure is merely mounted on the medal mounting platform. That is, in JP-A-2003-340139, although the medal is formed together with the toy figure, only the IC chip is in efficient use, and there lacks ingenuity to efficiently use a figure portion to increase a player's entertainment.

In the conventional gaming machine such as a slot machine, an image displayed on display is used to thereby proceed with a game and perform a visual and audial effects related to the game, thus increasing player's entertainment. In addition, in such a slot machine, the following game is performed. That is, a plurality of reels are rotated for a predetermined time and thereafter are stopped, and when the combination of symbols displayed with the reels thus stopped corresponds to any winning combinations, coins or the like equivalent to such a winning combination are paid out. And, such a slot machine is often configured capable of executing a base game and a bonus game that is more advantageous than the base game (e.g., JP-A-2004-049408).

As such a bonus game, for example, the game (so-called free game) is known in which a game similar to the base game is executed without consuming any coins in the player's possession.

Here, as one of the modes of the bonus game, there is the mode in which a plurality of options are displayed on the slot machine, and one option is selected from the displayed options, thereby winning a predetermined number of coins as a bonus.

In addition, the use of the toy figures resembling characters from a TV animated cartoon, a home video game, and the like has recently increased in popularity.

In view of such circumstances, a gaming machine has been developed on which a game is played using a card-like recording medium capable of recording information or a toy figure having a recording medium embedded therein, which attracts a player's attention.

However, in the aforementioned bonus game where an option is selected, the player can participate in the bonus game and thus find fulfillment in winning a bonus. However, a difference is unlikely to occur depending upon the player and the same result is reached no matter who may play. That is, in proceeding with the game of the slot machine, there is the problem in which the bonus game which should be the most exciting part becomes monotonous.

On the other hand, the player has a desire to efficiently win a bonus in such a bonus game.

SUMMARY

The present invention provides at least one of:

(1) A gaming machine in which a reading object having embedded therein a storage medium, such as an IC chip, is individuated in terms of the frequency of occurrence of an effect executed during a game, thereby giving variety to the effect of the game and thus providing more fresh entertainment.

(2) A gaming machine that proceeds with a game in a bonus game state favoring a player having a reading object such as a toy figure with a built-in storage medium such as an IC chip, and that can thus increase the level of excitement for the player.

(3) A gaming machine in which an effect executed during a game is varied, based on the toy figure, thereby causing a player to form an attachment to a toy figure used by the player and giving fresh entertainment to the player.

(4) A gaming machine in which the content of an advantage to be granted to a player is changed, based on a toy figure and a subsidiary toy figure attachable to the toy figure, thereby causing a player to form an attachment to the toy figure used by the player and providing the player with a new source of entertainment.

A gaming machine according to a first aspect includes: an information reading unit that reads object information from a reading object provided with a storage medium in which the object information is stored, the reading object being mountable on the gaming machine; a game processing unit that performs game processing to provide to a player a game in a plurality of game states including a base game state and a bonus game state in which a grater advantage is provided to the player than in the base game state; and a display unit that displays an effect related to the game, wherein the game processing unit controls a frequency of occurrence of the effect to be displayed on the display unit during the game based on the object information read from the reading object by the information reading unit.

A gaming machine according to a second aspect includes: an information reading unit that reads object information from a reading object provided with a storage medium in which the object information is stored, the reading object being mountable on the gaming machine; a game processing unit that performs game processing to provide to a player a game in a plurality of game states including a base game state and a bonus game state in which a grater advantage is provided to the player than in the base game state; a display unit that displays a plurality of options related to the game; and a selection unit that allows the player to select one of the plurality of options displayed on the display unit, wherein the game processing unit determines the plurality of options to be displayed on the display unit during the game is performed in the bonus gaming state, based on the object information read from the reading object by the information reading unit.

A gaming machine according to a third aspect includes: an information reading unit that reads object information from a reading object provided with a storage medium in which the object information is stored, the reading object being mountable on the gaming machine; a game processing unit that performs game processing to provide to a player a game in a plurality of game states including a base game state and a bonus game state in which a grater advantage is provided to the player than in the base game state; and a display unit that displays an effect related to the game, wherein the game processing unit controls the display unit to display the effect corresponding to the reading object mounted on the gaming machine, based on the object information read from the reading object by the information reading unit.

A gaming machine according to a fourth aspect includes: an information reading unit that reads object information from a reading object provided with a storage medium in which the object information is stored, the reading object being mountable on the gaming machine; a game processing unit that performs game processing to provide to a player a game in a plurality of game states including a base game state and a bonus game state in which a grater advantage is provided to the player than in the base game state; and a display unit that displays an image related to the game, wherein the game processing unit determines the advantage provided to the player in the bonus game state, based on the object information read from the reading object by the information reading unit.

DISCLOSURE OF INVENTION

The present invention provides the following configurations. Any combination of the configurations not being explicitly described in below, may be provided by combining the desired configurations.

(1) A gaming machine including:

an information reading unit that reads object information from a reading object provided with a storage medium in which the object information is stored, the reading object being mountable on the gaming machine;

a game processing unit that performs game processing to provide to a player a game in a plurality of game states including a base game state and a bonus game state in which a grater advantage is provided to the player than in the base game state; and a display unit that displays an effect related to the game, wherein the game processing unit controls a frequency of occurrence of the effect to be displayed on the display unit during the game based on the object information read from the reading object by the information reading unit.

(2) The gaming machine according to the configuration of (1), wherein the object information includes identification information that indicates kind of the reading object, and wherein the game processing unit controls the frequency of occurrence of the effect based on the identification information.

(3) The gaming machine according to the configuration of (1), wherein the object information includes history information that indicates a history of usage of the reading object, and wherein the game processing unit controls the frequency of occurrence of the effect based on the history information.

(4) The gaming machine according to the configuration of (3), wherein the history information indicates a number of times the reading object is used for playing the game.

(5) The gaming machine according to the configuration of (1), wherein the game processing unit controls the frequency of occurrence of the effect in the base game state and controls the frequency of occurrence of the effect in the bonus game state.

(6) The gaming machine according to the configuration of (1), wherein the information reading unit reads the object information from the reading object without contacting the reading object.

(7) The gaming machine according to the configuration of (1), wherein the information reading unit writes an updated object information into the storage medium provided in the reading object.

(8) The gaming machine according to the configuration of (7), wherein the information reading unit writes the updated object information into the storage medium without contacting the reading object.

(9) The gaming machine according to the configuration of (1), wherein the reading object is a three-dimensional toy figure.

(10) The gaming machine according to the configuration of (1), wherein the display unit variably displays a plurality of symbols arranged on a plurality of reels.

(11) The gaming machine according to the configuration of (10), wherein the display unit is provided with a plurality of mechanical reels as the plurality of reels.

(12) The gaming machine according to the configuration of (1), wherein the display unit displays a plurality of options related to the game, wherein the gaming machine further comprises a selection unit that allows the player to select one of the plurality of options displayed on the display unit, and wherein the game processing unit determines the plurality of options to be displayed on the display unit during the game is performed in the bonus gaming state, based on the object information read from the reading object by the information reading unit.

(13) The gaming machine according to the configuration of (12), wherein the object information includes identification information that indicates kind of the reading object, and wherein the game processing unit determines the plurality of options to be displayed on the display unit based on the identification information.

(14) The gaming machine according to the configuration of (13), wherein the game processing unit determines the plurality of options to be displayed on the display unit, the plurality of options having a close relationship to the identification information.

(15) The gaming machine according to the configuration of (1), wherein the game processing unit controls the display unit to display the effect corresponding to the reading object mounted on the gaming machine, based on the object information read from the reading object by the information reading unit.

(16) The gaming machine according to the configuration of (15), wherein the object information includes identification information that indicates kind of the reading object, and wherein the game processing unit controls the display unit to display the effect based on the identification information.

(17) The gaming machine according to the configuration of (15), wherein the reading object is a three-dimensional toy figure.

(18) The gaming machine according to the configuration of (17), wherein the game processing unit controls the display unit to display the effect that is related to an appearance of the reading object.

(19) The gaming machine according to the configuration of (15), wherein the object information includes history information that indicates a history of usage of the reading object, and wherein the game processing unit controls the display unit to display the effect based on the history information.

(20) The gaming machine according to the configuration of (1), wherein the game processing unit determines the advantage provided to the player in the bonus game state, based on the object information read from the reading object by the information reading unit.

(21) The gaming machine according to the configuration of (20), wherein the object information includes identification information that indicates kind of the reading object, and wherein the game processing unit determines the advantage provided to the player in the bonus game state, based on the identification information.

(22) The gaming machine according to the configuration of (20), wherein the reading object is a three-dimensional toy figure.

(23) The gaming machine according to the configuration of (22), wherein the toy figure is configured to be capable of attaching thereto a subsidiary toy figure having a subsidiary storage medium in which a subsidiary object information is stored, wherein the information reading unit reads the object information stored in the storage medium of the toy figure and reads the subsidiary object information stored in the subsidiary storage medium of the subsidiary toy figure, and wherein the game processing unit determines the advantage provided to the player in the bonus game state, based on the identification information and the subsidiary object information.

(24) A gaming machine comprising:

an information reading unit that reads object information from a reading object provided with a storage medium in which the object information is stored, the reading object being mountable on the gaming machine;

a game processing unit that performs game processing to provide to a player a game in a plurality of game states including a base game state and a bonus game state in which a grater advantage is provided to the player than in the base game state;

a display unit that displays a plurality of options related to the game; and a selection unit that allows the player to select one of the plurality of options displayed on the display unit, wherein the game processing unit determines the plurality of options to be displayed on the display unit during the game is performed in the bonus gaming state, based on the object information read from the reading object by the information reading unit.

(25) The gaming machine according to the configuration of (24), wherein the object information includes identification information that indicates kind of the reading object, and wherein the game processing unit determines the plurality of options to be displayed on the display unit based on the identification information.

(26) The gaming machine according to the configuration of (25), wherein the game processing unit determines the plurality of options to be displayed on the display unit, the plurality of options having a close relationship to the identification information.

(27) The gaming machine according to the configuration of (25), wherein the information reading unit reads the object information from the reading object without contacting the reading object.

(28) The gaming machine according to the configuration of (25), wherein the information reading unit writes an updated object information into the storage medium provided in the reading object.

(29) The gaming machine according to the configuration of (28), wherein the information reading unit writes the updated object information into the storage medium without contacting the reading object.

(30) The gaming machine according to the configuration of (25), wherein the reading object is a three-dimensional toy figure.

(31) The gaming machine according to the configuration of (25), wherein the display unit variably displays a plurality of symbols arranged on a plurality of reels.

(32) The gaming machine according to the configuration of (31), wherein the display unit is provided with a plurality of mechanical reels as the plurality of reels.

(33) The gaming machine according to the configuration of claim (25), wherein the game processing unit controls the display unit to display the effect corresponding to the reading object mounted on the gaming machine, based on the object information read from the reading object by the information reading unit.

(34) The gaming machine according to the configuration of (33), wherein the object information includes identification information that indicates kind of the reading object, and wherein the game processing unit controls the display unit to display the effect based on the identification information.

(35) The gaming machine according to the configuration of (33), wherein the reading object is a three-dimensional toy figure.

(36) The gaming machine according to the configuration of (35), wherein the game processing unit controls the display unit to display the effect that is related to an appearance of the reading object.

(37) The gaming machine according to the configuration of (33), wherein the object information includes history information that indicates a history of usage of the reading object, and wherein the game processing unit controls the display unit to display the effect based on the history information.

(38) The gaming machine according to the configuration of (25), wherein the game processing unit determines the advantage provided to the player in the bonus game state, based on the object information read from the reading object by the information reading unit.

(39) The gaming machine according to the configuration of (38), wherein the object information includes identification information that indicates kind of the reading object, and wherein the game processing unit determines the advantage provided to the player in the bonus game state, based on the identification information.

(40) The gaming machine according to the configuration of (38), wherein the reading object is a three-dimensional toy figure.

(41) The gaming machine according to the configuration of (40), wherein the toy figure is configured to be capable of attaching thereto a subsidiary toy figure having a subsidiary storage medium in which a subsidiary object information is stored, wherein the information reading unit reads the object information stored in the storage medium of the toy figure and reads the subsidiary object information stored in the subsidiary storage medium of the subsidiary toy figure, and wherein the game processing unit determines the advantage provided to the player in the bonus game state, based on the identification information and the subsidiary object information.

(42) A gaming machine comprising:

an information reading unit that reads object information from a reading object provided with a storage medium in which the object information is stored, the reading object being mountable on the gaming machine;

a game processing unit that performs game processing to provide to a player a game in a plurality of game states including a base game state and a bonus game state in which a grater advantage is provided to the player than in the base game state; and a display unit that displays an effect related to the game, wherein the game processing unit controls the display unit to display the effect corresponding to the reading object mounted on the gaming machine, based on the object information read from the reading object by the information reading unit.

(43) The gaming machine according to the configuration of (42), wherein the object information includes identification information that indicates kind of the reading object, and wherein the game processing unit controls the display unit to display the effect based on the identification information.

(44) The gaming machine according to the configuration of (42), wherein the reading object is a three-dimensional toy figure.

(45) The gaming machine according to the configuration of (44), wherein the game processing unit controls the display unit to display the effect that is related to an appearance of the toy figure.

(46) The gaming machine according to the configuration of (42), wherein the object information includes history information that indicates a history of usage of the reading object, and wherein the game processing unit controls the display unit to display the effect based on the history information.

(47) The gaming machine according to the configuration of (44), wherein the information reading unit reads the object information from the reading object without contacting the reading object.

(48) The gaming machine according to the configuration of (44), wherein the information reading unit writes an updated object information into the storage medium provided in the reading object.

(49) The gaming machine according to the configuration of (48), wherein the information reading unit writes the updated object information into the storage medium without contacting the reading object.

(50) The gaming machine according to the configuration of (44), wherein the reading object is a three-dimensional toy figure.

(51) The gaming machine according to the configuration of (44), wherein the display unit variably displays a plurality of symbols arranged on a plurality of reels.

(52) The gaming machine according to the configuration of (51), wherein the display unit is provided with a plurality of mechanical reels as the plurality of reels.

(53) The gaming machine according to the configuration of (44), wherein the game processing unit determines the advantage provided to the player in the bonus game state, based on the object information read from the reading object by the information reading unit.

(54) The gaming machine according to the configuration of (53), wherein the object information includes identification information that indicates kind of the reading object, and wherein the game processing unit determines the advantage provided to the player in the bonus game state, based on the identification information.

(55) The gaming machine according to the configuration of (53), wherein the reading object is a three-dimensional toy figure.

(56) The gaming machine according to the configuration of (55), wherein the toy figure is configured to be capable of attaching thereto a subsidiary toy figure having a subsidiary storage medium in which a subsidiary object information is stored, wherein the information reading unit reads the object information stored in the storage medium of the toy figure and reads the subsidiary object information stored in the subsidiary storage medium of the subsidiary toy figure, and wherein the game processing unit determines the advantage provided to the player in the bonus game state, based on the identification information and the subsidiary object information.

(57) A gaming machine comprising:

an information reading unit that reads object information from a reading object provided with a storage medium in which the object information is stored, the reading object being mountable on the gaming machine;

a game processing unit that performs game processing to provide to a player a game in a plurality of game states including a base game state and a bonus game state in which a grater advantage is provided to the player than in the base game state; and a display unit that displays an image related to the game, wherein the game processing unit determines the advantage provided to the player in the bonus game state, based on the object information read from the reading object by the information reading unit.

(58) The gaming machine according to the configuration of (57), wherein the object information includes identification information that indicates kind of the reading object, and wherein the game processing unit determines the advantage provided to the player in the bonus game state, based on the identification information.

(59) The gaming machine according to the configuration of (58), wherein the reading object is a three-dimensional toy figure.

(60) The gaming machine according to the configuration of (59), wherein the toy figure is configured to be capable of attaching thereto a subsidiary toy figure having a subsidiary storage medium in which a subsidiary object information is stored, wherein the information reading unit reads the object information stored in the storage medium of the toy figure and reads the subsidiary object information stored in the subsidiary storage medium of the subsidiary toy figure, and wherein the game processing unit determines the advantage provided to the player in the bonus game state, based on the identification information and the subsidiary object information.

(61) The gaming machine according to the configuration of (57), wherein the information reading unit reads the object information from the reading object without contacting the reading object.

(62) The gaming machine according to the configuration of (57), wherein the information reading unit writes an updated object information into the storage medium provided in the reading object.

(63) The gaming machine according to the configuration of (62), wherein the information reading unit writes the updated object information into the storage medium without contacting the reading object.

(64) The gaming machine according to the configuration of claim (57), wherein the reading object is a three-dimensional toy figure.

(65) The gaming machine according to the configuration of (57), wherein the display unit variably displays a plurality of symbols arranged on a plurality of reels.

(66) The gaming machine according to the configuration of (65), wherein the display unit is provided with a plurality of mechanical reels as the plurality of reels.

BRIEF DESCRIPTION OF THE DRAWINGS

In the accompanying drawings:

FIG. 5 is an illustration showing a lottery table of and awards for winning combinations when the base game is played;

FIGS. 6A-6C are illustrations showing toy figures used on the slot machine according to the embodiment, wherein FIG. 6A shows a warrior toy figure, FIG. 6B shows a wizard toy figure, and FIG. 6C shows an archer toy figure;

FIG. 9 is an illustration of a display change table used in a display change process;

FIGS. 10A and 10B are illustrations showing display examples on the lower liquid crystal display when no toy figure is used, wherein FIG. 10A is a display example during the base game and FIG. 10B is a display example during a bonus game;

FIGS. 11A and 11B are illustrations showing display examples on the lower liquid crystal display when the warrior toy figure having a frequency of usage of 100 times or less is used, wherein FIG. 11A is a display example during the base game and FIG. 11B is a display example during the bonus game;

FIGS. 12A and 12B are illustrations showing display examples on the lower liquid crystal display when the warrior toy figure having a frequency of usage of 101 times or more is used, wherein FIG. 11A is a display example during the base game and FIG. 11B is a display example during the bonus game;

FIGS. 15A and 15B are examples of an effect lottery table used in an effect lottery process, wherein FIG. 15A shows an effect lottery table used during the base game and FIG. 15B shows an effect lottery table used during the bonus game;

FIGS. 16A and 16B are display examples of a premier effect performed as a result of the effect lottery process, wherein FIG. 16A is a display example during the base game and FIG. 16B is a display example during the bonus game;

FIGS. 20A and 20B are examples of an option content lottery tables used in an option content lottery process, wherein FIG. 20A is an option content lottery table used when the warrior toy figure is used and FIG. 20B is an option content lottery table used when the wizard toy figure is used;

FIGS. 21A-21C are illustrations showing examples of effect lottery tables used during the base game after the bonus game ends;

FIG. 32 is an illustration showing a lottery table determination table used in a lottery table change process;

FIG. 33 is an illustration of a lottery table (b) selected in the case of using only the warrior toy figure having a frequency of usage of 100 times or less;

FIG. 34 is an illustration of a lottery table (c) selected in the case of using only the wizard toy figure having a frequency of usage of 100 times or less;

FIG. 35 is an illustration of a lottery table (d) selected in the case of using only the archer toy figure having a frequency of usage of 100 times or less;

FIG. 36 is an illustration of a lottery table (e) selected in the case of using the warrior toy figure which, having a frequency of usage of 100 times or less, accessorized with the sword accessory;

FIG. 37 is an illustration of a lottery table (f) selected in the case of using the archer toy figure which, having a frequency of usage of 100 times or less, accessorized with the staff or bow accessory;

FIG. 38 is an illustration of a lottery table (g) selected in the case of using the warrior toy figure which, having a frequency of usage of 100 times or less, accessorized with the evil sword accessory;

FIG. 39 is an illustration of a lottery table (B) selected in the case of using only the warrior toy figure having a frequency of usage of 101 times or more;

FIG. 40 is an illustration of a lottery table (E) selected in the case of using the warrior toy figure which, having a frequency of usage of 101 times or more, accessorized with the sword accessory;

FIG. 41 is an illustration of a lottery table (F) selected in the case of using the warrior toy figure which, having a frequency of usage of 101 times or more, accessorized with the staff or bow accessory;

FIG. 42 is an illustration of a lottery table (G) selected in the case of using the warrior toy figure which, having a frequency of usage of 101 times or more, accessorized with the evil sword accessory.

DETAILED DESCRIPTION OF THE EMBODIMENTS

First Embodiment

Figure 1:
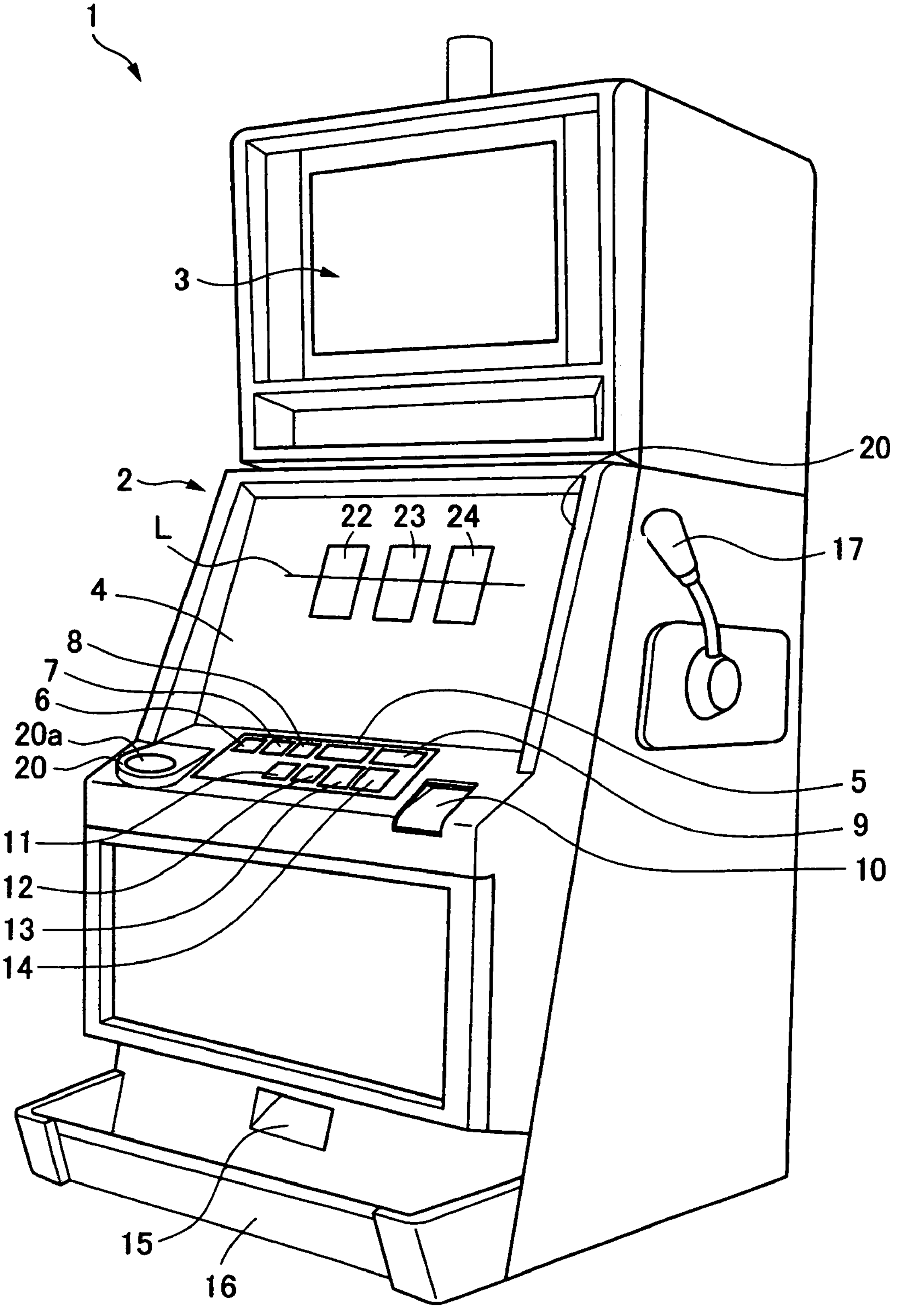
FIG. 1 is a perspective view of a slot machine according to a first embodiment.
Figure 2:
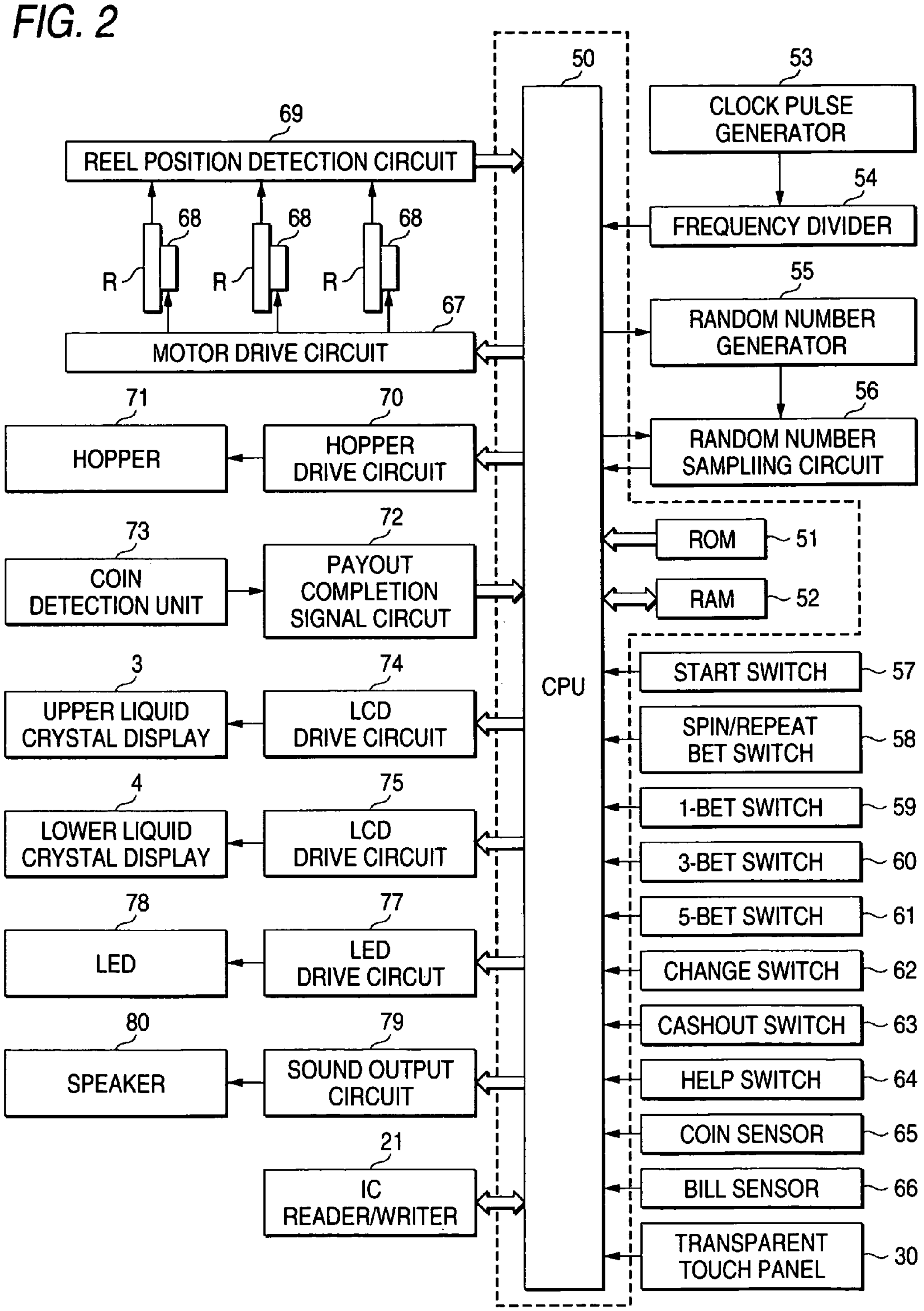
FIG. 2 is a block diagram schematically showing the control system of the slot machine.

A gaming machine of the invention will hereafter be described in detail with reference to the drawings, based on a first embodiment with the invention incorporated into a slot machine. The outlined configuration of a slot machine according to the first embodiment will first be described in accordance with FIGS. 1 and 2. FIG. 1 is a perspective view of the slot machine 1. FIG. 2 is a block diagram schematically showing the control system of the slot machine 1.

As shown in FIG. 1, the slot machine 1 has a cabinet 2 forming the entirety thereof. An upper liquid crystal display 3 is located in the front upper portion of such a cabinet 2, and a lower liquid crystal display 4 is located in the front central portion of the cabinet 2. Here, the upper liquid crystal display 3 is configured of a liquid crystal display as in general use. The lower liquid crystal display 4 is configured of a so-called transparent liquid crystal display. The upper liquid crystal display 3 displays information on a game, such as a gaming manner, the kinds of and awards for winning combinations, various effects related to the game, and the like. The lower liquid crystal display 4 is basically a gaming region for playing on the slot machine 1 and, as shown in FIG. 1, is formed with three variable display windows 22, 23, and 24.

An operation table 5 projecting from the front side is provided below the lower liquid crystal display 4. Such an operation table 5 is provided with, from the leftmost side, a CHANGE button 6, a CASHOUT button 7, and a HELP button 8. As well, a coin insertion slot 9 and a bill insertion slot 10 are provided on the right side of the HELP button 8. Arranged along the front of the operation table are, from the left side, a 1-BET button 11, a SPIN/REPEAT BET button 12, a 3-BET button 13, and a 5-BET button 14.

Here, the CHANGE button 6 is a button to be pressed in changing a bill inserted into the bill insertion slot 10. Changed coins are paid out to a coin receiving tray 16 from a coin payout opening 15 provided in the lower portion of the cabinet 2. A CHANGE switch 62 (described later) is fixed to the CHANGE button 6 and, when the CHANGE button 6 is pressed, a switch signal is sent from the CHANGE switch 62 to a CPU 50.

The CASHOUT button 7 is a button to be pressed at the end of a base game. When the CASHOUT button 7 is pressed, coins won during the game are paid out to the coin receiving tray 16 from the coin payout opening 15. A CASHOUT switch 63 (described later) is fixed to the CASHOUT button 7 and, when the CASHOUT button 7 is pressed, a switch signal is sent from the CASHOUT switch 63 to the CPU 50.

The HELP button 8 is a button to be pressed when a game operation manner and the like are unclear. When the HELP button 8 is pressed, a variety of help information is displayed on the upper or lower liquid crystal display 3 or 4. A HELP switch 64 (described later) is fixed to such a HELP button 8 and, when the HELP button 8 is pressed, a switch signal is sent from the HELP switch 64 to the CPU 50.

A coin sensor 65 is located in the coin insertion slot 9. When a coin is inserted into the coin insertion slot 9, a coin detection signal is sent to the CPU 50 via the coin sensor 65. A bill sensor 66 is located in the bill insertion slot 10. When a bill is inserted into the bill insertion slot 10, a bill detection signal is sent to the CPU 50 via the bill sensor 66.

The 1-BET button 11 is a button used to place one bet each time it is pressed. A 1-BET switch 59 (described later) is fixed to the 1-BET button 11 and, when the 1-BET button 11 is pressed, a switch signal is sent from the 1-BET switch 59 to the CPU 50.

Similarly, the 3-BET button 13 is a button to be pressed to thereby start a game with three bets, and the 5-BET button 14 is a button to be pressed to thereby start a game with five bets. A 3-BET switch 60 and a 5-BET switch 61, described later, are fixed to the 3-BET button 13 and the 5-BET button 14, respectively. And, the 3-BET switch 60 and the 5-BET switch 61 send a switch signal to the CPU 50 when the 3-BET button 13 and the 5-BET button 14 are pressed, respectively.

The SPIN/REPEAT BET button 12 is a button to be pressed to thereby start the variable display of symbols on the variable display windows 22 to 24 in the lower liquid crystal display 4 so as to start a game with the current or previous number of bets. A SPIN/REPEAT BET switch 58 (described later) is fixed to the SPIN/REPEAT BET button 12 and, when the SPIN/REPEAT BET button 12 is pressed, a switch signal is sent from the SPIN/REPEAT BET switch 58 to the CPU 50. In the first embodiment, one of 1, 2, 3, and 5 bets can be placed as a number of bets by pressing the SPIN/REPEAT BET button 12 for the respective times.

The lower portion of the cabinet 2 is formed with the coin payout opening 15 and provided with the coin receiving tray 16 which receives coins paid out from the coin payout opening 15. A coin detection unit 73 (described later) configured of a sensor and the like is located inside the coin payout opening 15. The coin detection unit 73 detects the number of coins paid out from the coin payout opening 15.

A mounting platform 20 on which to mount a toy figure 100 (reading object) is disposed on the left side of the operation table 5. The mounting platform 20 has a mounting portion **20*a* on which to mount a base 100*a* formed on the toy figure 100. And, disposed below the mounting portion 20*a* is a noncontact IC reader/writer 21 (information reading unit) that reads information stored in an IC chip 101 (storage medium) embedded in the toy figure 100, and writes an updated information into the IC chip 101. The IC reader/writer 21 reads IC chip data stored in any IC chips existing within a fixed range above the IC reader/writer 21, and writes data into a desired one of the IC chips, without contacting the toy figure 100. The IC chip data read by the IC reader/writer 21 is stored in the RAM 52**.

A START lever 17 is attached to a side surface (right side surface as seen in FIG. 1) so as to be rotatable within a predetermined angle range. A START switch 57 (described later) is fixed to the START lever 17, and a switch signal issued from the START switch 57 during rotation of the START lever 17 is sent to the CPU 50.

The lower liquid crystal display 4 is disposed in the front central portion of the cabinet 2 of the slot machine 1 and, as mentioned above, is formed with the variable display windows 22, 23, and 24. The variable display windows 22 to 24 are configured as a transparent region which allows visibility through to the interior.

Additionally, the lower liquid crystal display 4 has a transparent touch panel 30 on its front surface, and a player touches the transparent touch panel 30, thereby enabling various instructions and selections. In the slot machine 1 of the first embodiment, the transparent touch panel 30 is used during a bonus game.

Three reels R are disposed in an inner portion of the cabinet 2 on the back surface side of the lower liquid crystal display 4. These reels R are disposed parallel to one another in the inner portion of the cabinet 2 and are independently rotatably supported. Furthermore, the reels R are disposed opposite the respective variable display windows 22 to 24.

That is, the lower liquid crystal display 4 is disposed in front of the three reels R, and symbol columns 41 to 43 of symbols displayed on the peripheries of the reels R are thus made visible via the variable display windows 22 to 24.

And, in the slot machine 1 of the first embodiment, the three reels R are used to play the base game (described later), and the lower liquid crystal display 4 is used to play the bonus game (described later).

Here, to describe the reels R, out of the three reels R, the left reel R as seen from the front of the slot machine 1 is opposite the variable display window 22 (see FIG. 1) formed in the lower liquid crystal display 4. The center reel R is opposite the variable display window 23 (see FIG. 1) similarly formed in the lower liquid crystal display 4. And, the right reel R is opposite the variable display window 24 (see FIG. 1) similarly formed in the lower liquid crystal display 4.

Figure 4:
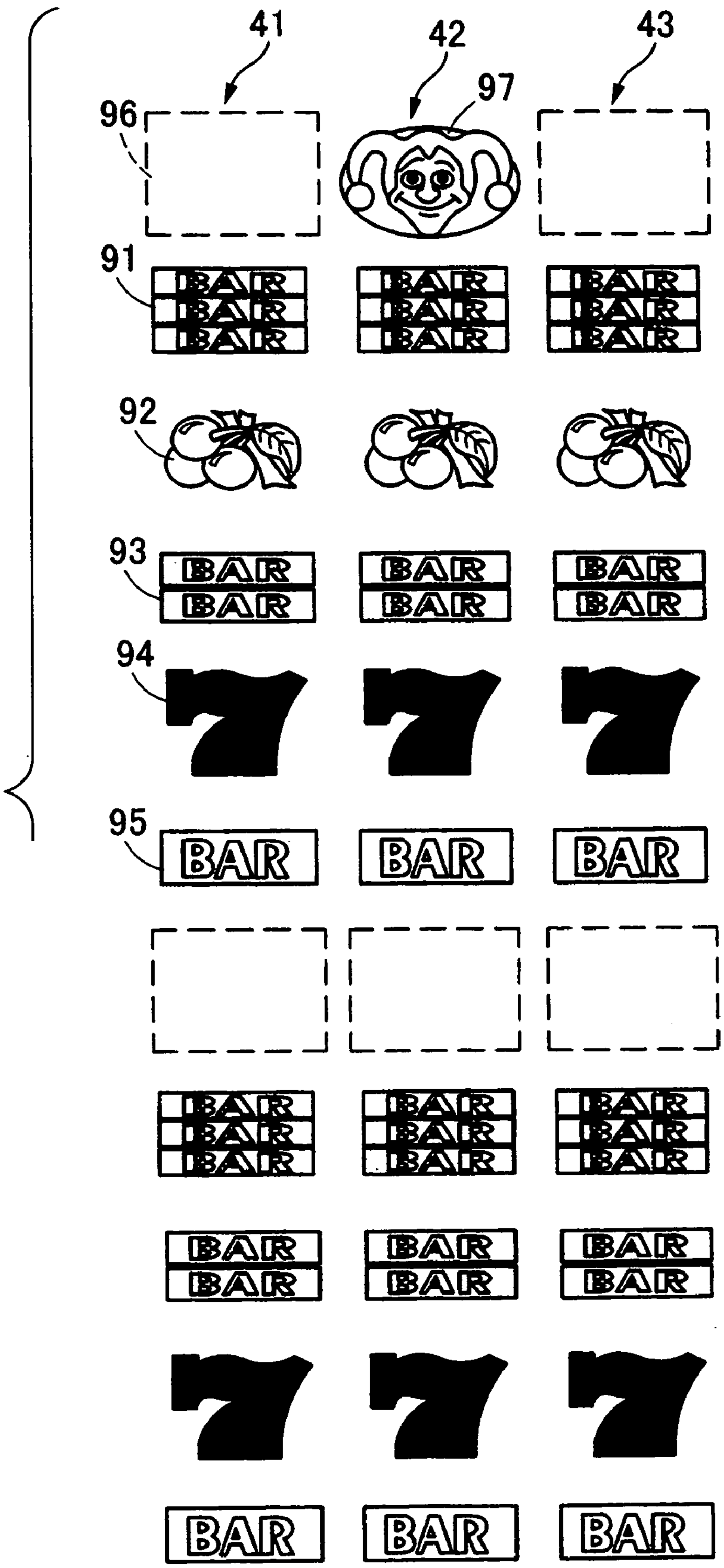
FIG. 4 is an illustration schematically showing symbol examples to be displayed on the peripheral surface of reels used in a base game.

In addition, various symbols, such as shown in FIG. 4, which are used in the base game are formed on the periphery of each reel R. Here, the symbol column 41 is a column of symbols which, displayed on the periphery of the left reel R, are variably displayed in the variable display window 22. The symbol column 42 is a column of symbols which, displayed on the periphery of the center reel R, are variably displayed in the variable display window 23. The symbol column 43 is a column of symbols which, displayed on the periphery of the right reel R, are variably displayed in the variable display window 24.

Here, the symbol columns 41 and 43, having the same symbol arrangement, are each configured of eleven symbols obtained by appropriately combining a triple BAR 91, a CHERRY 92, a double BAR 93, a SEVEN 94, a single BAR 95, and a blank 96. Here, the blank 96 denotes the region in which there is no symbol.

The symbol column 42 is similar to the aforementioned symbol columns 41 and 43 in that the triple BAR 91, the CHERRY 92, the double BAR 93, the SEVEN 94, the single BAR 95, and the blank 96 are combined. In addition thereto, however, the symbol column 42 has one trigger symbol 97 arranged therein. Such a trigger symbol 97 is a symbol for making a transition to the bonus game as described later, and a transition can be made to the bonus game when the trigger symbol 97 is displayed stopped on an activated pay line L in the variable display window 23.

When the symbol columns 41 to 43 scrolling in their respective variable display windows 22 to 24 are displayed stopped, three symbols are displayed stopped in the respective variable display windows.

Various winning combinations are preset based on multiple kinds of combinations of the aforementioned symbols. When a combination of symbols corresponding to a winning combination is stopped on the activated pay line L, coins are paid out from the coin payout opening 15 in response to the winning combination. The slot machine 1 of the first embodiment is the same as the existing slot machine in such a respect, and the description thereof is therefore omitted here.

Various symbols are formed on the peripheries of the reels R in the following manner. That is, generally, various symbols are pre-printed on an elongated reel sheet that matches the width and circumference of each reel R, and such a reel sheet is affixed to the periphery of each reel R. As a matter of course, it is possible to form symbols by any other method.

The configuration of the control system of the slot machine 1 will now be described in accordance with FIG. 2. FIG. 2 is a block diagram schematically showing the control system of the slot machine 1.

As shown in FIG. 2, the control unit (game processing unit) of the slot machine 1 is configured basically using the CPU 50 as a core, and a ROM 51 and a RAM 52 are connected to the CPU 50. The ROM 51 stores a main processing program, a base game processing program, a bonus game processing program, various effect programs for displaying various effects to the upper and lower liquid crystal displays 3 and 4 as a game progresses, a lottery table for choosing a stop display symbol of the base game, and in addition thereto, various programs necessary to control the slot machine 1, a data table, and the like, which programs and tables will be described later. The RAM 52 is a memory that temporarily stores various data calculated by the CPU 50.

A clock pulse generator 53 for generating a reference clock pulse and a frequency divider 54 are connected to the CPU 50. And, a random number generator 55 for generating random numbers and a random number sampling circuit 56 are connected to the CPU 50. The random numbers sampled via the random number sampling circuit 56 are used in various lotteries for determining winning combinations, effects, and the like. Furthermore, connected to the CPU 50 are the START switch 57 fixed to the START lever 17, the SPIN/REPEAT BET switch 58 fixed to the SPIN/REPEAT BET button 12, the 1-BET switch 59 fixed to the 1-BET button 11, the 3-BET switch 60 fixed to the 1-BET button 13, the 5-BET switch 61 fixed to the 1-BET button 14, the CHANGE switch 62 fixed to the CHANGE button 6, the CASHOUT switch 63 fixed to the CASHOUT button 7, and the HELP switch 64 fixed to the HELP button 8. The CPU 50 performs control in executing various operations corresponding to the respective buttons, based on the switch signals sent from the respective switches in response to the respective buttons being pressed.

Three step motors 68 which rotate the respective reels R are connected to the CPU 50 via a motor drive circuit 67, and a reel position detection circuit 69 is connected to the reels R. When a motor drive signal is outputted from the CPU 50 to the motor drive circuit 67, the step motors 68 are rotationally driven by the motor drive circuit 67. The reels R are thereby rotated.

At the point, after the rotation of each reel R is initiated, the number of drive pulses to be supplied to each of the step motors 68 is calculated, and the calculated value is written to a predetermined area of the RAM 52. In addition, a reset pulse is transmitted per revolution from each reel R, and such a reset pulse is inputted to the CPU 50 via the reel position detection circuit 69. When the reset pulse is thus inputted to the CPU 50, the calculated value written in the RAM 52 is cleared to "0". The CPU 50 recognizes the rotational position of a symbol on each reel R based on a calculated value corresponding to each reel R within the range of one revolution and on a symbol table in which the rotational positions of the reels R, stored in the ROM 51, are related to the symbols formed on the peripheries of the reels R.

The noncontact IC reader/writer 21 for reading/writing data to the IC chip 101 provided in the toy figure 100 is connected to the CPU 50. The IC reader/writer 21 reads IC chip data stored in the IC chip 101, the IC chip data (object information) indicating information such as a kind of the toy figure 100, when the toy figure 100 is set on the mounting portion 20*a*. The read IC chip data is stored in the RAM 52 by the CPU 50. At the end of one game on the slot machine 1, the IC reader/writer 21 writes to the IC chip 101, as IC chip data, a value obtained by adding 1 to the number of games played (henceforth called frequency of usage) on the slot machine 1 using the toy figure 100.

The coin sensor 65 located in the coin insertion slot 9 and the bill sensor 66 located in the bill insertion slot 10 are connected to the CPU 50. The coin sensor 65 detects coins inserted from the coin insertion slot 9, and the CPU 50 calculates the number of coins inserted, based on a coin detection signal transmitted into the coin sensor 65. The fill sensor 66 detects the kind and amount of the bills inserted from the bill insertion slot 10, and the CPU 50 calculates a number of coins equivalent to the amount of bills, based on a bill detection signal transmitted from the bill sensor 66.

The transparent touch panel 30 is connected to the CPU 50. As mentioned above, the transparent touch panel 30 is disposed on the front surface of the lower liquid crystal display 4. In the slot machine 1 of the first embodiment, when the player plays the bonus game, the transparent touch panel 30 is used to enter a selection from option images displayed as options. That is, the player presses with a finger or the like the transparent touch panel 30 in front of the option images displayed on the lower liquid crystal display 4, thereby issuing to the CPU 50 a selection signal corresponding to an option image pressed, and the CPU 50 recognizes that the option image has been selected.

A hopper 71 is connected to the CPU 50 via a hopper drive circuit 70. When a drive signal is sent from the CPU 50 to the hopper drive circuit 70, the hopper 71 pays out a predetermined number of coins from the coin payout opening 15.

The coin detection unit 73 is connected to the CPU 50 via a payout completion signal circuit 72. The coin detection unit 73 is located inside the coin payout opening 15. When the coin detection unit 73 detects that the predetermined number of coins are paid out from the coin payout opening 15, a coin payout detection signal is sent from the coin detection unit 73 to the payout completion signal circuit 72. Based on the coin payout detection signal, the payout completion signal circuit 72 sends a payout completion signal to the CPU 50. The upper liquid crystal display 3 is connected to the CPU 50 via a LCD drive circuit 74, and the lower liquid crystal display 4 is connected to the CPU 50 via a LCD drive circuit 75. The upper and lower liquid crystal displays 3 and 4 are thus controlled by the CPU 50.

Figure 3:
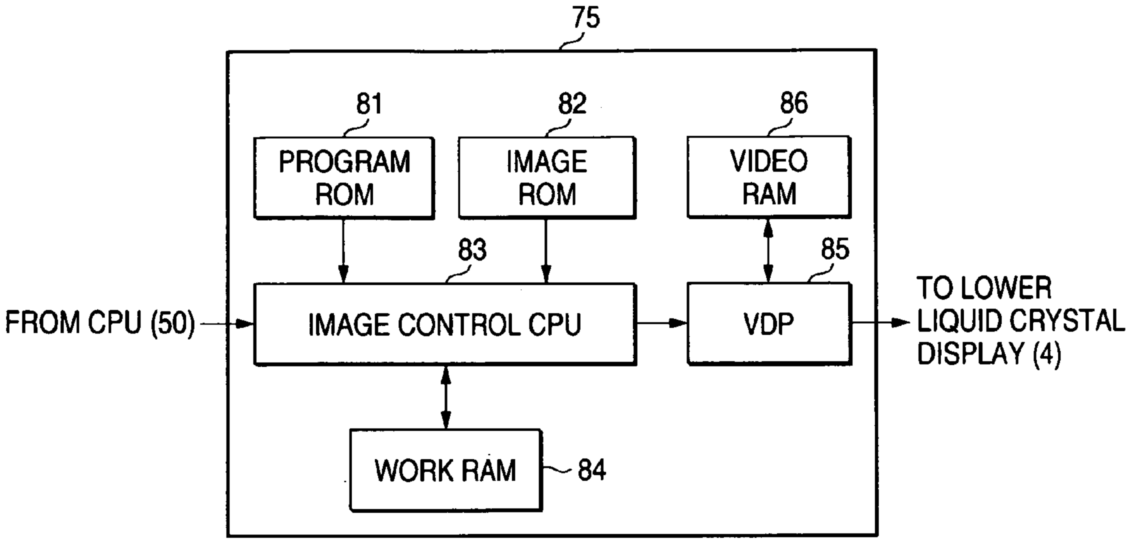
FIG. 3 is a block diagram schematically showing a LCD drive circuit of a lower liquid crystal display.

Here, as shown in FIG. 3, the LCD drive circuit 75 is provided with a program ROM 81, an image ROM 82, an image control CPU 83, a work RAM 84, a VDP (Video Display Processor) 85, a video RAM 86, and the like. The program ROM 81 stores an image control program as to the display on the lower liquid crystal display 4 and various selection tables. The image ROM 82 stores, for example, dot data for forming an image such as an option image to be displayed on the lower liquid crystal display 4. Based on a parameter set by the CPU 50, the image control CPU 83 determines the image to be displayed on the lower liquid crystal display 4 from among the dot data pre-stored in the image ROM 82, in accordance with the image control program pre-stored in the program ROM 81. The work RAM 84 is configured for use as temporary storage unit when the image control CPU 83 executes the aforementioned image control program. The VDP 85 forms an image which responds to a display content determined by the image control CPU 83 and outputs the formed image to the lower liquid crystal display 4. The video RAM 86 is configured for use as temporary storage unit when the VDP 85 forms the image.

A plurality of LEDs 78 are connected to the CPU 50 via an LED drive circuit 77. A large number of LEDs 78, located at the front of the slot machine 1, are controlled as to lighting by the LED drive circuit 78, based on a drive signal from the CPU 50, when various effects are displayed. Furthermore, a sound output circuit 79 and a speaker 80 are connected to the CPU 50. When various effects are performed, the speaker 80 produces various sound effects based on an output signal from the sound output circuit 79.

Referring now to FIG. 5, a description will be given to all the symbols displayed stopped on the activated pay line, i.e., a lottery table used to determine winning combinations, when the base game is played using the three variable display windows 22 to 24 on the slot machine 1. FIG. 5 is an illustration showing a winning combination lottery table for use in playing the base game and awards for the winning combinations therein.

As shown in FIG. 5, the range of random number values used in the winning combination lottery table is 0 to 1270. When a random number value sampled via the random number sampling circuit 56 falls within the range of 0 to 9, a JOKER is won and an award of a trigger to the bonus game is obtained. In the case, the trigger symbol 97 is displayed stopped on the activated pay line L in the variable display window 23, thus enabling a transition to the bonus game.

When a random number value sampled via the random number sampling circuit 56 falls within the range of 10 to 32, "7-7-7" is won and an award of "100" is obtained. In the case, the SEVENs 94 are displayed stopped on the activated pay line L in the variable display windows 22 to 24. Similarly, when a random number value sampled falls within the range of 33to 35, "3BAR-3BAR-3BAR" is won and an award of "5" is obtained. In the case, the triple BARs 91 are displayed stopped on the activated pay line L in the variable display windows 22 to 24.

As for the winning combinations of double BARs 93, single BARs 95, and CHERRYs 92 as well, as shown in FIG. 5, when a random number value sampled falls within the range of random number values corresponding to each of the winning combinations, the corresponding winning combination is won and the designated award for each winning combination is obtained.

When a random number value sampled falls within the range of 258 to 1270, "LOSS" is obtained. In the case, in the variable display windows 22 to 24, symbols in a combination other than the combinations of symbols shown in FIG. 5 are displayed stopped on the activated pay line L. On the occasion, there is no award paid out to the player.

Figure 6C:
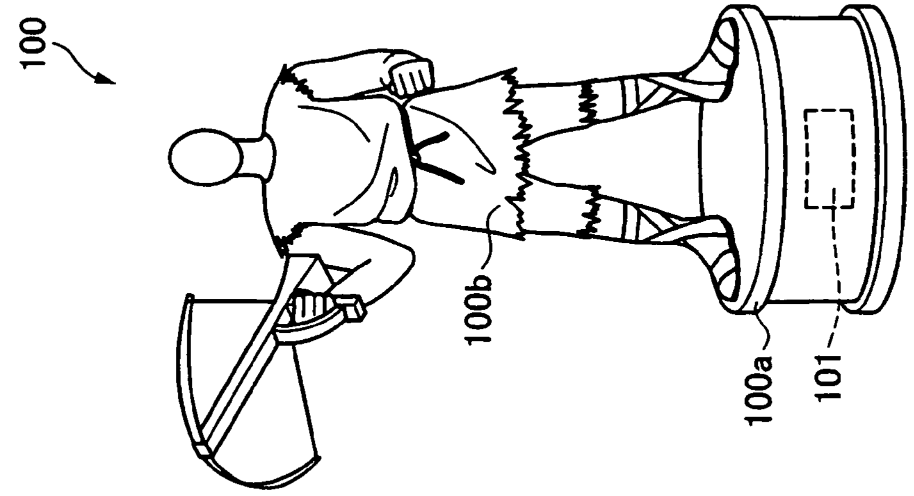
Figure 6B:
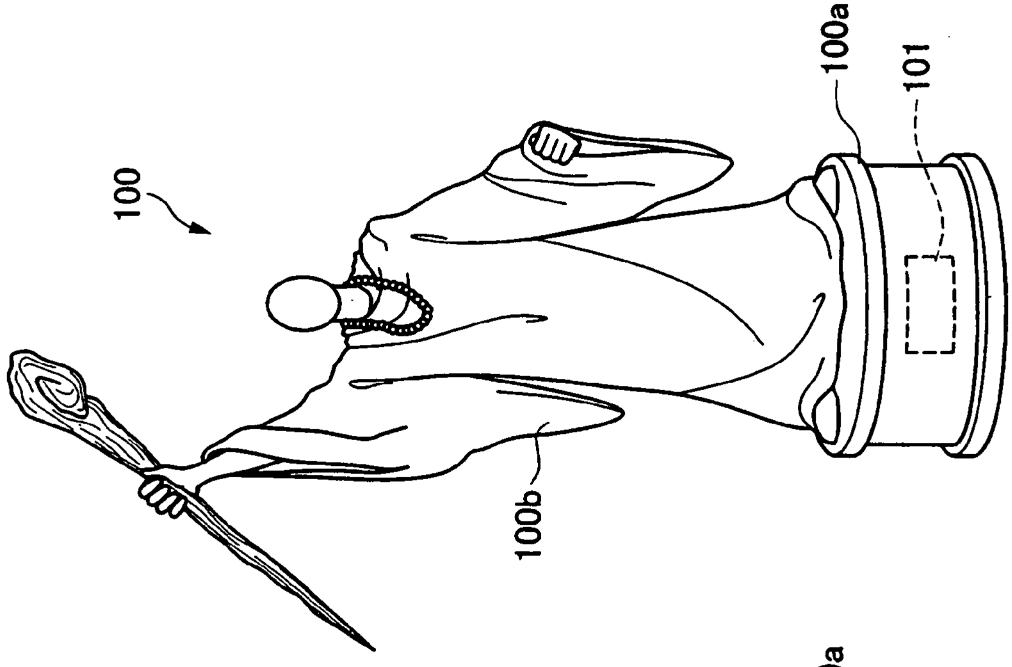
Figure 6A:
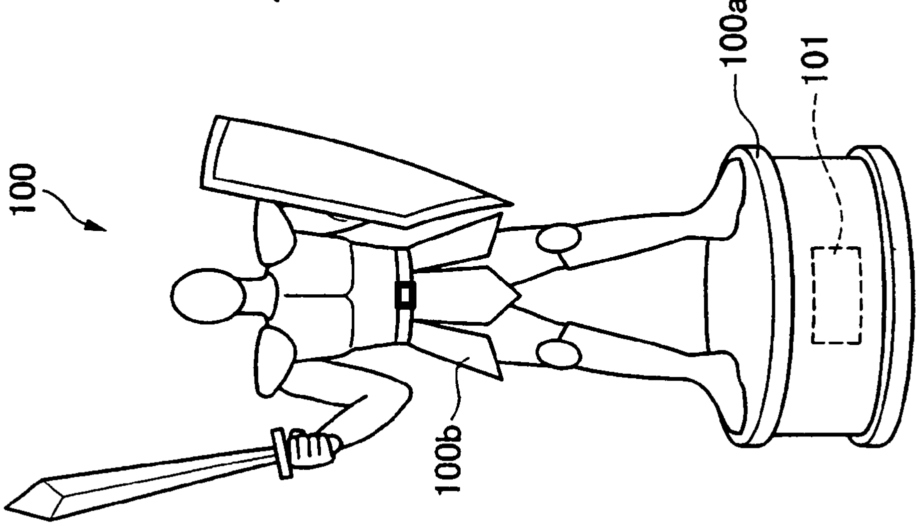

Referring now to FIGS. 6A-6C, a detailed description will be given of the toy figure 100 to be mounted on the mounting platform 20 formed on the slot machine 1. FIGS. 6A-6C are illustrations showing examples of the toy figure used on the slot machine 1 of the first embodiment.

The slot machine 1 is playable with three different kinds of toy figures 100, as shown in FIGS. 6A-6C. The toy figure 100 shown in FIG. 6A is configured of a figure portion 100*b* representing a "warrior" toy figure and a base 100*a* (henceforth called a warrior toy figure). Various accessories (subsidiary toy figures) are configured to be mountable on the figure portion 100*b*. That is, a sword held by the warrior shown in FIG. 6A is configured to be detachable, and the sword can be replaced with another accessory such as another sword, a staff, or a bow.

The noncontact IC chip 101 is located in the base 100*a* and has a variety of information stored therein. And, the IC chip 101 stores IC chip data consisting of the frequency of usage of the toy figure 100 and the type of the toy figure 100. That is, in the case of the toy figure 100 of FIG. 6A which has not yet been used, information indicative of "frequency of usage: 0, type: warrior" is stored in the IC chip 101 as the IC chip data.

The toy figure shown in FIG. 6B is configured of a figure portion 100*b* representing a "wizard" toy figure and a base 100*a* (henceforth called a wizard toy figure). Various accessories can be similarly attached to the wizard toy figure. For example, a staff held in the hand of the wizard toy figure shown in FIG. 6B can be replaced with a sword, a bow, or another staff. And, similar to the warrior toy figure, an IC chip 101 is located in the base 100*a*. The IC chip 101 stores IC chip data and, as with the aforementioned case, stores the frequency of usage of such a toy figure 100 and data indicative of "type: wizard".

The toy figure shown in FIG. 6C) is configured of a figure portion 100*b* representing an "archer" toy figure and a base 100*a* (henceforth called an archer toy figure). In the archer toy figure as well, a bow currently held in his hand can be replaced with another accessory such as a sword, a staff, or another bow.

Similar to the aforementioned toy figures 100, an IC chip 101 located in the base 100*a* stores the frequency of usage of such a toy figure and data indicative of "type: archer".

Figure 7:
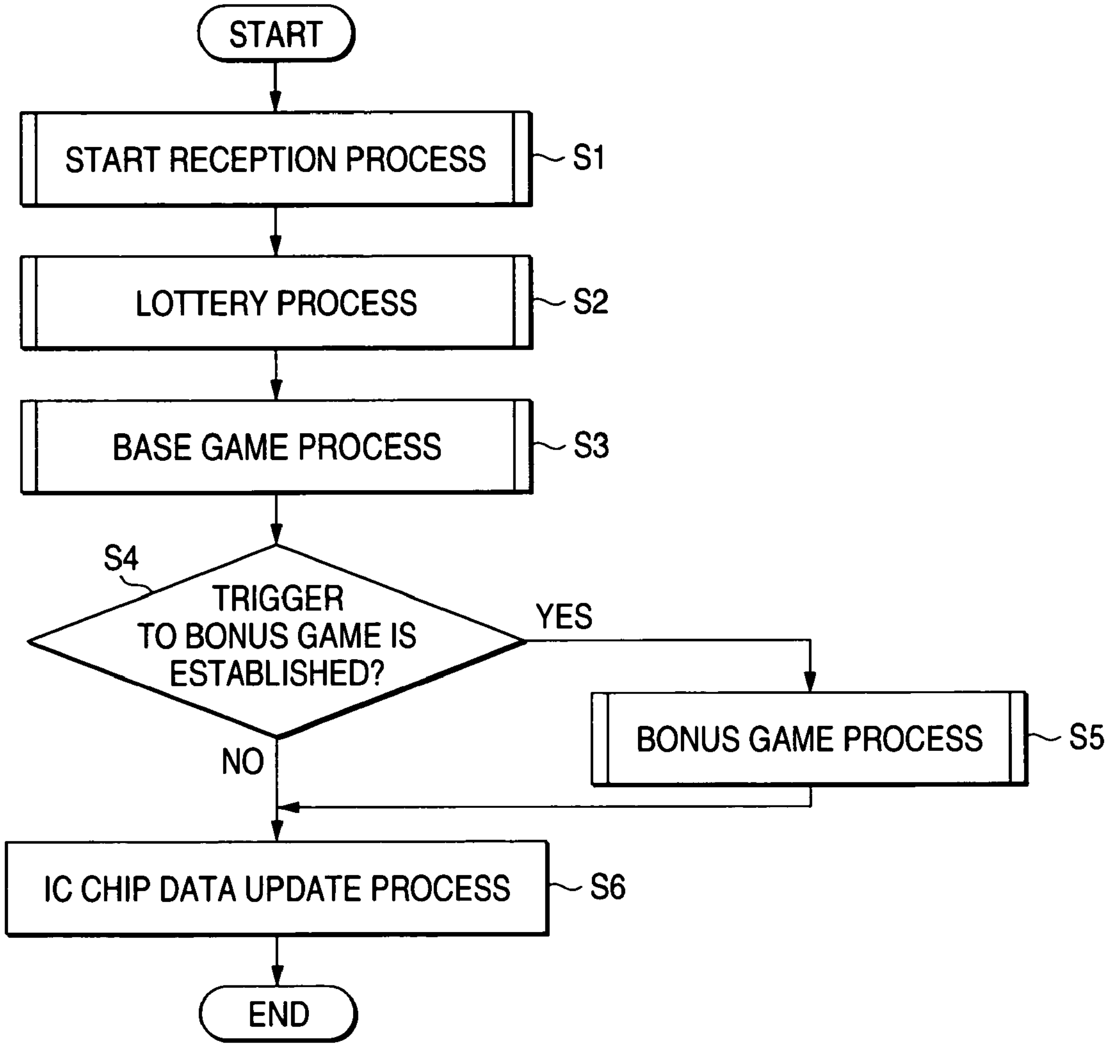
FIG. 7 is a flowchart of a main processing program.
Figure 8:
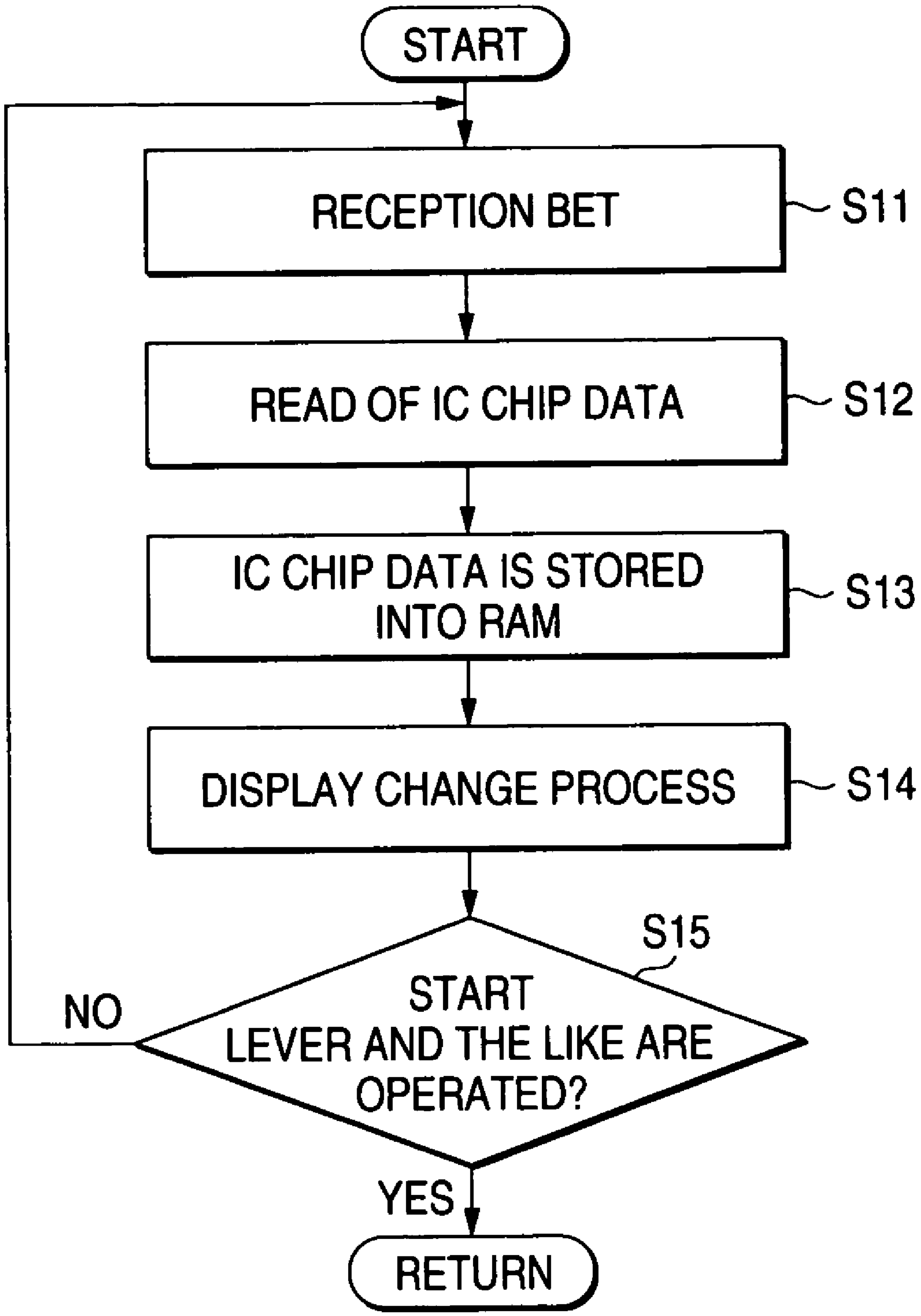
FIG. 8 is a flowchart of a start reception processing program.

The main processing program executed on the slot machine 1 will subsequently be described in accordance with FIG. 7. FIG. 7 is a flowchart of the main processing program. In FIG. 7, first, a to-be-described start reception process of FIG. 8 is performed in step (henceforth abbreviated as "S") 1. The process in S1 is the process of receiving a switch signal sent from the START switch 57, the SPIN/REPEAT BET switch 58, the 1-BET switch 59, the 3-BET switch 60, or the 5-BET switch 61 based on the operation of the START lever 17, the SPIN/REPEAT BET button 12, the 1-BET button 11, the 3-BET button 13, or the 5-BET button 14, respectively. The process in S1 also includes the process of determining the presence/absence of a toy figure 100 on the mounting platform 20 and executing a read of the IC chip data consisting of the frequency of usage and type of such a toy figure 100 from the IC chip 101 provided in the toy figure 100. And, a game is started upon reception of the switch signal sent from each switch.

Next, in S2, a lottery process (described later in detail with reference to FIG. 13) is performed based on the switch signal sent from the aforementioned START switch 57, the SPIN/REPEAT BET switch 58, the 1-BET switch 59, the 3-BET switch 60, or the 5-BET switch 61.

A base game process (described later in detail with reference to FIG. 14) is performed in the next step, S3. Here, the base game is the game in which coins are won by displaying the reels R varying and stopped via the variable display windows 22 to 24. The process thereafter proceeds to S4 to determine whether the trigger to the bonus game is established or not. Specifically, suppose, in the lottery process of S2, that a winning combination corresponding to a random number value sampled via the random number sampling circuit 56 is a JOKER winning combination including the trigger symbol 97. In the case, the trigger to the bonus game is won (S4: YES) and the process therefore proceeds to S5 to perform a bonus game process (described later in detail with reference to FIG. 17). The bonus game is the game of aiming at winning a larger number of coins than in the base game by selecting a predetermined number of times from five options displayed on the lower liquid crystal display 4. The process proceeds to S6 after the end of the bonus game process (S5). On the contrary, suppose, in the lottery process of S2, that the winning combination corresponding to the random number value sampled via the random number sampling circuit 56 is other than JOKER winning combination. In the case, the trigger to the bonus game is not won (S4: NO) and the process therefore moves directly to S6.

An IC chip data update process for updating the IC chip data stored in the IC chip 101 is performed in S6. Specifically, it is first determined whether or not a toy figure 100 is mounted on the mounting platform 20 of the slot machine 1. If the toy figure 100 is mounted, the frequency of usage of the currently stored IC chip data is updated, via the IC reader/writer 21, to the latest one by adding 1 thereto. After the frequency of usage of the IC chip data is updated, the IC chip data update process is terminated. At the point, if no toy figure 100 exists, the process is immediately terminated. After the IC chip date update process (S6) ends, the main processing program is terminated.

A start reception processing program that is executed on the slot machine 1 will subsequently be described in accordance with FIG. 8. FIG. 8 is a flowchart of the start reception processing program.

When the start reception process is performed in the aforementioned main processing program S1 of FIG. 7, first, coins or bills inserted from the coin insertion slot 9 or the bill insertion slot 10 are received in S11 of FIG. 8. The received coins or bills are treated as a number of coins equivalent to the number of coins or the amount of the bills, based on a detection signal transmitted from the coin sensor 65 or the bill sensor 66. The number of coins is thus stored into the RAM 52 as a number of coins that can be bet on the slot machine 1.

Subsequently, in S12, IC chip data is read from the IC chip 101 located in a toy figure 100 on the mounting platform 20. As described above, the frequency of usage and type of the toy figure 100 is stored as IC chip data in the IC chip 101 located in the base 100*a*. The IC chip data is read from the IC chip 101 via the IC reader/writer 21 (S12), and the read IC chip data is stored in the RAM 52 (S13).

If no toy figure 100 is mounted on the mounting platform 20, no IC chip 101 exists either, so that the frequency of usage and type are both treated as "none" in terms of the IC chip data.

Next, in S14, a display change process is performed based on the IC chip data read from the IC chip 101. Here, the display change process is the process of changing the display in a game on the slot machine 1. In the first embodiment, during the game a background image displayed on the lower liquid crystal display 4 is changed, and a change is made so as to display, as a visual and audial effect (hereinafter, simply called an "effect"), the images of a character corresponding to the toy figure 100 and an enemy character appearing therewith. And, the display change process (S14) is performed by referring to a display change table stored in the ROM 51.

The display change table and its display examples on the lower liquid crystal display 4 will now be described in detail with reference to FIG. 9 to 12. FIG. 9 is an illustration of the display change table. FIG. 10 shows display examples on the lower liquid crystal display 4 when no toy figure 100 exists on the mounting platform 20. And, FIGS. 11 and 12 are illustrations showing display examples given when the warrior toy figure is set on the mounting platform 20.

In the first embodiment, each of displays of the player's character, the enemy character, and the background are determined and displayed based on the content of the IC chip data that has been acquired from the IC chip 101 and stored in the RAM 52 (S12 and S13) with reference to the display change table that is configured as shown in FIG. 9. That is, the display of the player's character is changed based on the type of the toy figure that is mounted, and the display of the enemy character and the background during the game are changed based on the frequency of usage of the mounted toy figure.

Referring now to FIG. 10, a description will be given of the case in which no toy figure 100 is set on the mounting platform 20 of the slot machine 1.

Figure 10A:
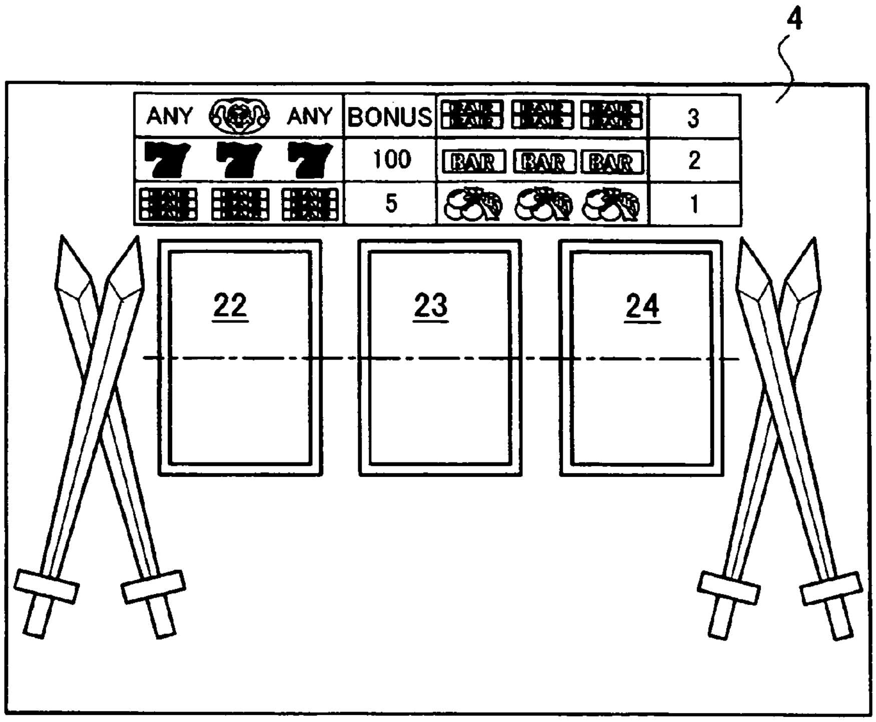
Figure 10B:
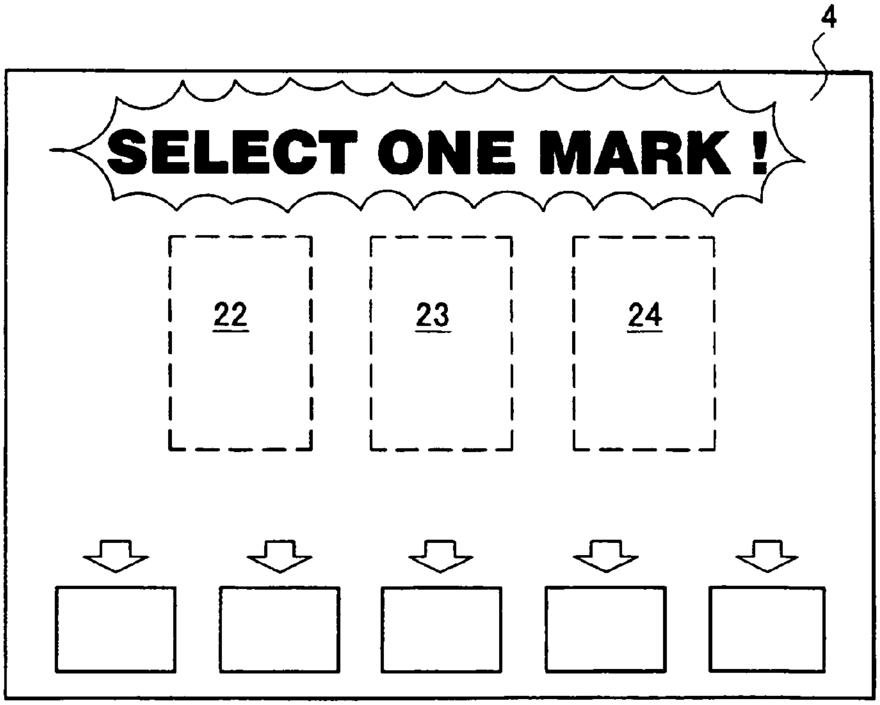

As shown in FIGS. 10A and 10B, when no toy figure 100 is mounted on the mounting platform 20, the display shown in FIG. 10A is displayed on the lower liquid crystal display 4 during the base game. During the bonus game, the display shown in FIG. 10B is displayed on the lower liquid crystal display 4.

Accordingly, the base game and the bonus game can be played even when no toy figure 100 is set on the mounting platform 20.

On the other hand, the case in which a toy figure 100 is set on the mounting platform 20 will be described in accordance with FIGS. 11A-12B. As a specific example, a description will now be given of the case in which the toy figure 100 mounted on the mounting platform 20 is the warrior toy figure.

In the slot machine 1 of the first embodiment, the background display in the base game and bonus game and the kind of a player's character and an enemy character appearing in the game varies according to the content of the IC chip data of the toy figure 100 on the mounting platform 20. That is, a character corresponding to the kind of the toy figure is displayed on the lower liquid crystal display 4, and the enemy character and the background image displayed on the lower liquid crystal display are varied in response to the frequency of usage of the toy figure.

Figure 11A:
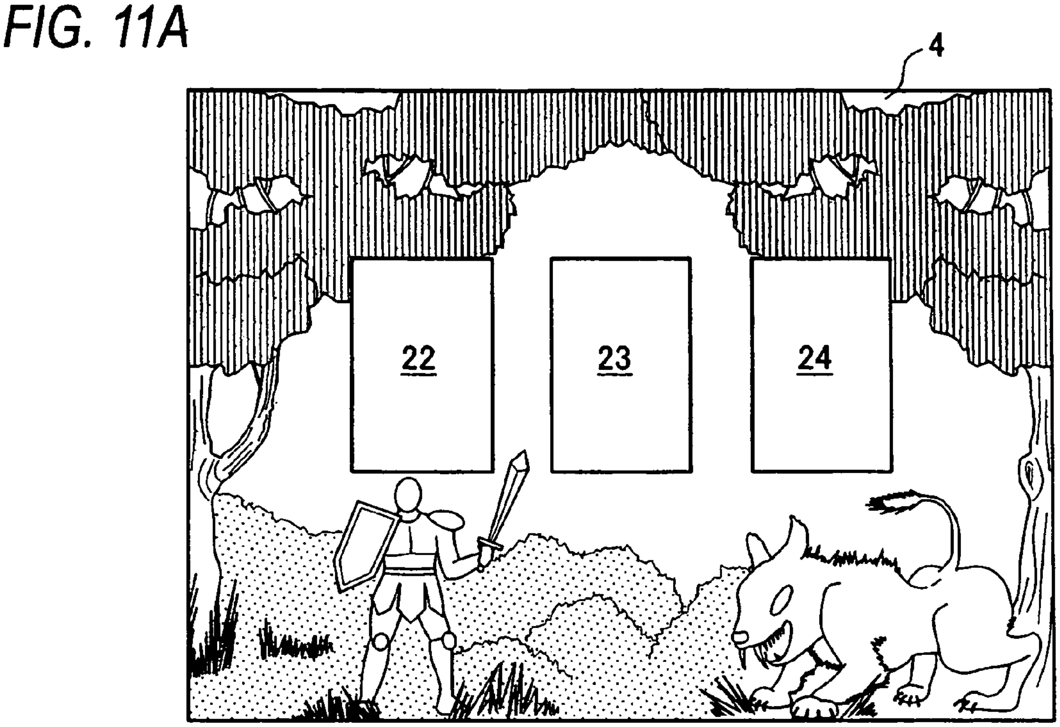

The lower liquid crystal display 4 being engaged in the base game is provided with different display from the display of the base game of FIG. 10A by referring to the content of the IC chip data of the toy figure 100 and the display change table (see FIG. 9). At the point, in the case of a frequency of usage of 100 times or less, as shown in FIG. 11A, a "jungle" image is displayed as the background image and an enemy character corresponding to an "enemy character (A)" group is displayed as the enemy character. The "enemy character (A)" group as used herein refers to a group to which a plurality of enemy characters belong, and the plurality of enemy characters are displayed at random. The "warrior character" is displayed as the player's character based on toy figure 100 type data provided in the IC chip data.

Accordingly, an effect image representing the "scenario in which a warrior goes on an adventure in the jungle while defeating enemy characters with his sword" is displayed during the base game in the case in which a warrior toy figure having a frequency of usage of 100 times or less is set on the mounting platform 20.

Figure 11B:
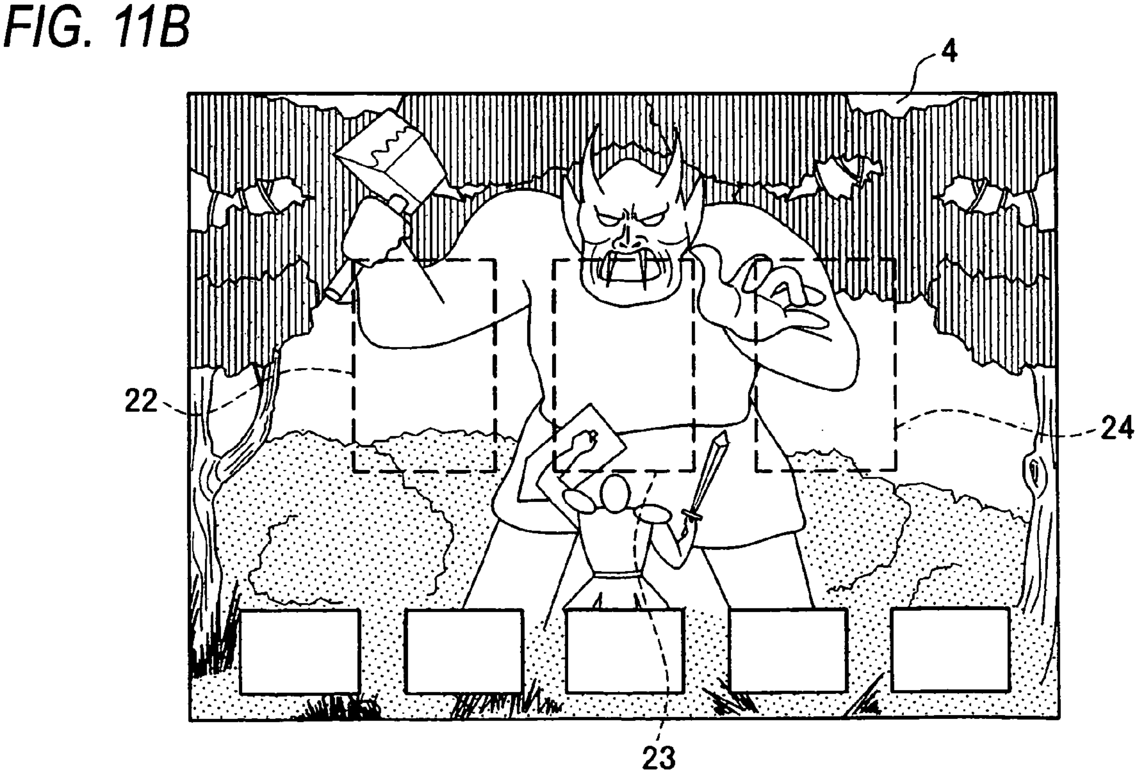

In the bonus game in the case where a warrior toy figure having a frequency of usage of 100 times or less is set on the mounting platform 20, as shown in FIG. 11B, a "jungle" image is displayed as the background image, and a "warrior character" is displayed as the player's character. Here, one boss character belongs to the aforementioned "enemy character (A)" group. Accordingly, the boss character belonging to the "enemy character (A)" group is displayed during the bonus game. No enemy character other than the boss character belonging to the "enemy character (A)" group is displayed as the bonus character. The boss character is also not displayed during the base game.

Accordingly, an effect image representing the "scenario in which the warrior fights with the boss character living in the jungle using his sword" is displayed during the bonus game in the case in which a warrior toy figure having a frequency of usage of 100 times or less is set on the mounting platform 20.

In contrast, when a warrior toy figure having a frequency of usage of 101 times or more is set on the mounting platform 20, similar to the aforementioned case in which the frequency of usage is 100 times or less, the "warrior character" is displayed as the player's character during the base game. That is, when the frequency of usage becomes 101 times or more, the background image displayed on the lower liquid crystal display 4 during the base game and the enemy character group displayed are changed from the display mode employed in the case of a frequency of usage of 100 times or less.

Figure 12A:
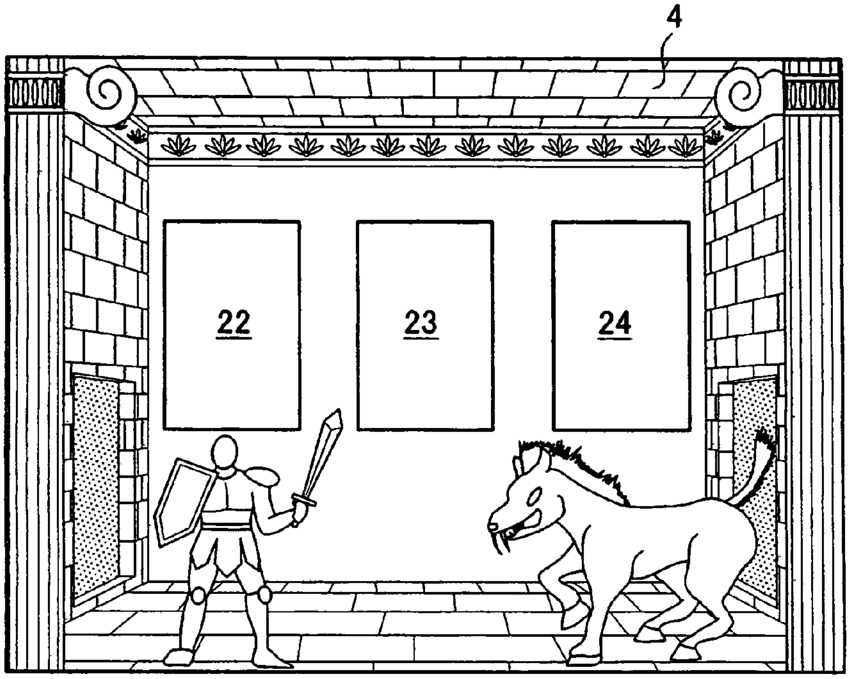

As shown in FIG. 12A, when the toy figure 100 frequency of usage becomes 101 times or more, the background image is changed from the "jungle" to an image representing a "labyrinth". In association therewith, the enemy character group is also changed from the "enemy character (A)" group to an "enemy character (B)" group.

Accordingly, when the warrior toy figure having a frequency of usage of 101 time or more is set on the mounting platform 20, as shown in FIG. 12A, an effect image representing the "scenario in which the warrior character goes on an adventure in the labyrinth while defeating the enemy characters with his sword" is displayed during the base game.

Figure 12B:
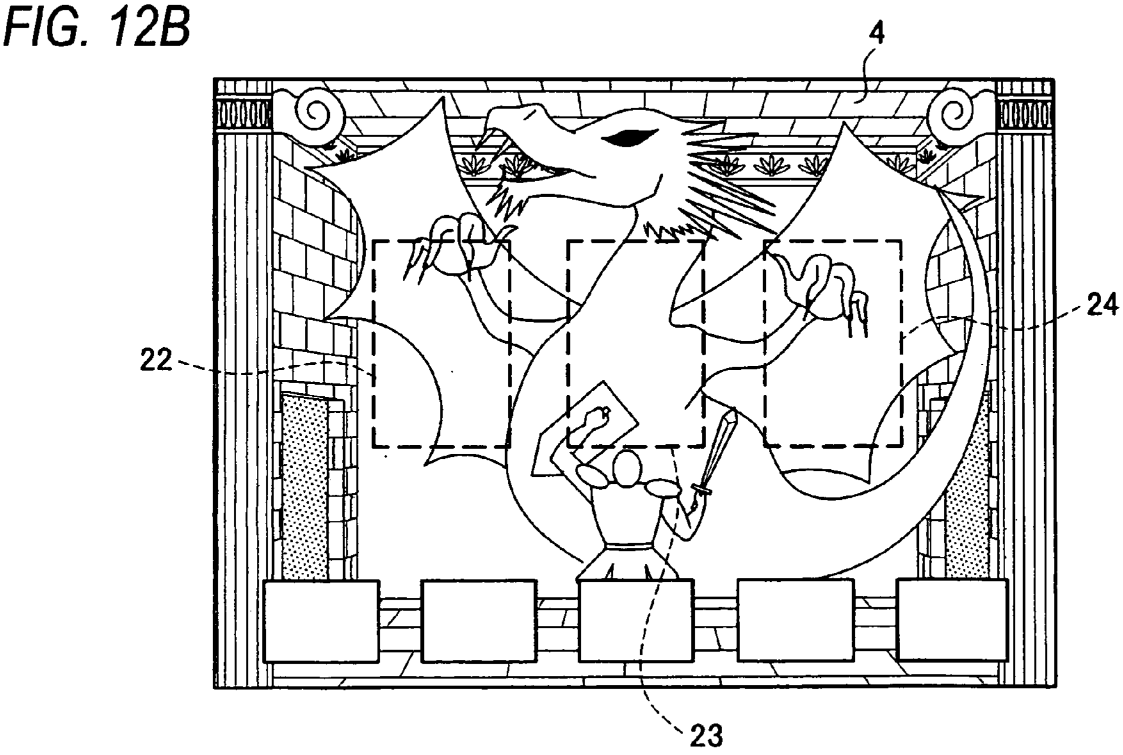

And, during the bonus game in the case where the warrior character having a frequency of usage of 101 times or more is set on the mounting platform 20, as shown in FIG. 12B, the "labyrinth" image is displayed as the background image, and the "warrior character" is displayed as the player's character. Here, similar to the aforementioned case in which the frequency of usage is 100 times or less, the boss character belonging to the "enemy character (B)" group is displayed during the bonus game.

That is, in the case, the "aspect in which the warrior character fights with the boss character using his sword" is displayed as the effect image.

When the warrior toy figure is thus used, the background image is changed from "JUNGLE" to "LABYRINTH" through continued use of the warrior toy figure, and the enemy character displayed on the lower liquid crystal display 4 is also changed in association therewith. As a result thereof, it follows that the player receives an effect having a narrative such that "a character (warrior) corresponding to the toy figure 100 recognized as a player's alter ego proceeds with an adventure as the player uses the toy figure 100." The player can thus feel attached to the toy figure and experience fresh excitement.

As a specific example, there has been described herein the case in which the warrior toy figure is set on the mounting platform 20, but the same also applies when the wizard toy figure or the archer toy figure is used. That is, when the wizard toy figure is set on the mounting platform 20, the player's character displayed during the normal and bonus games is displayed as the "wizard character". On the occasion, the manner of fighting with the enemy character is changed from "fighting with a sword" to an attacking manner peculiar to a wizard, such as "fighting by practicing magic and casting fireballs".

And, when the archer toy figure is set on the mounting platform 20, the player's character displayed during the normal and bonus games is displayed as the "archer character". In the case, the manner of fighting with the enemy character is changed to an attacking manner peculiar to an archer, such as "shooting arrows from a bow".

A character corresponding to a toy figure 100 (the "warrior toy figure", the "wizard toy figure", or the "archer toy figure") mounted on the mounting platform 20 by the player is thus displayed on the lower liquid crystal display 4. It thereby follows that a visual and audial effect is performed, while taking advantage of the feature characterized by the toy figure 100. A character corresponding to a player's toy figure 100 is displayed, allowing the player to play a game while developing an attachment to the toy figure 100 and feeling fresh excitement not previously experienced on the existing gaming machine.

As described with reference to FIGS. 9 to 12B, by referring to the display change table, the display contents on the lower liquid crystal display 4 during the normal and bonus games are changed based on the presence/absence of the toy figure 100 and the content of the IC chip data of the toy figure 100 (S14). After the display change process (S14) ends, the process proceeds to S15.

In S15, it is determined whether the START lever 17, the SPIN/REPEAT BET button 12, the 1-BET button 11, the 3-BET button 13, or the 5-BET button 14 has been operated or not. When determined that the START lever 17 or the like has not been operated (S15: NO), the process returns to S11 to repeat the aforementioned steps. On the contrary, when determined that the START lever 17 or the like has been operated (S15: YES), the process returns to the main processing program and thence proceeds to the lottery process of S2.

Figure 13:
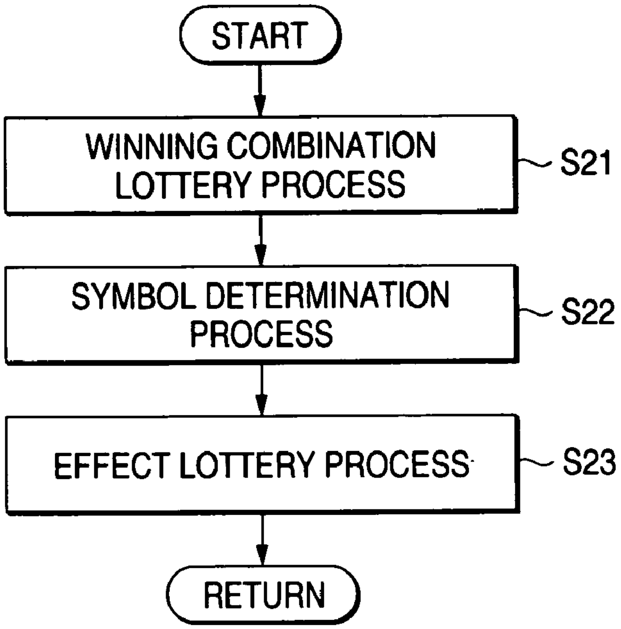
FIG. 13 is a flowchart of a lottery processing program.

A lottery processing program executed on the slot machine 1 will now be described in accordance with FIG. 13. FIG. 13 is a flowchart of the lottery processing program. The lottery process is performed in S2 of the aforementioned main processing program of FIG. 7, but in order to do so, the process first proceeds to S21 of FIG. 13 to perform a winning combination lottery process. In the winning combination lottery process (S21), the random number sampling circuit 56 samples a random number, and a winning combination is determined based on the sampled random number and the aforementioned winning combination lottery table (see FIG. 5). The stop position of each reel R is determined so as to configure the winning combination determined in the winning combination lottery process (S21), thus determining the symbols to be displayed on the activated pay line L (S22).

After the symbol determination process (S22) ends, an effect lottery process (S23) is performed. The effect lottery process is the process of determining by lottery the content of an effect to be performed at the start of rotation of the reels R during the base game. The effect lottery process and an effect lottery table will now be described with reference to the drawings.

In the slot machine 1 of the first embodiment, the effect lottery process is performed based on a random number value, obtained by the sampling circuit 56 from among the values of 0 to 127, and the effect lottery table.

Here, an effect chosen in the effect lottery process (S23) is an extremely rare effect having a high degree of scarcity and therefore is henceforth called a premier effect.

Figure 16A:
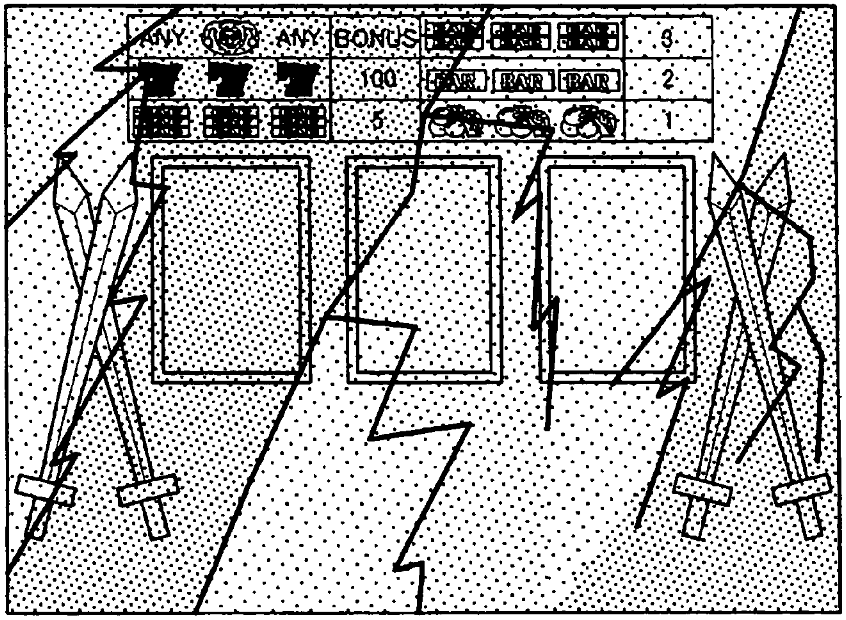

The premier effect will be described in accordance with FIG. 16A. FIG. 16A shows a base game screen displayed in the case where no toy figure 100 is mounted on the mounting platform 20. Here, when the rotation of the reels R is started, the lower liquid crystal display 4 is displayed darkened, and an effect resembling lightning across the screen is performed. Although FIG. 16A has described the screen displayed in the case in which no toy figure 100 is set on the mounting platform 20, the same effect is performed when a toy figure 100 is mounted on the mounting platform 20.

Here, as shown in FIG. 15A, the effect lottery table is configured such that the probability of an effect being performed varies according to the presence/absence and content of the IC chip data stored in the RAM 52.

First, when no toy figure 100 is set on the mounting platform 20 and no effective IC chip data is stored in the RAM 52, as shown in FIG. 15A, the premier effect is performed when the random number value obtained by the sampling circuit 56 falls within the range of 0 to 6. When the obtained random number value falls within the range of 7 to 127, no effect is performed at the start of rotation of the reels R. Accordingly, when no toy figure 100 is used, the premier effect becomes an extremely rare effect having a high degree of scarcity.

On the contrary, when the warrior toy figure is mounted on the mounting platform 20 as the toy figure 100, the probability of winning the premier effect varies according to the IC chip data of the warrior toy figure which is stored in the RAM 52. When the warrior frequency of usage is 100 times or less, the premier effect is performed if the random number value falls within the range of 0 to 20, and no effect is performed if the random number value falls within the range of 21 o 127. And, when the warrior frequency of usage is 101 times or more, the premier effect is performed if the random number value falls within the range of 0 to 39, and no effect is performed if the random number value falls within the range of 40 to 127.

The premier effect, which can only rarely be seen when no toy figure 100 is set on the mounting platform 20, can thus be seen more often by setting the warrior toy figure on the mounting platform 20.

Additionally, when the wizard toy figure or archer toy figure is used as the toy figure 100, as shown in the effect lottery table of FIG. 15A, the probability of the premier effect to be performed stays constant or increases as compared with when no toy figure 100 is used. Accordingly, the premier effect, which can hardly be seen when no toy figure 100 is used, can be seen more frequently by using the toy figure 100.

Furthermore, in any of the warrior toy figure, wizard toy figure, and archer toy figure, as shown in FIG. 15A, when the frequency of usage of the toy figure is 101 times or more, the range of random number values in which to perform the premier effect is set to the same as or wider than when the frequency of usage is 100 times or less. That is, the premier effect having a high degree of scarcity can be seen with greater frequency.

As shown in FIG. 15A, judged comprehensively, the case of a frequency of usage of 100 times or less and the case of a frequency of usage of 101 times or more differ from one another in the ranges of random numbers used for the warrior toy figure, the wizard toy figure and the archer toy figure. For example, in the warrior toy figure, the range of random number values in which the premier effect is to be performed is set at 0 to 20 when the frequency of usage is 100 times or less, and the range thereof is set at 0 to 39 when the frequency of usage is 101 times or more.

In contrast, in the wizard toy figure, the range of random number values in which the premier effect is to be performed is set at 0 to 6 when the frequency of usage is 100 times or less, and the range thereof is set at 0 to 20 when the frequency of usage is 101 times or more. The range of random number values in which the premier effect is to be performed, i.e., the occurrence probability of the premier effect thus varies according to the type of toy figure such as the warrior toy figure. Therefore, the exhibits the feature in which the type of toy figure 100 provides a difference in the occurrence probability of the premier effect, and it thus follows that the player sees the premier effect with a probability responsive to the player's toy figure 100. That is, the player can enjoy seeing a new variety in the frequency of occurrence of the premier effect by selecting the type of the toy figure 100.

In the effect lottery process (S23), the presence/absence of the premier effect performed at the end of rotation of the reels R is determined based on the effect lottery table determined by the IC chip data stored in the RAM 52 and the random number values acquired by the sampling circuit 56. The lottery process (S2) is thereafter terminated and the process returns to the main processing program.

Figure 14:
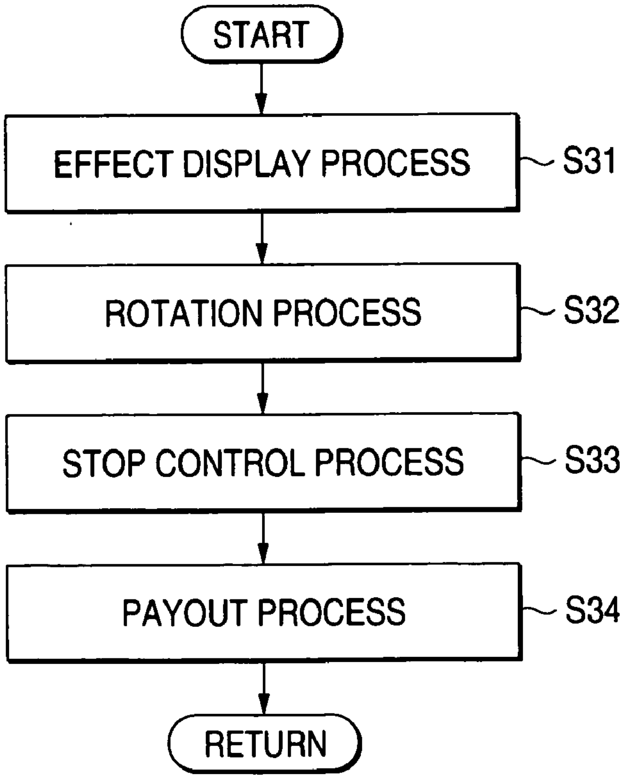
FIG. 14 is a flowchart of a base game processing program.

A base game processing program to be executed on the slot machine 1 will now be described in accordance with FIG. 14. FIG. 14 is a flowchart of the base game processing program. The base game process is performed in S3 of the aforementioned main processing program of FIG. 7.

First, in S31, the effect display process is performed based on the switch signal which, transmitted from the START switch 57, the SPIN/REPEAT BET switch 58, the 1-BET switch 59, the 3-BET switch 60, or the 5-BET switch 61, has been received in the aforementioned S15 of FIG. 7 and based on the lottery result of the effect lottery process (S23).

Here, if the effect lottery process (S23) is won, the premier effect (see FIG. 15A) is performed based on the aforementioned switch signal (S31) and the rotation of the reels R is initiated (S32). Conversely, if the effect lottery process (S23) is not won, the process proceeds directly to S32 to start the rotation of the reels R (S32).

When the rotational drive of the reels R is started (S32) and the symbols are scrolled in the variable display windows 22 to 24, a stop control process is performed in S33. In the stop control process (S33), the rotation of the reels R is stopped so that the symbols determined in the symbol determination process (S22) are displayed stopped on the activated pay line L.

And, in S34, based on the table of FIG. 5, coins or the like, equivalent to the pre-set award, are paid out in accordance with the combination of symbols displayed stopped on the activated pay line L in the variable display windows 22 to 24 in S42, i.e., the winning combination determined in the winning combination lottery process (S21). After such a process of S34, the process returns to the aforementioned main processing program of FIG. 14.

A brief description will now be given of the bonus game on the slot machine 1 of the first embodiment. The bonus game executed on the slot machine 1 is a game which the player can play without using any actual coins. And, in such a bonus game, as shown in FIGS. 10B, 11B, and 12B), five option symbols are displayed on the lower liquid crystal display 4. The player presses one of these five option symbols with a finger or the like, thereby causing the bonus game to proceed. The option symbols have related thereto three kinds of bonus contents and two "LOSSES", and the bonus game ends with winning of all the three kinds of bonuses or selection of the LOSSES. The configuration is such that the selected option symbol cannot be selected again during one bonus game.

In the first embodiment, the aforementioned three kinds of bonus contents consist of "20 coins won", "10 coins won", and "5 coins won". Accordingly, once the bonus game is played, a maximum of 35 coins can be won.

Figure 18:
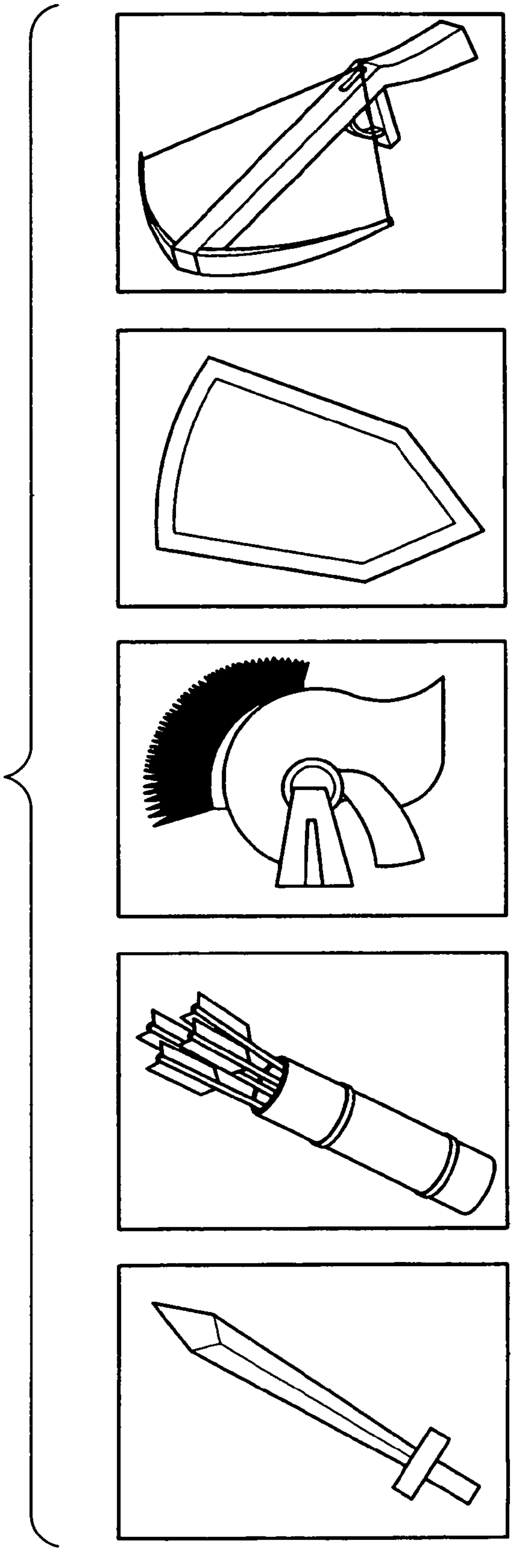
FIG. 18 is a display examples of option symbols displayed during the bonus game when the warrior toy figure is used.
Figure 19:
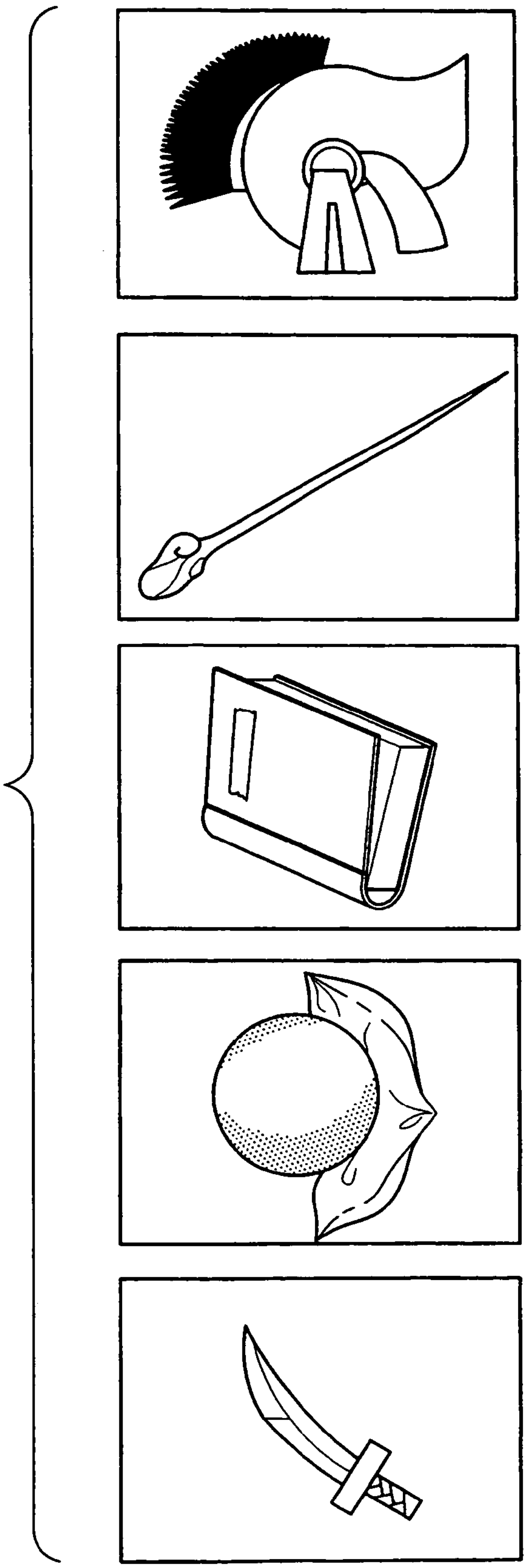
FIG. 19 is a display examples of option symbols displayed during the bonus game when the wizard toy figure is used.

The option symbols displayed during the bonus game will now be described with reference to the drawings. FIGS. 18 and 19 are illustrations showing examples of the option symbols. Here, the option symbols are stored in the image ROM 82. In the first embodiment, as shown in FIGS. 18 and 19, nine kinds of option symbols exist: "SWORD", "SHIELD", "HELMET", "STAFF", "CRYSTAL BALL", "MAGIC BOOK", "BOW", "ARROW", and "KNIFE".

And, these option symbols are related to the types of toy figures. That is, three kinds of option symbols, "SWORD", "SHIELD", and "HELMET", are related to the "warrior toy figure", three kinds of option symbols, "STAFF", "CRYSTAL BALL", and "MAGIC BOOK", to the "wizard toy figure", and three kinds of option symbols, "BOW", "ARROW", and "KNIFE", to the "archer toy figure".

Figure 17:
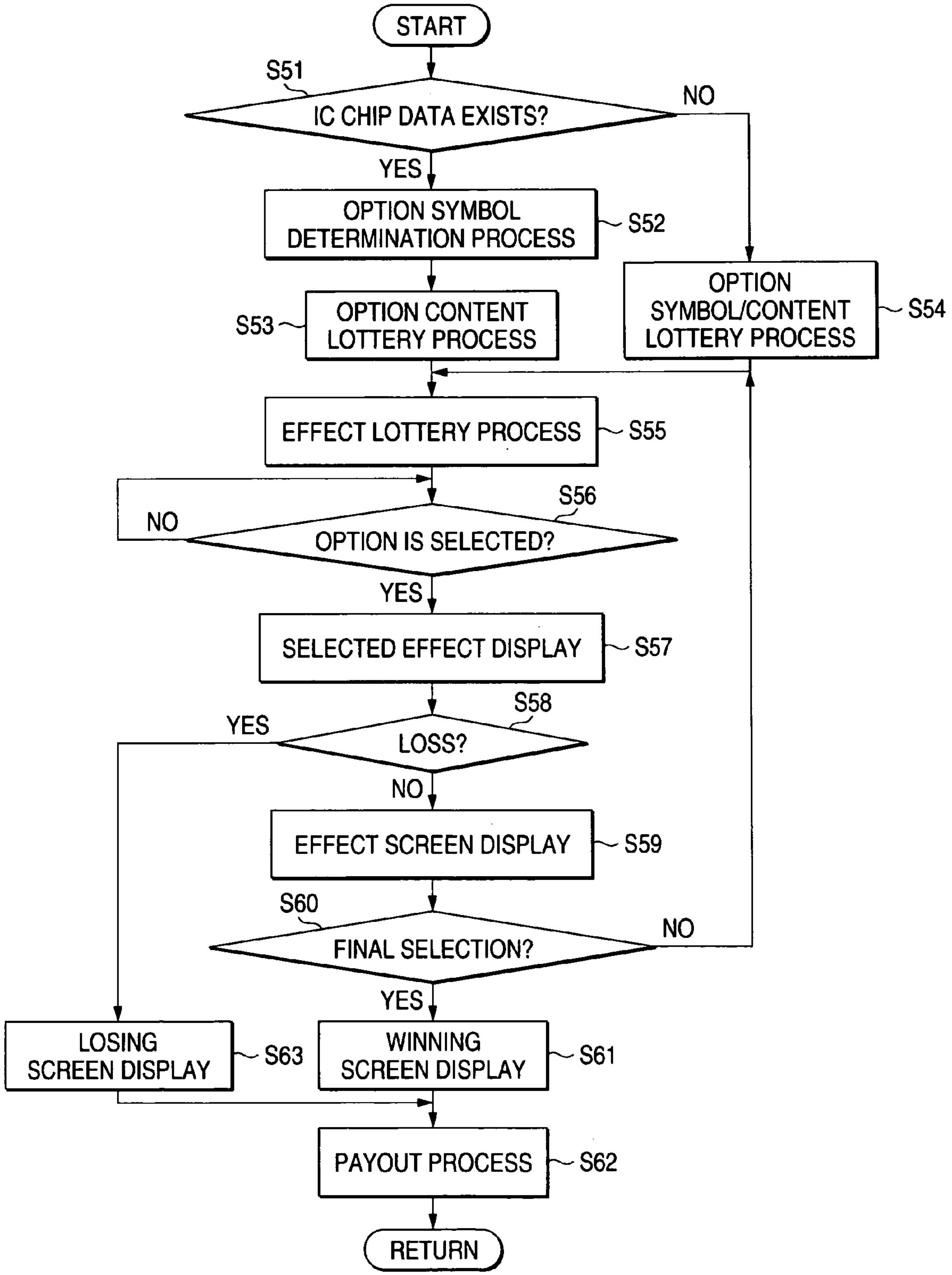
FIG. 17 is a flowchart of a bonus game processing program.

The bonus game processing program executed in S5 of the main processing program will subsequently be described in accordance with FIG. 17. FIG. 17 is a flowchart of the bonus game processing program. If it is determined in S4 of the main processing program that the trigger to the bonus game is established (S4: YES), the process proceeds to 5S to perform the bonus game process. However, at the point, first, the process proceeds to S51 of the bonus game processing program to determine whether or not the IC chip data is stored in the RAM 52. If the IC chip data is stored in the RAM 52 (S51: YES), i.e., if a toy figure 100 is set on the mounting platform 20, the process proceeds to S52 to perform an option symbol determination process. Conversely, if the IC chip data is not stored in the RAM 52 (S51: NO), i.e., if a toy figure 100 is not set on the mounting platform 20, the process proceeds to S54 to perform an option symbol/content lottery process.

The option symbol determination process is performed in S52. Here, the option symbol determination process is the process in which three kinds out of five kinds of option symbols displayed are selectively determined by priority based on the IC chip data stored in the RAM 52, and in which the remaining two option symbols are determined at random from the remaining option symbols.

The option symbol determination process (S52) will now be described with a specific example. For example, when "WARRIOR" is stored as the type data of the IC chip data, in the option symbol determination process (S52), first, three kinds of option symbols ("SWORD", "SHIELD", and "HELMET") related to "WARRIOR" are selected as the symbols to be displayed as three of the five option symbols in the bonus game. And, as the remaining two option symbols to be displayed in the bonus game, two kinds of option symbols are selected at random from among option symbols that are not related to "WARRIOR". That is, two kinds of option symbols are selected at random from among the six kinds: the option symbols "STAFF", "CRYSTAL BALL", and "MAGIC BOOK" related to "WIZARD" and the option symbols "BOW", "ARROW", and "KNIFE" related to "ARCHER". FIG. 18 shows the case in which the warrior toy figure is set on the mounting platform 20 and in which the option symbols "SWORD", "SHIELD", and "HELMET" related to "WARRIOR" and the option symbols "BOW" and "ARROW" selected at random from the remaining option symbols are displayed in the bonus game.

Alternatively, when "WIZARD" is stored as the type data of the IC chip data, in the option symbol determination process (S52), first, three kinds of option symbols ("STAFF", "CRYSTAL BALL", and "MAGIC BOOK") related to "WIZARD" are selected as the symbols to be displayed as three of the five option symbols in the bonus game. And, as the remaining two option symbols to be displayed in the bonus game, two kinds of option symbols are selected at random from among the option symbols which are not related to "WIZARD". That is, two kinds of option symbols are selected at random from among the six kinds: the option symbols "SWORD", "SHIELD", and "HELMET" related to "WARRIOR" and the option symbols "BOW", "ARROW", and "KNIFE" related to "ARCHER". FIG. 19 shows the case in which the wizard toy figure is set on the mounting platform 20 and in which the option symbols of "STAFF", "CRYSTAL BALL", and "MAGIC BOOK" related to "WIZARD" and the option symbols of "HELMET" and "KNIFE" selected at random from the remaining option symbols are displayed in the bonus game.

After the five kinds of option symbols to be displayed in the bonus game are thus determined in the option symbol determination process (S52), the process proceeds to an option content lottery process (S53). In the option content lottery process (S53), the three kinds of bonus contents ("20 COINS WON", "10 COINS WON", and "5 COINS WON") and two "LOSSES" are related to the determined five option symbols. The bonus contents "20 COINS WON", "10 COINS WON", and "5 COINS WON" are henceforth indicated by "+20", "+10", and "+5", respectively.

The option symbols determined in the option symbol determination process (S52) include three kinds of option symbols related to a toy figure 100 set on the mounting platform and two other kinds of option symbols. First, in the option content lottery process, the two "LOSSES" are related to the other two kinds of option symbols having a remote relationship to the toy figure 100. And, out of the option symbols related to the toy figure 100, "which symbol is to be related to which bonus content" is determined by lottery using the sampling circuit 56.

An option content lottery table will now be described with a specific example by referring to FIG. 20. The case in which the warrior toy figure is set as the toy figure 100 will first be described as the specific example with reference to FIG. 20A. As shown in FIG. 20A, the option content lottery table shows the case in which the warrior toy figure is set on the mounting platform 20, and the option symbols which determine the option contents by lottery are therefore "SWORD", "SHIELD", and "HELMET", related to the warrior toy figure. And, patterns by which the three kinds of bonus contents ("+20", "+10", and "+5") are related thereto are determined based on random number values obtained from the sampling circuit 56.

That is, when the random number value obtained as a result of a random number lottery using the sampling circuit 56 falls within the range of 0 to 42, bonus contents are related to three kinds of option symbols in pattern (A). Here, in the case of pattern (A), the bonus contents "+10", "+20" and "+5" are related to the option symbols "SWORD", "HELMET", and "SHIELD", respectively. And, when a random number value obtained as a random number lottery result falls within the range of 43 to 85, pattern (B) is employed in which "+5", "+10" and "+20" are related to "SWORD", "HELMET", and "SHIELD", respectively. Similarly, when a random number value obtained as a random lottery result falls within the range of 86 to 127, pattern (C) is employed in which "+20", "+5" and "+10" are related to "SWORD", "HELMET", and "SHIELD", respectively.

On the other hand, when the wizard toy figure is set as the toy figure 100, the three kinds of option symbols "STAFF", "CRYSTAL BALL", and "MAGIC BOOK" are related to the bonus contents "+20", "+10", and "+5". Similar to the aforementioned case of the warrior toy figure, two kinds of option symbols having a remote relationship to the wizard toy figure are related to "LOSSES".

The option content lottery table shown in FIG. 20B is used when the wizard toy figure is used. When the random number value obtained as a result of a random number lottery using the sampling circuit 56 falls within the range of 0 to 42, bonus contents are related to three kinds of option symbols in pattern (A). Here, in the case of pattern (A), the bonus contents "+10", "+20" and "+5" are related to the option symbols "STAFF", "CRYSTAL BALL", and "MAGIC BOOK", respectively. And, when the random number value obtained as a random number lottery result falls within the range of 43 to 85, pattern (B) is employed in which "+5", "+10" and "+20" are related to "STAFF", "CRYSTAL BALL", and "MAGIC BOOK", respectively. Similarly, when the random number value obtained as a random lottery result falls within the range of 86 to 127, pattern (C) is employed in which "+20", "+5" and "+10" are related to "STAFF", "CRYSTAL BALL", and "MAGIC BOOK", respectively.

A similar option content lottery table exists even in the case of the archer toy figure being used, and the bonus contents "+20", "+10" and "+5" are related to the three option symbols "BOW", "ARROW", and "KNIFE" in any of patterns (A), (B), and (C). On the occasion, the case is also the same as the aforementioned cases in that "LOSSES" are related to the two kinds of option symbols having a remote relationship to the archer toy figure.

After the three kind of bonus contents and two "LOSSES" are related to five kinds of option symbols in the aforementioned manner, the display positions (see FIGS. 11B and 12B) of the five kinds of option symbols on the lower liquid crystal display 4 are determined at random. The five kinds of option symbols are then displayed at the determined display positions on the lower liquid crystal display 4. After the five kinds of option symbols are thus displayed, the process proceeds to S55.

On the other hand, the option symbol/content lottery process is performed in S54 to which the process proceeds when the IC chip data is not stored in the RAM 52. In the option symbol/content lottery process (S54), five kinds of option symbols are selected from all the kinds of option symbols (nine kinds), and the three kinds of bonus contents and the two "LOSSES" are related to the selected five kinds of option symbols. That is, since the five kinds of option symbols are selected completely at random from the nine kinds, there is no clue given, such as the relationship between the option symbols and the toy figure 100, thus making it more difficult to win the bonus.

And, after the display positions (see FIG. 10B) of the five kinds of option symbols on the lower liquid crystal display 4 are determined, the five kinds of option symbols are displayed on the lower liquid crystal display 4, and the process then moves to S55.

In S55, an effect lottery process is performed. A lottery process regarding an effect to be performed upon selection of option symbols is performed in the effect lottery process (S55). In the effect to be performed upon the selection of option symbols, similar to the aforementioned effect performed at the start of rotation of the reels R during the base game, the lower liquid crystal display 4 is displayed slightly darkened, and a premier effect resembling lightning is performed.

The effect lottery table used in the effect lottery process (S55) will now be described with reference to the drawings. FIG. 15B is the effect lottery table used during the bonus game. Similar to the effect lottery table used during the base game which has been described with reference FIG. 15A, the presence/absence of the premier effect is determined by lottery based on a random number value obtained from the sampling circuit 56. When no toy figure 100 is set on the mounting platform 20, as during the base game, the premier effect is performed only when the random number value falls within the range of 0 to 6. Accordingly, the premier effect is very rarely performed and thus becomes extremely rare.

And, when the toy figure 100 is set on the mounting platform 20, the premier effect is performed during the bonus game with a higher probability than when no toy figure 100 is set.

Besides, a random number value range as to a frequency of usage of 100 times or less and a frequency of usage of 101 times or more is set for each of the warrior, wizard, and archer toy figures. And, each random number range in which to perform the premier effect is set different as per the kind of toy figure 100. Therefore, it follows that each kind of toy figure 100 has its own characteristics, so that the player can play in a variety of modes by selecting a toy figure 100.

After the effect lottery process (S55), it is determined in S56 whether an option has been selected or not. Specifically, it is determined whether an option has been selected by pressing, with a finger or the like, any of five option symbols visible via the transparent touch panel 30 disposed in front of the lower liquid crystal display 4. If a portion of the transparent touch panel 30 which corresponds to an option symbol is pressed with a finger and the option symbol is thus selected (S56: YES), the process proceeds to selected effect display (S57). Conversely, if an option symbol is not selected (S56: NO), the process is put on standby until an option symbol has been selected.

Figure 16B:
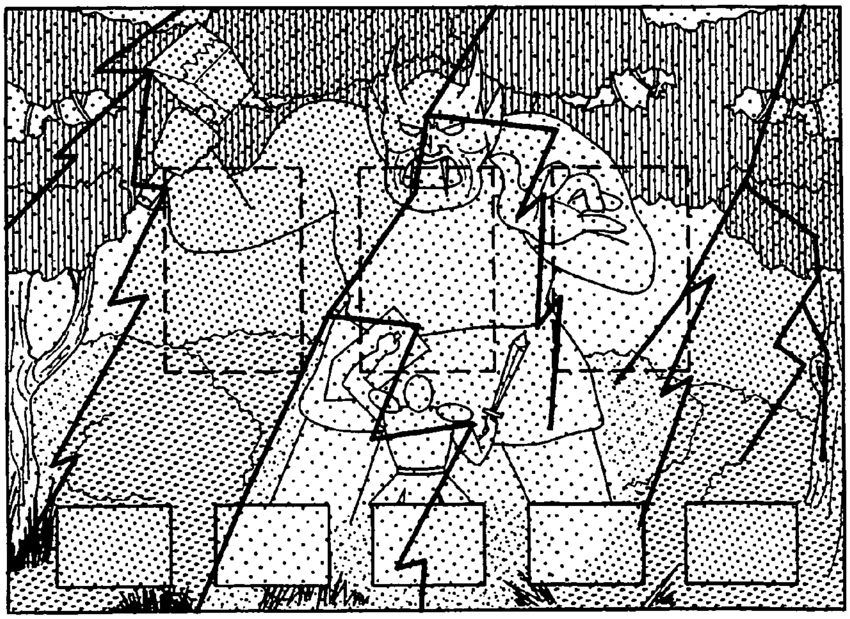

In the selected effect display (S57), first, as an option symbol is selected, the premier effect shown in FIG. 16B is performed based on the result of the effect lottery process (S56). That is, when the premier effect is won, the premier effect is performed on the lower liquid crystal display 4 (see FIG. 16B)) Thereafter, an image corresponding to an option content (out of three kinds of bonuses and two losses) related to the option symbol selected in S52, S53, or S54 is displayed. Here, when a bonus is won, the number of coins is stored in the RAM 52 based on the kind of bonus won.

On the contrary, when the premier effect is not won, the premier effect is not performed, and an image corresponding to an option content (three kinds of bonuses and two losses) related to the option symbol selected in S52, S53, or S54 is displayed.

It is determined in S58 whether the option content of the option symbol selected by the player falls under “LOSS” or not. If the option content falls under “LOSS” (S58: YES), the process proceeds to S63 to perform a losing screen display. Here, in the losing screen display, a display such as “YOU LOSE” is performed in a central portion of a bonus game screen (see FIGS. 10(*b*), 11(*b*), and 12(*b*)) regardless of the presence/absence of the toy figure 100. After the losing screen display (S63) ends, the process proceeds to S62.

The losing screen display is only one example, and any configuration may be adopted as long as the player can recognize having failed to win a bonus. Besides, in the first embodiment, when the toy figure 100 exists, the bonus game proceeds based on the scenario in which the player’s character fights with the boss character. Therefore, the aforementioned losing screen may be displayed after displaying a moving image indicating that the player’s character has been defeated by the attack of the boss character.

Conversely, if the option content does not fall under “LOSS”, i.e., if any one of the three kinds of bonuses is won (S58: NO), the process proceeds to an effect screen display (S59).

In the effect screen display (S59), an image indicating that a bonus has been won is displayed on the lower liquid crystal display 4.

In the first embodiment, the bonus game proceeds based on the scenario in which the player’s character fights with the boss character. Therefore, a moving image, indicating the scenario in which the player’s character attacks the boss character and the boss character is injured by the attack, is displayed before the display indicating that a bonus has been won is performed. And, the display indicating that the bonus has been won is thereafter displayed in the bonus game screen (see FIGS. 11B and 12B) of the lower liquid crystal display 4.

The attacking manner of the player’s character differs according to the kind of toy figure 100, and in the case of the warrior, it attacks with “SWORD”. Besides, in the case of the wizard, it attacks with “MAGIC”, and in the case of the archer, it attacks with “BOW and ARROW”.

On the other hand, if no toy figure exists, a display indicating that a bonus has been won is directly performed in the center portion of the bonus game screen (see FIG. 10B).

After the effect screen display (S59) ends, it is determined in S60 whether the selection is final or not. To describe the “final selection” here, the three kinds of bonuses (“+20”, “+10”, and “+5”) can be won in the bonus game of the first embodiment. And, out of five option symbols, the other two are “LOSSES”, so that selection of option symbols can be performed a maximum of three times. That is, the “final selection” used in the first embodiment refers to the “third selection”.

If the selection is final (S60: YES), the process proceeds to S61. On the contrary, if the selection is not final (S60: NO), the process returns to the effect lottery process (S55) to repeat the steps.

In S61, a winning screen display is performed on the lower liquid crystal display 4. To describe the winning screen display here, the winning screen display is the “screen displayed when the player has won all the three kinds of bonus in the bonus game.” In the case as well, similar to the aforementioned effect screen display (S59) and the losing screen display (S63), the mode of winning screen display differs depending upon the presence or absence of a toy figure 100.

If the toy figure 100 is absent (not mounted), the display indicative of “celebration for winning all the three kinds of bonus” is performed on the bonus game screen (see FIG. 10B).

On the contrary, if the toy figure 100 is present, the scenario in which the player’s character fights with the boss character is displayed on the bonus game screen (FIGS. 11B and 12B). In the case, after the image in which the boss character is defeated is displayed on the bonus game screen (FIGS. 11B and 12B), the display indicative of “celebration for winning all the three kinds of bonus” is performed. After the winning screen display (S61) is displayed, the process proceeds to S62.

Here, if “LOSS” is not chosen even in the third selection (S59: NO), the image in which the player’s character attacks the boss character with its own attacking manner is displayed on the lower liquid crystal display 4, and the display indicating that a bonus has been won is performed. The image in which the boss character is defeated is displayed thereafter, thus increasing the narrativity of the effect (depth of the storyline) in which "the boss character is defeated by the attack of the player's character resulting from the third selection." Therefore, the can further concentrate the player on the game.

A payout process is performed in S62 to which the process proceeds after the winning screen display (S61) or after the losing screen display (S63). Coins won in the round of the bonus game are then paid out in the payout process (S62). The sum of won bonuses (a number of coins) stored in the RAM 52 in the selected effect process (S57) is read, and the number of coins read is paid out. After the payout process (S62) ends, the bonus game processing program is terminated, and the process then moves to the IC chip data update process (S6) of the main processing program.

As described in detail above, the slot machine 1 reads IC chip data via the IC reader/writer from the IC chip 101 provided in the toy figure 100 on the mounting platform 20, and then stores the read IC chip data in the RAM 52. And, based on the IC chip data, the slot machine 1 selects the effect lottery table for determining the presence/absence of the premier effect, and thereby performs a lottery. Therefore, the frequency of occurrence of the premier effect differs according to the toy figure 100 which the player sets on the mounting platform 20.

Thus, by using the toy figure 100, the player can frequently see the premier effect that can only rarely be seen when the toy figure 100 is not used. Accordingly, the slot machine 1 of the first embodiment can provide fresh entertainment to the player using the toy figure 100.

Furthermore, the effect lottery tables are created separately for the base game and the bonus game. And, in each effect lottery table, the range of random number values is set such that the frequency in which the premier effect is performed differs based on the type and frequency of usage of the toy figure 100. Accordingly, in the slot machine 1, the frequency in which the premier effect is performed differs for each toy figure 100 which the player uses.

As a result, the toy figure 100 is configured to have its own individuality, thus allowing the player to form an attachment to his/her own toy figure 100. Particularly, the frequency of occurrence of the premier effect varies based on the frequency of usage, so that the player uses the toy figure 100 and thereby feels as if the toy figure 100 matures. Therefore, the player feels a strong attachment to the toy figure 100 and takes a fresh interest not previously experienced with the existing gaming machine.

The slot machine 1 as described above as the first embodiment maybe modified in various ways without departing from the scope of the present invention.

For example, the slot machine 1 uses only the effect tables shown in FIG. 15 to draw the premier effect, but maybe configured to use even the effect lottery tables shown in FIG. 21. The effect lottery tables shown in FIG. 21 are the effect lottery tables used during the base game after the bonus game ends.

Accordingly, the effect lottery tables are used until the bonus game is executed. After the bonus game ends, the effect lottery tables shown in FIG. 21 are configured to be preferentially used instead of the effect lottery table used during the base game shown in FIG. 15A. As shown in FIG. 21, the effect lottery table shown in FIG. 12A is used between rounds 1 and 100 of the base games after the bonus game ends, and the effect lottery table shown in FIG. 12B is used between rounds 101 and 200 of the base game after the bonus game ends. The effect lottery table shown in FIG. 21C is used between rounds 201 and 300 of the base game after the bonus game ends, therein performing the effect lottery process (S23).

The slot machine 1 may be configured as follows. That is, if a transition is made to the bonus game while the base game is being played between rounds 1 and 300 after the bonus game ends, the effect lottery table shown in FIG. 15B is used in the effect lottery process during such a bonus game. And, during the base game after the bonus game ends, the effect lottery table shown in FIG. 12A is used to perform the effect lottery process.

Accordingly, the use of the effect lottery tables shown in FIGS. 21A-21C creates a clear difference in each toy figure 100. Therefore, a player using a toy figure 100 can be better entertained with the slot machine 1 than a player using no toy figure 100.

The slot machine 1 of the first embodiment uses a toy figure 100 having an IC chip 101 as a reading object, but is not limited to using such a toy figure. For example, the slot machine 1 may use a card, as a reading object, having a recording medium such as an IC chip. For example, the slot machine 1 may be configured to use a trading card (reading object) having an IC chip.

In the first embodiment, the kind of toy figure 100 has been has been described illustrating as an example the three kinds "WARRIOR", "WIZARD", and "ARCHER", but is not limited thereto. Toy figures created along another theme may be used, or a larger number of toy figures 100 may be usable on the slot machine 1.

In the first embodiment, the IC chip data stored in the IC chip 101 includes the type and frequency of usage of the toy figure 100, but is not limited thereto. That is, more detailed data such as "sex", "race", and "age" may also be used as data indicative of type.

In the first embodiment, the configuration is such that the effect lottery table is changed at two stages of less than 101 times and 101 times or more in the frequency of usage of the toy figure 100, but is not limited thereto. The configuration may be such as to change the effect lottery table at a greater number of stages based on the frequency of usage of the toy figure 100.

The frequency of usage is not limited to the mode of counting the frequency of usage of the toy figure 100 per game. For example, the frequency of usage may be replaced with the frequency of defeating the boss character in the bonus game (the frequency of winning all the three kinds of bonuses in the bonus game). In the case, tension mounts at the time of selecting option symbols during the bonus game, thus making it possible to concentrate the player on the game.

The effect lottery table may be configured to be changed, not based on the frequency of usage of the toy figure 100, but based on a total playing time on the slot machine 1 using the toy figure 100.

In the first embodiment, the configuration may be such that the IC chip data including the type and frequency of usage of the toy figure 100 is stored in the IC chip 101 provided in the toy figure 100, and such that the IC chip data is read/written to update the data. Alternatively, the operation may be realized by a system provided with the slot machine 1 and a server.

In other words, information (so-called ID data) for identifying the IC chip 101 is pre-stored in the IC chip 101. And, the slot machine 1 reads the ID data and then accesses the server, and thus acquires data including the type and frequency of usage of a toy figure 100 corresponding to the ID data. The slot machine 1 need only be configured to transmit the frequency of usage of the toy figure 100 to the server at the end of the game and thereby prompt the server to update the frequency of usage.

As described in detail above, in the slot machine 1 of the first embodiment, when no toy figure 100 is used, five kinds of option symbols and their contents are determined completely at random.

In contrast, when the toy figure 100 is used, the IC chip data is read via the IC reader/writer 21 from the IC chip 101 disposed in the toy figure 100 on the mounting platform 20, and is stored in the RAM 52. And, in the bonus game, the five kinds of option symbols are displayed, as options, on the lower liquid crystal display 4.

As for three kinds out of these five kinds of option symbols, based on the type information stored in the IC chip data, it is determined to preferentially use, as the option symbols, option symbols having a close relationship to the type of the toy figure 100. And, any of three kinds of bonuses are related to the option symbols having a close relationship to the toy figure 100.

On the other hand, option symbols having a remote relationship to the type of the toy figure 100 are selected at random as the remaining two kinds of option symbols, and these option symbols are related to "LOSSES".

Accordingly, by using the toy figure 100, the player can more efficiently win a bonus than when no toy figure 100 is used, which therefore can fulfill a player's demand and thus increase the level of excitement.

Furthermore, with any toy figure 100 of the "warrior toy figure", the "wizard toy figure", and the "archer toy figure", it is possible to proceed with the bonus game and win a bonus, so that a toy figure 100 to the player's taste can be used. That is, the slot machine 1 can provide fresh entertainment by employing the toy figure 100, not experienced in the existing gaming machine.

In the first embodiment, the mode is adopted in which three kinds of option symbols are related to three kinds of bonuses regardless of the type of toy figure 100. Alternatively, the number in which option symbols are related to bonuses may be changed in response to the type of toy figure 100. For example, three kinds of symbols of "STAFF", "CRYSTAL BALL", and "MAGIC BOOK" are present as the option symbols related to the wizard, but the configuration may be such that bonuses are related to "STAFF" and "CRYSTAL BALL", and such that a loss is related to "MAGIC BOOK". On the occasion, the remaining bonuses have a remote relationship to the wizard, and are thus related to option symbols selected at random.

In the case, it follows that the degree of difficulty of the bonus game is varied depending on the type of toy figure 100, which can satisfy even the player who wishes to feel a sense of tension during the bonus game.

The slot machine 1 of the first embodiment reads IC chip data via the IC reader/writer from the IC chip 101 located in a toy figure on the mounting platform 20, and then stores the IC chip data in the RAM 52. And, by referring to the IC chip data and display change table, the slot machine 1 changes the character acting in the lead role, enemy character, and background image. Therefore, the mode of an effect performed on the lower liquid crystal display 4 during the game varies depending on the toy figure 100 set on the mounting platform 20 by the player.

Accordingly, by using a toy figure 100, the player can play a game with a different display from when no toy figure is used. That is, the player using a toy figure 100 can be provided with fresh entertainment.

Furthermore, the character displayed in the lead role in an effect performed on the lower liquid crystal display 4 is changed in response to the kind of the toy figure 100 (the "warrior toy figure", the "wizard toy figure", or the "archer toy figure"), so that the player can become more immersed in the game.

Besides, in each toy figure 100 is stored the frequency of usage of the toy figure 100, and the mode of an effect performed on the lower liquid crystal display 4 ("background image" and "enemy character") is changed based on the frequency of usage.

In the first embodiment, the aspect is displayed in which a character ("warrior" or the like) displayed in response to a toy figure 100 meet adventures. Therefore, the adventure location is changed or the enemy character is changed through continued use of the toy figure 100. The can cause the player to feel as if the adventure of his/her character proceeds through continued use of the toy figure 100, thus allowing the effect to have narrativity.

As a result, the can lead the player to have expectations of how the effect displayed on the lower liquid crystal display 4 will progress if the player continues to use the toy figure 100, which can lead the player to further continue the game. The leads the result of the player feeling new excitement, and also produces the advantageous effect that a shop having installed the gaming machine of the first embodiment experiences an increased frequency of use of such a gaming machine.

Second Embodiment

Hereinbelow, a slot machine 500 according to a second embodiment will be described with reference to the drawings.

In the following description and drawings for the second embodiment, parts the same as those in the first embodiment are denoted by the same reference numerals as those in the first embodiment, and detailed description of the parts and configurations the same as those in the first embodiment will be omitted.

Figure 22:
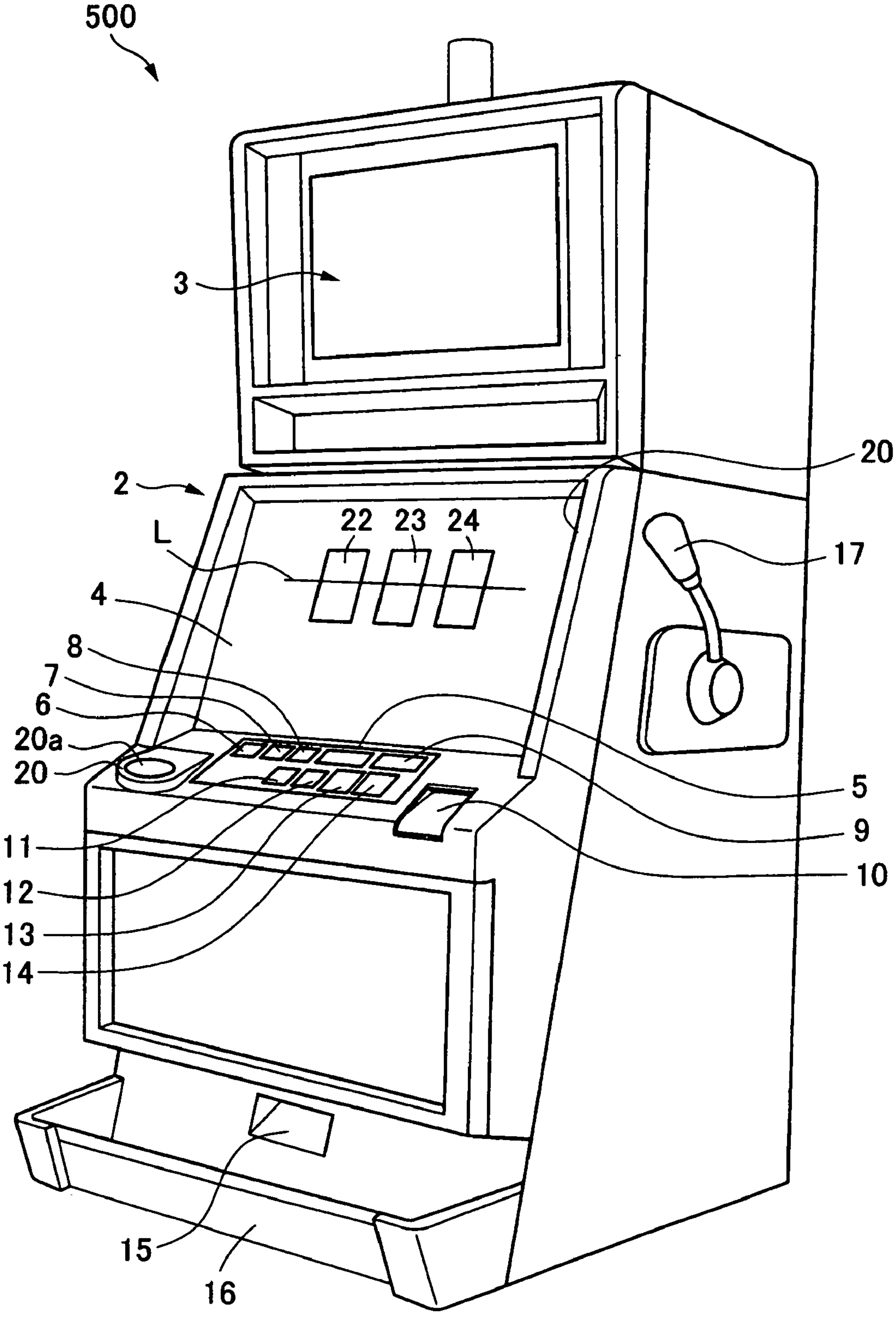
FIG. 22 is a perspective view of a slot machine according to a second embodiment.

The slot machine 500 according to the second embodiment is shown in FIG. 22. FIG. 22 is a perspective view of the slot machine 500.

In the second embodiment, the toy figure 100 is configured to be attachable thereto one or more of accessories 103 that serves as a subsidiary toy figure, as described later. Each of the accessories 103 is provided with an IC chip 104 (subsidiary storage medium) in which an accessory data (subsidiary object information) indicative of a kind of the accessory 103 is stored. Accordingly, when a toy figure 100 accessorized with the accessory 103 is set on the mounting platform 20, accessory data on the accessory 103 is also read together with the data on the IC chip 101 provided in the toy figure 100. In the second embodiment, the IC chip 104 of the accessory 103 maybe configured such that the frequency of usage is written thereto via the IC reader/writer 21 although it will not necessarily be written thereto.

As described in the first embodiment, the slot machine 500 of the second embodiment also uses a lottery table as shown in FIG. 5 for determining winning combinations when the base game is performed using the three variable display windows 22 to 24 on the slot machine 500. However, in the second embodiment, as described later, there exists a plurality of lottery tables used in response to the IC chip data and accessory data which are read from the toy figure 100 and the accessory 103. The range of random number values used in any of the lottery tables is assumed to be always from 0 to 1270.

Referring now back to FIGS. 6A-6C, a detailed description will be given of the toy figure 100 to be set on the mounting platform 20 formed on the slot machine 500.

As shown in FIGS. 6A-6C, the slot machine 500 is configured to be playable with three different kinds of toy figures 100. The toy figure 100 shown in FIG. 6A is configured of a figure portion 100*b* representing a "warrior" toy figure and a base 100*a* (henceforth called a warrior toy figure). Various accessories 103 are configured mountable on the figure portion 100*b*. That is, a sword held by the warrior shown in FIG. 6A is configured detachable, and the sword can be replaced with other accessories such as another sword, a staff, or a bow. What the warrior toy figure shown in FIG. 6A holds is a sword accessory having no IC chip 104 provided therein but a decorative accessory for merely visually enhancing the warrior toy figure.

The noncontact IC chip 101 is located in the base 100*a* and has a variety of information stored therein. The IC chip 101 stores IC chip data consisting of the frequency of usage of the toy figure 100 and the type of the toy figure 100. That is, in the case of a toy figure 100 of FIG. 6A which has not yet been used, information indicative of "frequency of usage: 0, type: warrior" is stored in the IC chip 101 as the IC chip data.

The toy figure shown in FIG. 6B is provided with a figure portion 100*b* representing a "wizard" toy figure and a base 100*a* (henceforth called a wizard toy figure). Various accessories can also be attached to the wizard toy figure. For example, a staff held by the wizard toy figure shown in FIG. 6B can be replaced with a sword, a bow, or another staff. In FIG. 6B, the staff which the wizard toy figure holds is a decorative accessory having no IC chip 104 provided therein.

Similar to the warrior toy figure, an IC chip 101 is located in the base 100*a*. The IC chip 101 stores IC chip data and, as with the aforementioned case, stores the frequency of usage of such a toy figure 100 and data indicative of "type: wizard".

The toy figure shown in FIG. 6C is configured of a figure portion 100*b* representing an "archer" toy figure and a base 100*a* (henceforth called an archer toy figure). In the archer toy figure as well, a bow currently held can be replaced with another accessory such as a sword, a staff, or another bow. In the case, similar to the aforementioned warrior toy figure and wizard toy figure, the bow held by the archer toy figure is a decorative accessory having no IC chip 104 provided therein.

Similar to the aforementioned toy figures 100, an IC chip 101 located in the base 100*a* stores the frequency of usage of such a toy figure and data indicative of "type: archer".

Referring now to FIGS. 23 to 26, a description will be given of the accessory 103 which can be attached to a toy figure 100 used on the slot machine 500 of the second embodiment, and is provided with an IC chip 104.

The accessory 103 used in the second embodiment is attachable to the toy figure 100 and may be provided with an IC chip 104. However, the sword, staff, and bow attached to the toy figures 100 shown in FIGS. 6A-6C have no IC chips 104 provided therein.

Figure 23:
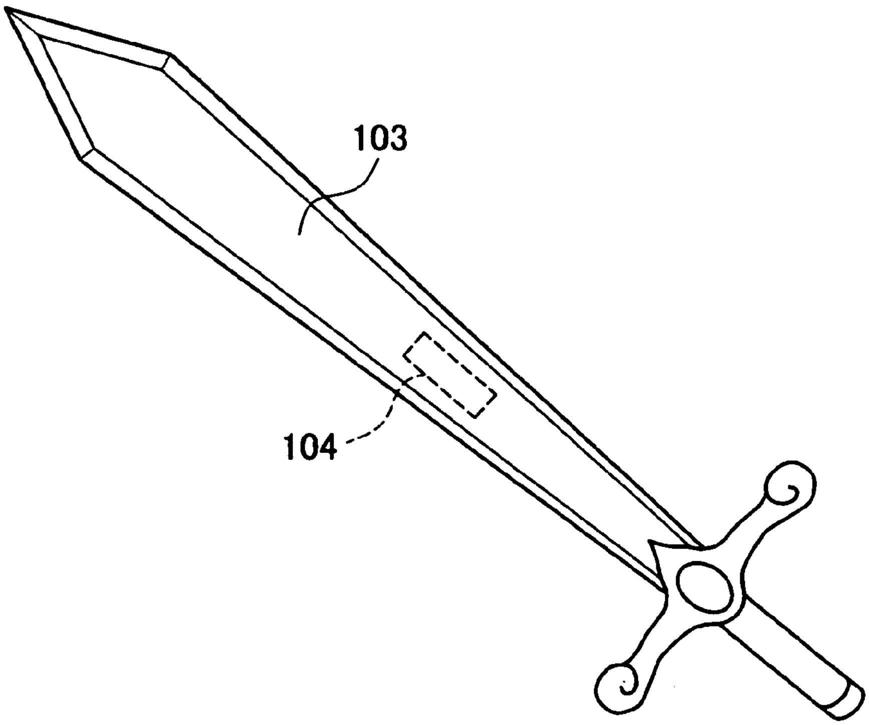
FIG. 23 is an illustration showing an accessory "sword accessory" which is attachable to the toy figure used in the slot machine.

As shown in FIG. 23, in the second embodiment, as one of the accessories 103, there is an accessory representing a sword (the "sword" accessory 103 is henceforth called a sword accessory). The sword accessory can be attachable with any one of the toy figures 100 so that the toy figure 100 is equipped with the sword accessory by inserting the hilt portion of the sword accessory into the hand portion of the toy figure 100.

And, the IC chip 104 is provided inside the blade portion of the sword accessory. The IC chip 104 stores data indicative of "sword" as accessory data that indicates the kind of the accessory 103.

There is also an accessory 103 (see FIG. 24) representing a staff and an accessory 103 (see FIG. 25) representing a bow. These accessories 103 are also attachable to the hand portion of any of the toy figures 100.

Similar to the aforementioned sword accessory, the accessory 103 representing a staff is referred to as a staff accessory, and the accessory 103 representing a bow is referred to as a bow accessory. And, the staff accessory does not include the decorative staff accessory which, shown in FIG. 6B, which has no IC chip 104 provided therein, and the bow accessory also does not include the decorative bow accessory shown in FIG. 6C.

Figure 24:
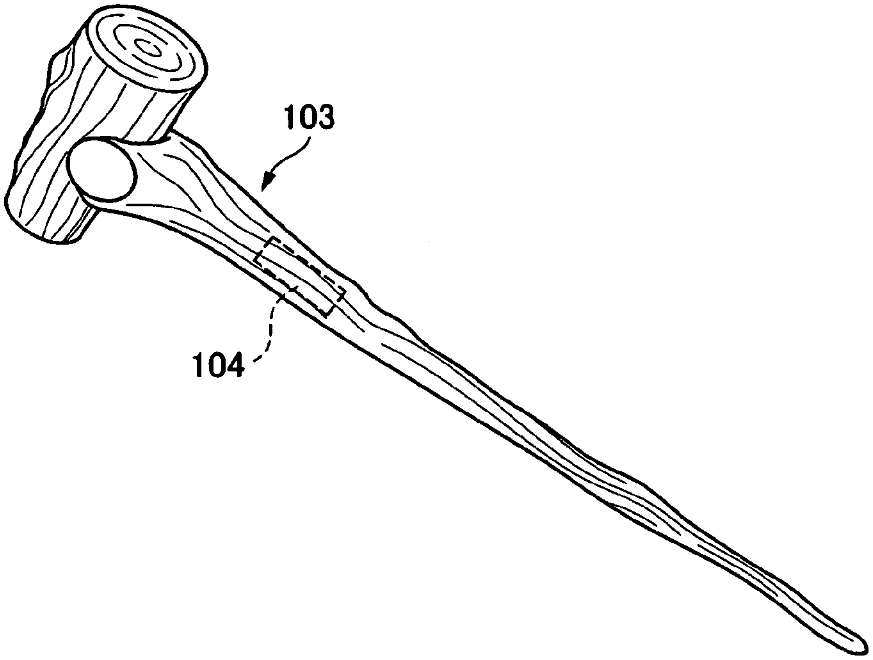
FIG. 24 is an illustration showing an accessory "staff accessory" which is attachable to the toy figure.
Figure 25:
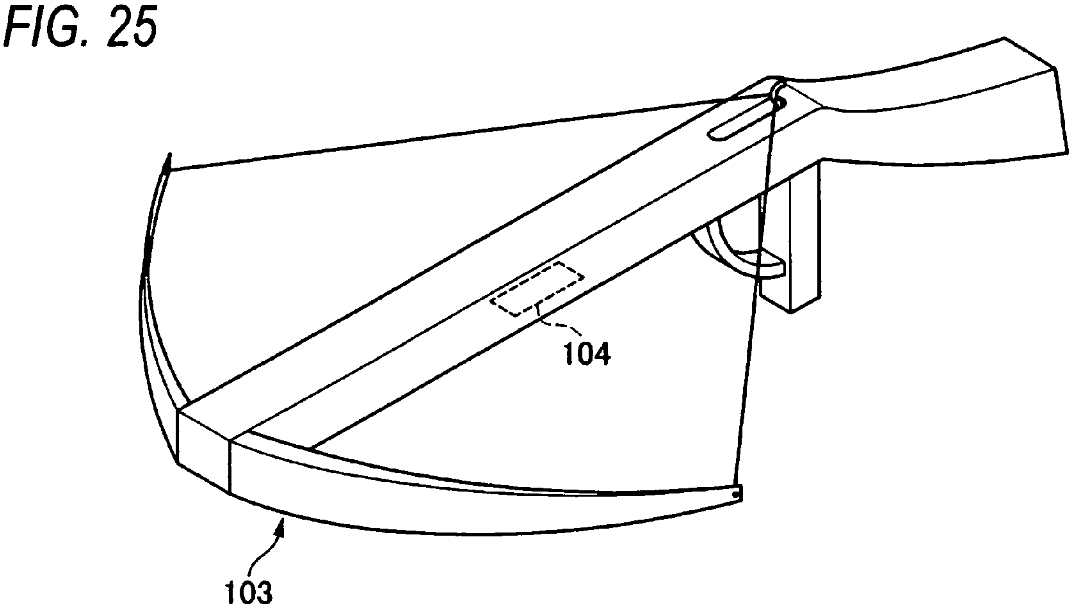
FIG. 25 is an illustration showing an accessory "bow accessory" which is attachable to the toy figure.

As shown in FIGS. 24 and 25, the IC chip 104 is provided in each of the staff accessory and bow accessory. And, data indicative of "staff" is stored, as the accessory data, in the IC chip 104 provided in the staff accessory, and data indicative of "bow" is stored in the IC chip 104 provided in the bow accessory.

Figure 26:
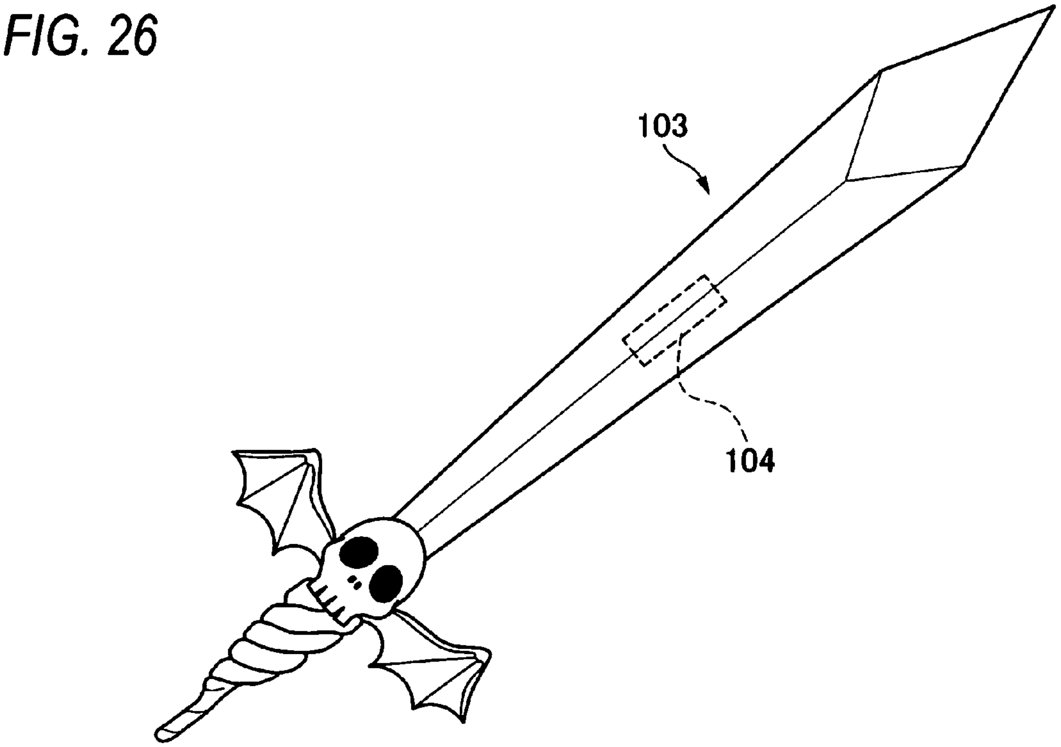
FIG. 26 is an illustration showing an accessory "evil sword accessory" which is attachable to the toy figure.

And, similar to the aforementioned "sword accessory", "staff accessory" and "bow accessory", the IC chip 104 is provided in an accessory 103 shown in FIG. 26.

The accessory 103 shown in FIG. 26 is an accessory representing an evil sword, and data indicative of "evil sword" is stored in the IC chip 104 as the accessory data. An accessory 103 which, shown in FIG. 26, represents the evil sword is henceforth called an "evil sword accessory".

And, similar to the aforementioned accessories 103, the evil sword accessory is also attachable to the hand portion of any one of the toy figures 100.

Figure 27:
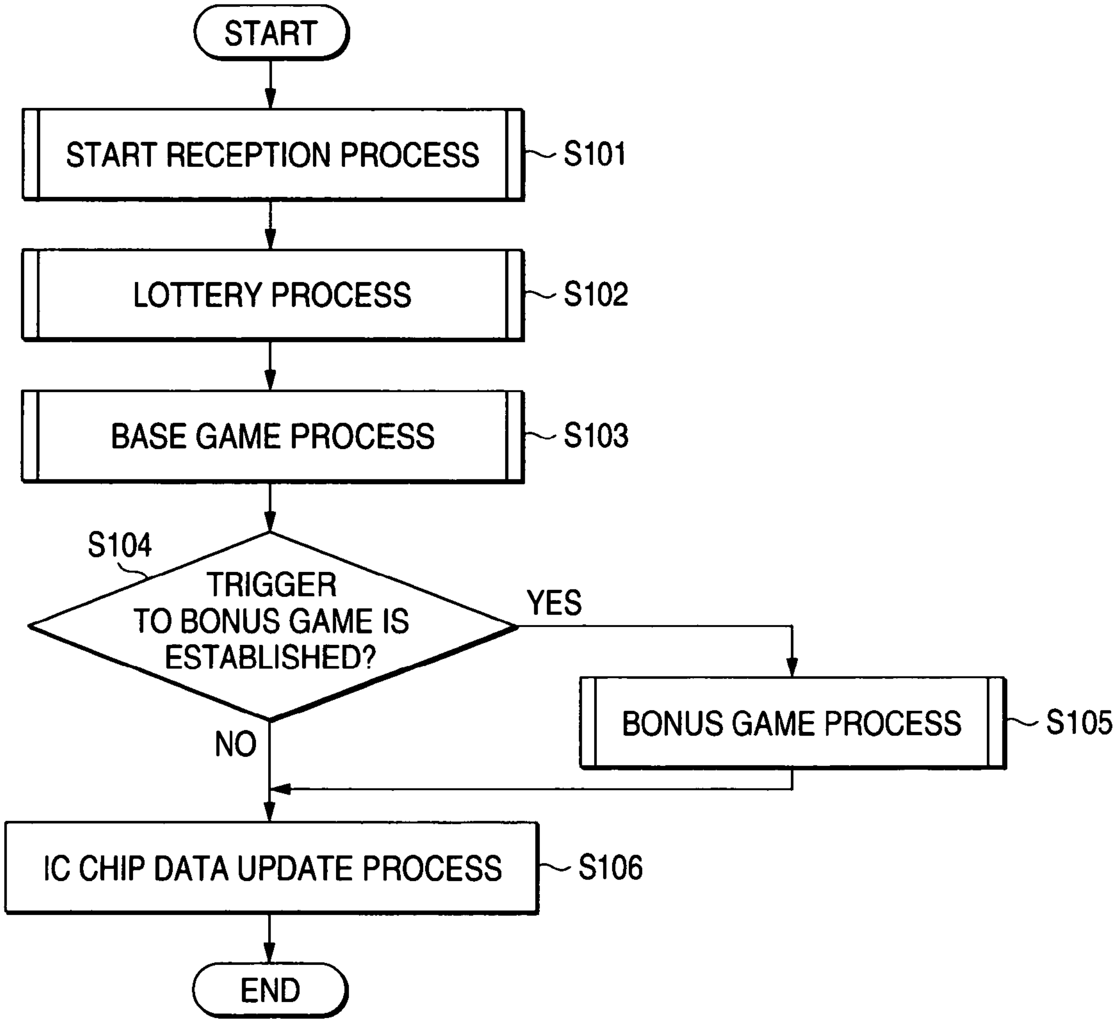
FIG. 27 is a flowchart of a main processing program.
Figure 28:
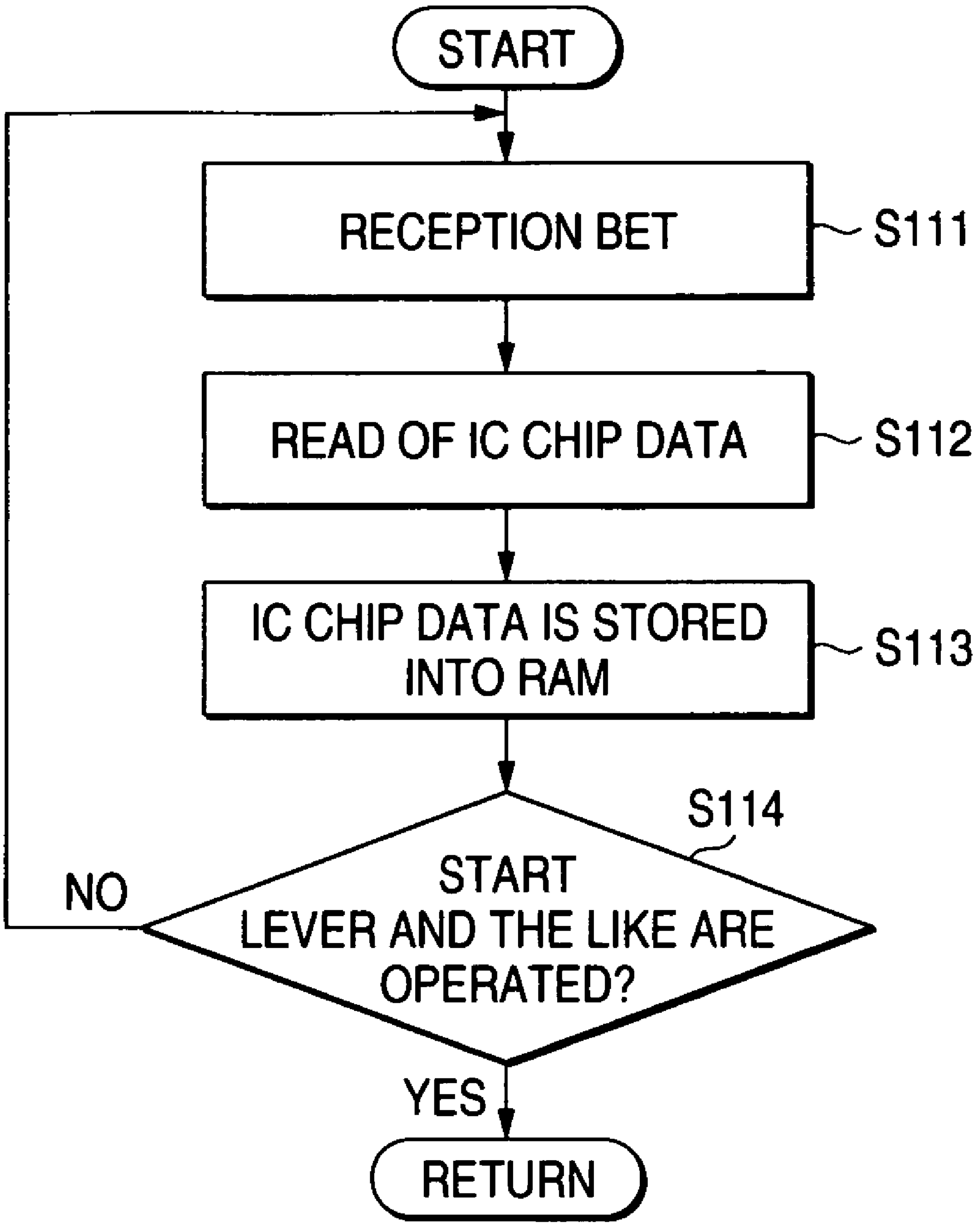
FIG. 28 is a flowchart of a start reception processing program.

The main processing program executed on the slot machine 500 will subsequently be described in accordance with FIG. 27. FIG. 27 is a flowchart of the main processing program. As shown in FIG. 27, first, a to-be-described start reception process of FIG. 28 is performed in step (henceforth abbreviated as "S") 101. The process is the process of receiving a switch signal transmitted from the START switch 57, the SPIN/REPEAT BET switch 58, or a BET switch such as the 1-BET switch 59, based on the operation of the START lever 17, the SPIN/REPEAT BET button 12, or a BET button such as 1-BET button 11. Included in the process is the process of determining the presence/absence of a toy figure 100 on the mounting platform 20 and executing a read of the IC chip data consisting of the frequency of usage and type of such a toy figure 100 from the IC chip 101 provided in the toy figure 100 and a read of the accessory data from the IC chip 104 provided in an accessory 103. And, a game is started upon reception of the switch signal transmitted from each switch.

Figure 29:
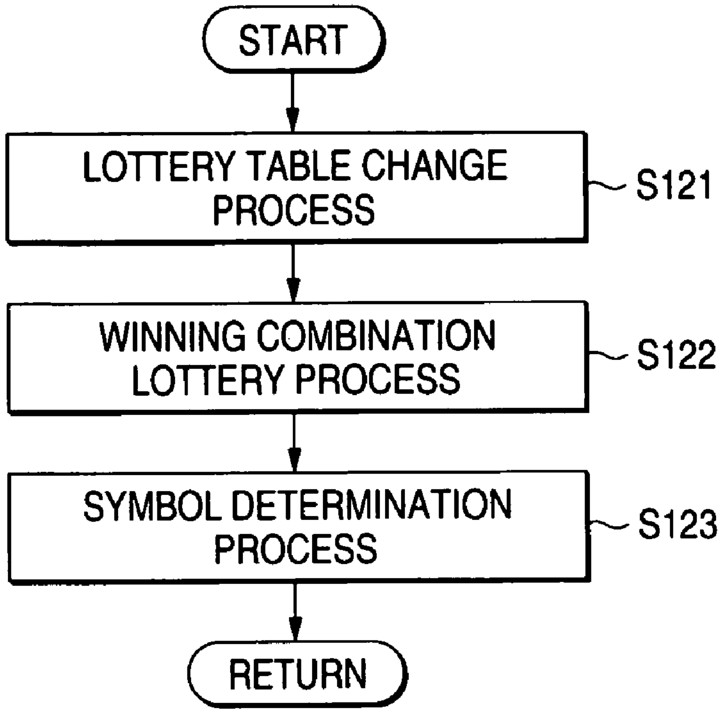
FIG. 29 is a flowchart of a lottery processing program.

In S102, a to-be-described lottery process of FIG. 29 is performed based on the switch signal transmitted from the aforementioned START switch 57, SPIN/REPEAT BET switch 58, or BET switch such as the 1-BET switch 59.

Figure 30:
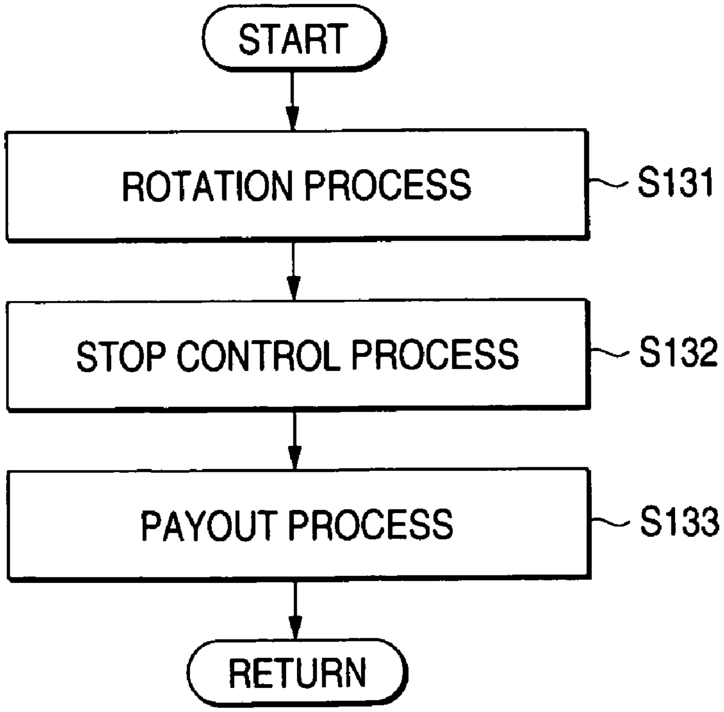
FIG. 30 is a flowchart of a base game processing program.

A to-be-described base game process of FIG. 30 is performed in the next step, S103. Here, the base game is the game in which coins are won by varying and stop-displaying the reels R via the variable display windows 22 to 24. The process thereafter proceeds to S104 to determine whether the trigger to the bonus game is established or not. Specifically, suppose, in the lottery process of S102, that a winning combination corresponding to a random number value sampled via the random number sampling circuit 56 is a JOKER winning combination including the trigger symbol 97. In the case, the trigger to the bonus game is won (S104: YES) and the process therefore proceeds to S105 to perform a to-be-described bonus game process of FIG. 31. The bonus game will be described later with reference to the drawings. The process proceeds to S106 after the end of the bonus game process (S105). On the contrary, if the JOKER winning combination is not won in the lottery process of S102, the trigger to the bonus game is not won (S104: NO) and the process therefore proceeds directly to S106.

An IC chip data update process for updating the IC chip data stored in the IC chip 101 is performed in S106. Specifically, it is first determined whether or not a toy figure 100 exists on the mounting platform 20 of the slot machine 500. If the toy figure 100 exists, the frequency of usage of the currently stored IC chip data is updated, via the IC reader/writer 21, by adding 1 thereto. After the frequency of usage of the IC chip data is updated, the IC chip data update process is terminated. Here, if no toy figure 100 exists, the process is immediately terminated. After the IC chip data update process (S106) ends, the main processing program is terminated.

A description will now be given, in accordance with FIGS. 10A and 10B, of a display screen used during the base game (S103) and a display screen used during the bonus game (S105) which are displayed on the lower liquid crystal display 4 when the games are being played on the slot machine 500 of the second embodiment.

During the base game, the display shown in FIG. 12A is displayed on the lower liquid crystal display 4. On the occasion, based on start operation by the player, the reels R begin rotating for variable display. And, after the reels R are variably displayed for a predetermined time, symbols displayed on the peripheries of the reels R are displayed stopped on the activated pay line L, based on the lottery result of the lottery process (S102).

During the bonus game, the display shown in FIG. 12B is displayed on the lower liquid crystal display 4. On the occasion, five option symbols are displayed in a lower portion of the screen of the lower liquid crystal display 4. Any of these option symbols is pressed with a finger or the like to select an option symbol via the transparent touch panel 30, thereby causing the bonus game to proceed. On the occasion, in the second embodiment, images are displayed even in portions of the variable display windows 22 to 24, thus rendering invisible the reels R located inside the variable display windows 22 to 24.

A start reception processing program to be executed on the slot machine 500 will subsequently be described in accordance with FIG. 28. FIG. 28 is a flowchart of the start reception processing program.

When the start reception process is performed in the aforementioned main processing program S101 of FIG. 27, first, coins or bills inserted from the coin insertion slot 9 or the bill insertion slot 10 are received in S111 of FIG. 28. The received coins or bills are treated as a number of coins equivalent to the number of coins or the amount of the bills, based on a detection signal transmitted from the coin sensor 65 or bill sensor 66. A number of coins is thus stored in the RAM 52 as the number of coins that can be bet on the slot machine 500.

Subsequently, in S112, IC chip data is read from the IC chip 101 located in a toy figure 100 on the mounting platform 20, and accessory data is read from the IC chip 104 provided in an accessory 103 attached to the toy figure 100. The frequency of usage and type of the toy figure 100 is stored, as the IC chip data, in the IC chip 101 located in the base 100*a*. On the other hand, the IC chip 104 provided in the accessory 103 stores the accessory data indicative of the IC chip 104.

The IC chip data and accessory data are read from the IC chip 101 and IC chip 104 via the IC reader/writer 21 (S112), and the read IC chip data and accessory data are stored in the RAM 52 (S113).

If no toy figure 100 exists on the mounting platform 20, no IC chip 101 exists either, so that the frequency of usage and type are both treated as "none" in terms of the IC chip data. Furthermore, if a toy figure 100 is not accessorized with an accessory 103, no IC chip 104 exists, so that the accessory data is treated as "none".

In S114, it is determined whether the START lever 17, the SPIN/REPEAT BET button 12, or a BET button such as the 1-BET button 11 has been operated or not. When determined here that the START lever 17 or the like has not been operated (S114: NO), the process returns to S111 to repeat the aforementioned steps. On the contrary, when determined that the START lever 17 or the like has been operated (S114: YES), the process returns to the main processing program and thereafter proceeds to the lottery process of S102.

A lottery processing program executed on the slot machine 500 will now be described in accordance with FIG. 29. FIG. 29 is a flowchart of the lottery processing program. The lottery process is performed in S102 of the aforementioned main processing program of FIG. 27 but, in order to do so, first, the process proceeds to S121 of FIG. 29 to perform a lottery table change process.

The lottery table change process (S121) will now be described with reference to the drawings.

In the lottery table change process (S121), a lottery table to be used in the base game of the slot machine 500 is determined based on the contents of the IC chip data and accessory data which have been read from the IC chip 101 and IC chip 104 and stored into the RAM 52 in S112 and S113, and on lottery table determination tables shown in FIG. 32.

As shown in FIG. 32, the lottery table determination table is used to determine a lottery table to be used in a winning combination lottery process (S22), based on the presence/absence of a toy figure 100 on the mounting platform 20, the kind and frequency of usage of the toy figure 100, the presence/absence of an accessory 103, and the kind of the accessory 103.

Lottery tables determined based on the lottery table determination table will now be described with specific examples.

First, when no toy figure 100 is set on the mounting platform 20, as shown in FIG. 32, the lottery table (a) is selected. The lottery table (a) selected in the case is the same with the lottery table shown in has already been described with reference to FIG. 5 in the first embodiment, and thus is omitted from a repeat description.

A lottery table selected when only a toy figure 100 having a frequency of usage of 100 times or less is set on the mounting platform 20 will now be described for each kind of toy figure 100. As shown in FIG. 32, in the slot machine 500, the lottery table to be selected varies with each kind of toy figure 100 to be used. Accordingly, the player will be able to play in a different mode by changing the kind of toy figure 100 used.

When only a warrior toy figure having a frequency of usage of 100 times or less is set on the mounting platform 20, as shown in FIG. 32, a lottery table (b) is selected.

As shown in FIG. 33, in the lottery table (b), the range of random number values allotted to the winning combinations "7-7-7", "3BAR-3BAR-3BAR", and "CHERRY-CHERRY-CHERRY" is increased as compared with in the aforementioned lottery table (a) selected when no toy figure 100 is used (see FIG. 5). The range of random number values allotted to "7-7-7" is 10 to 32 in the lottery table (a), while the range of random number values allotted to "7-7-7" is 10 to 37 in the lottery table (b) Similarly, for the winning combinations "3-BAR-3BAR-3BAR" and "CHERRY-CHERRY-CHERRY" as well, the range of random number values allotted thereto is set wider.

Accordingly, the player can play with the lottery tables with an increased probability of winning "7-7-7", "3BAR- 3BAR-3BAR", and "CHERRY-CHERRY-CHERRY" as compared with when no toy figure 100 is used.

When only a wizard toy figure having a frequency of usage of 100 times or less is set on the mounting platform 20, a lottery table (c) is selected as shown in FIG. 32.

In the lottery table (c) shown in FIG. 34, the range of random number values allotted to the winning combinations "7-7-7", "3BAR-3BAR-3BAR", and "CHERRY-CHERRY-CHERRY" is increased as compared with in the aforementioned lottery table (a) selected when no toy figure 100 is used (see FIG. 5). The range of random number values allotted to "7-7-7" is 10 to 32 in the lottery table (a), while the range of random number values allotted to "7-7-7" is 10 to 42 in the lottery table (c) Accordingly, the player can play using a lottery table in which it is easier to win the winning combination "7-7-7" than when no toy figure 100 is used. In the aforementioned case of the warrior toy figure, some winning combinations other than the winning combination "7-7-7" are increased in winning probability, but in the case of the wizard toy figure, only the winning combination "7-7-7" is changed in winning probability. In the lottery table (c), no winning combination other than "7-7-7" increases in winning probability, but to redeem the disadvantage, the wizard toy figure is configured to have the highest probability of winning the winning combination "7-7-7" of all the kinds of toy figures 100.

And, when only an archer toy figure having a frequency of usage of 100 times or less is set on the mounting platform 10, a lottery table (d) is selected as shown in FIG. 35.

As shown in FIG. 35, in the lottery table (d), the range of random number values allotted to the winning combinations "7-7-7", "2BAR-2BAR-2BAR", and "BAR-BAR-BAR" is increased as compared with in the aforementioned lottery table (a) selected in the aforementioned case in which no toy figure 100 is used (see FIG. 5). The range of random number values allotted to "7-7-7" is 10 to 32 in the lottery table (a), while the range of random number values allotted to "7-7-7" is 10 to 37 in the lottery table (b). Similarly, in the winning combinations "2BAR-2BAR-2BAR" and "BAR-BAR-BAR" as well, the range of random number values allotted thereto is set wider.

Accordingly, the player can play using lottery tables with an increased probability of winning "7-7-7", "2BAR-2BAR-2BAR", and "BAR-BAR-BAR" as compared with when no toy figure 100 is used.

In the slot machine 500 of the second embodiment, it thus follows that different lottery tables are used upon changing the kind of toy figure 100 used, which can therefore provide the player with fresh excitement.

Referring now to the drawings, a description will be given of lottery tables selected when a toy figure 100 having a frequency of usage of 100 times or less is set on the mounting platform 20, accessorized with an accessory 103.

Three kinds of toy figures 100: the warrior toy figure, the wizard toy figure, and the archer toy figure can be used in the second embodiment, but a description given here will be an example in which an accessory 103 is attached to the warrior toy figure.

A description will first be given of the case in which, as an accessory 103, the sword accessory is attached to the warrior toy figure having a frequency of usage of 100 times or less. As shown in FIG. 32, in the case, a lottery for a winning combination is performed using a lottery table (e).

As shown in FIG. 36, in the lottery table (e), the range of random number values allotted to the JOKER winning combination allowing a transition to the bonus game is widened, and the other winning combinations are similar to those of the lottery table (b) selected when only the warrior toy figure is used (see FIG. 33). Accordingly, when the warrior toy figure is accessorized with the sword accessory, it is possible to enjoy not only the benefit of the increase in winning probability obtained when only the warrior toy figure is used, but also the benefit of the increase in probability of making a transition to the bonus game in which a large number of coins can be won.

Additionally, in a lottery table (i) selected when the staff accessory is attached to the wizard toy figure having a frequency of usage of 100 times or less is the lottery table, similar to the aforementioned lottery table (e), the range of random number values corresponding to the JOKER winning combination is made greater than and the probability of winning the other combinations is maintained the same as in the lottery table (c) selected when only the wizard toy figure is used.

In a lottery table (I) selected when the bow accessory is attached to the archer toy figure, similar to the lottery table (i), the range of random number values corresponding to the JOKER winning combination is made greater than and the probability of winning the other combinations is maintained the same as in the lottery table (d) selected when only the archer toy figure is used.

When the warrior toy figure having a frequency of usage of 100 times or less is accessorized with the staff accessory or the bow accessory, as shown in FIG. 32, a lottery for a winning combination is performed using a lottery table (f).

As shown in FIG. 37, in the lottery table (f), the range of random number values corresponding to any winning combination other than the JOKER winning combination is made greater than in the lottery table (b) selected when only the warrior toy figure having a frequency of usage of 100 times or less is used. Accordingly, when the lottery table (f) is used, the probability of making a transition to the bonus game remains unchanged, but the probability of winning the other winning combinations is increased, as compared with when no toy figure 100 is used or when the warrior toy figure having a frequency of usage of 100 times or less is used. That is, it is possible to enjoy the benefit of an increased probability of winning any winning combination other than the "JOKER winning combination".

In a lottery table (h) selected when the sword accessory or the bow accessory is attached to the wizard toy figure having a frequency of usage of 100 times or less, similar to the aforementioned lottery table (f), the range of random number values corresponding to any winning combination other than the "JOKER winning combination" is widened, and the probability of winning any winning combination other than the "JOKER winning combination" is increased, as compared with in the lottery table (d) selected when only the wizard toy figure is used.

In a lottery table (k) selected when the sword accessory or the staff accessory is attached to the wizard toy figure having a frequency of usage of 100 times or less, similar to the lottery tables (f) and (h), the range of random number values corresponding to any other winning combination than the "JOKER winning combination" is widened, and the probability to win any winning combination other than the "JOKER winning combination" is increased, as compared with in the lottery table (d) selected when only the archer toy figure is used.

In the slot machine 500 of the second embodiment, a toy figure 100 is thus accessorized with an accessory 103 having a close relationship to the kind of the toy figure 100 used, thereby making it possible to play a game having high probability of making a transition to the bonus game. And, a toy figure 100 is accessorized with an accessory 103 having a remote relationship to the kind of the toy figure 100 used, thereby making it possible to play a game having high probability of winning the other winning combinations although the possibility of making a transition to the bonus game remains unchanged.

On the other hand, the accessory 103 also includes the evil sword accessory shown in FIG. 26, and a toy figure 100 can be accessorized with the evil sword accessory. A description will now be given of the case in which the evil sword accessory is attached to the warrior toy figure having a frequency of usage of 100 times or less.

When the warrior toy figure having a frequency of usage of 100 times or less is accessorized with the evil sword accessory as the accessory 103, a lottery for a winning combination is performed using a lottery table (g).

In the lottery table (g), as shown in FIG. 38, the probability of winning all the winning combinations including the JOKER winning combination is reduced as compared with in the lottery table (b) selected when only the warrior toy figure having a frequency of usage of 100 times or less is used. On the contrary, the probability of winning any other combination than the "JOKER winning combination" is set slightly higher than in the lottery table (a) selected when no toy figure 100 is used. For example, for "7-7-7", the range of random number values is 10 to 32 in the lottery table (a), while the range of random number values is 8 to 37 in the lottery table (g). That is, when the warrior toy figure is accessorized with the evil sword accessory, it thereby follows that a game is played under more advantageous conditions than when no toy figure 100 is used, but under less advantageous conditions with a lower probability of winning a winning combination than when only the warrior toy figure is used.

Accordingly, when the evil sword accessory is included in the accessory 103, it thereby follows that the advantage/disadvantage of a game varies according to the selection of an accessory 103, which can therefore produce fresh excitement in the selection of an accessory 103.

The case in which a toy figure 100 is accessorized with the evil sword accessory as an accessory 103 has been described as above taking the warrior toy figure as an example. However, the same applies even when the wizard toy figure or the archer toy figure is accessorized with the evil sword accessory.

Specifically, when the wizard toy figure having a frequency of usage of 100 times or less is accessorized with the evil sword accessory, a lottery table (j) is selected as shown in FIG. 32. And, similar to the aforementioned case of the warrior toy figure, the lottery table (j) has the range of random number values narrowed by a predetermined value as compared with in the lottery table (c) selected when only the wizard toy figure is used.

Similarly, in a lottery table (m) selected when the archer toy figure having a frequency of usage of 100 times or less is accessorized with the evil sword accessory, the range of random number values is narrowed by a predetermined value as compared with in the lottery table (d) selected when only the archer toy figure is used.

An accessory 103 can be thus used for any toy figure 100 of the warrior, wizard, and archer toy figures. And, the lottery table to be selected differs based on the kind of the toy figure 100 and the kind of the accessory 103, so that the player can enjoy the excitement of the selection of an accessory 103 together with the selection of a toy figure 100.

Here, in the second embodiment, the IC chip 101 of a toy figure 100 stores data on the frequency of usage of the toy figure 100. As shown in FIG. 32, when the frequency of usage of the toy figure 100 reaches 101 times or more, the toy figure 100 and the accessory 103 use different lottery tables selected in the lottery table change process (S121) although the conditions related to the kinds of the toy figures are the same.

The aspect will be described by reference to the drawings, showing as a specific example the case of using the warrior toy figure having a frequency of usage of 101 times or more.

A description will first be given of the case of using a warrior toy figure having a frequency of usage of 101 times or more. As shown in FIG. 32, the lottery table selected in the case is a lottery table (B). In the lottery table (B), as shown in FIG. 39, the ranges of random number values for all the winning combinations including the "JOKER winning combination" to make a transition to the bonus game are widened in a predetermined proportion as compared with in the lottery table (b) (see FIG. 33) selected in the case of a frequency of usage of 100 times or less. Accordingly, when the lottery table (B) is used, it follows that the probability of winning all the winning combinations increases as compared with when the lottery table (b) is used.

Similarly, in the case of the wizard toy figure, when the frequency of usage thereof becomes 101 times or more, the lottery table (c) is thereby changed to a lottery table (C) and in the case of the archer toy figure, the lottery table (d) is changed to a lottery table (D) (see FIG. 32).

The lottery table (c) is to the lottery table (C), and the lottery table (d) is to the lottery table (D) as the lottery table (b) is to the lottery table (B). Accordingly, in the case of using the wizard toy figure or the archer toy figure, when the frequency of usage thereof becomes 101 times or more, it thereby follows that the lottery table (C) or the lottery table (D) is selected, and the probability of winning all the winning combinations is increased by a predetermined proportion.

The player thus uses a toy figure 100 repeatedly, and can thereby play a game under more advantageous conditions than usual, and furthermore under more advantageous conditions than another player who uses a toy figure 100 having a lower frequency of usage.

A description will now be given of the case in which the warrior toy figure having a frequency of usage of 101 times or more is accessorized with the sword accessory. As shown in FIG. 32, a lottery table (E) is selected when the warrior toy figure having a frequency of usage of 101 times or more is accessorized with the sword accessory.

Here, the lottery table (E) is to the lottery table (B) as the lottery table (e) is to the lottery table (b) which are selected in the case of a frequency of usage of 100 times or less. That is, in the lottery table (E), the range of random number values of the "JOKER winning combination" is made greater than and the range of random number values of any other winning combination is maintained the same as in the lottery table (B) (see FIG. 40).

Accordingly, it is possible to obtain not only the benefit of an "increase in the probability of winning all the winning combinations" which can be enjoyed by using the warrior toy figure 101 times or more, but also the benefit of "an increase in the probability of winning the "JOKER winning combination"" which can be enjoyed by accessorizing the warrior toy figure with the sword accessory.

The player can thereby play a game under very advantageous conditions having a high probability both of making a transition to the bonus game, enabling the acquisition of a large number of coins, and also of winning any other winning combination by which coins are paid out.

Additionally, in a lottery table (I) selected when the staff accessory is attached to the wizard toy figure having a frequency of usage of 101 times or more, similar to the aforementioned lottery table (E), the range of random number values corresponding to the JOKER winning combination is widened, and the probability of winning any other combination is maintained constant, as compared with in the lottery table (C) selected in the case of using only the wizard toy figure having a frequency of usage of 101 times or more.

On the other hand, in a lottery table (L) selected when the bow accessory is attached to the archer toy figure, similar to the lottery tables (E) and (I), the range of random number values corresponding to the JOKER winning combination is widened, and the probability of winning any other combination is maintained constant, as compared with in the lottery table (D) selected when only the archer toy figure is used.

The makes it possible for the player, no matter which toy figure 100 the player may use, to play a game under very advantageous conditions having a high probability both of making a transition to the bonus game, enabling the acquisition of a large number of coins, and of winning any other winning combination by which coins are paid out.

And, when the warrior toy figure having a frequency of usage of 101 times or more is accessorized with the staff accessory or the bow accessory as an accessory 103, as shown in FIG. 32, a lottery for a winning combination is performed using a lottery table (F).

As shown in FIG. 41, in the lottery table (F), the range of random number values corresponding to any winning combination other than the JOKER winning combination is made greater than in the lottery table (B) selected in the case of using only the warrior toy figure having a frequency of usage of 101 times or more. Accordingly, when the lottery table (F) is used, the probability of making a transition to the bonus game remains unchanged, but the probability of winning any other winning combination is increased, as compared with in the case of using only the warrior toy figure having a frequency of usage of 101 times or more. That is, it is possible to enjoy not only the profit of an "increase in probability of winning all the winning combinations" which can be obtained by using the toy figure 100 for more than 101 times, but also the profit of an increase in probability to win any other winning combination than the "JOKER winning combination".

Additionally, in a lottery table (H) selected when the sword accessory or the bow accessory is attached to the wizard toy figure having a frequency of usage of 101 times or more, the range of random number values corresponding to any winning combination other than the "JOKER winning combination" is widened, and the probability of winning any winning combination other than the "JOKER winning combination" is increased, as compared with in the lottery table (C) selected when only the wizard toy figure is used.

On the other hand, in a lottery table (K) selected when the sword accessory or the staff accessory is attached to the archer toy figure, the range of random number values corresponding to any winning combination other than the "JOKER winning combination" is widened, and the probability of winning any other winning combination than the "JOKER winning combination" is increased, as compared with in the lottery table (D) selected in the case of using only the archer toy figure having a frequency of usage of 101 times or more.

In the slot machine 500 of the second embodiment, the toy figure 100 used repeatedly is accessorized with an accessory 103 having a close relationship to the kind of the toy figure 100, thereby making it possible to play a game having not only the benefit of an "increase in probability of winning all the winning combinations" which is provided by the repeated use, but also a high probability of making a transition to the bonus game. And, the toy figure 100 used repeatedly is accessorized with an accessory 103 having a remote relationship to the kind of the toy figure 100, thereby making it possible to play a game having not only the benefit of an "increase in the probability of winning all the winning combinations" which is provided by the repeated use, but also a high possibility of winning any winning combination other than the "JOKER winning combination" which allows a transition to the bonus game.

A description will now be given of the case in which the evil sword accessory is attached to the warrior toy figure having a frequency of usage of 101 times or more.

When the evil sword accessory is attached to the warrior toy figure having a frequency of usage of 101 times or more, a lottery for a winning combination is performed using a lottery table (G) (see FIG. 32).

In the lottery table (G), as shown in FIG. 42, the probability of winning all the winning combinations including the JOKER winning combination is reduced as compared with in the lottery table (B) selected in the case of using only the warrior toy figure having a frequency of usage of 101 times or more. On the other hand, the probability of winning a winning combination is comprehensively set higher than in the lottery table (g) selected when the evil sword accessory is used for the warrior toy figure having a frequency of usage of 100 times or less. For example, for "JOKER winning combination", the range of random number values is 0 to 7 in the lottery table (g), while the range of random number values is 0 to 10 in the lottery table (G). That is, when the warrior toy figure having a frequency of usage of 101 or more is accessorized with the evil sword accessory, it thereby follows that a game is played under more advantageous conditions than when the evil sword accessory 100 is used for the warrior toy figure having a frequency of usage of 100 times or less, but under less advantageous conditions with lower probability of winning a winning combination than in the case of using only the warrior toy figure having a frequency of usage of 101 times or more.

Accordingly, when the evil sword accessory is included as the accessory 103 and thus made applicable to a toy figure 100 having a frequency of usage of 101 times or more, it follows that the advantage/disadvantage of a game varies according to the selection of the accessory 103, which can thereby provide fresh excitement in the selection of an accessory 103.

The case in which a toy figure 100 having a frequency of usage of 101 times or more is accessorized with the evil sword accessory as an accessory 103 has been described above taking the warrior toy figure as an example. However, the same applies when the wizard toy figure or the archer toy figure is accessorized with the evil sword accessory.

Specifically, when the wizard toy figure having a frequency of usage of 101 times or more is accessorized with the evil sword accessory, a lottery table (J) is selected as shown in FIG. 32. And, similar to the aforementioned case of the warrior toy figure, in the lottery table (J), the probability of winning a winning combination is higher, which is more advantageous, than in the lottery table (j) selected when the wizard toy figure having a frequency of usage of 100 times or less is accessorized with the evil sword accessory. However, the probability of winning all the winning combinations is set lower than in the lottery table (C) selected in the case of using only the wizard toy figure having a frequency of usage of 101 times or more. That is, the lottery table (J) has the range of random number values narrowed by a predetermined value as compared with the lottery table (C) selected in the case of using only the wizard toy figure having a frequency of usage of 101 times or more.

Similarly, in a lottery table (M) selected when the archer toy figure having a frequency of usage of 101 times or more is accessorized with the evil sword accessory, the range of random number values is narrowed by a predetermined value as compared with in the lottery table (D) selected in the case of using only the archer toy figure having a frequency of usage of 101 times or more. As aforementioned, in the lottery table (M), the probability of winning a winning combination is set higher than in the lottery table (m) selected when the archer toy figure having a frequency of usage of 100 times or less is accessorized with the evil sword accessory.

An accessory 103 can thus be used for any toy figure 100 of the warrior, wizard, and archer toy figures having a frequency of usage of 101 times or more. And, a lottery table to be selected based on the accessory 103 differs according to the kind of the toy figure 100, so that the player can enjoy the excitement of the selection of an accessory 103 together with the selection of a toy figure 100.

As aforementioned, the winning combination lottery process is performed after the lottery table change process (S121) in which a lottery table to be used in a lottery for a winning combination is determined based on the lottery table selection tables shown in FIG. 32, the IC chip data, and the accessory data. In the winning combination lottery process (S122), a random number is sampled by the random number sampling circuit 56, and a winning combination is determined based on the random number and the lottery table determined in the lottery table change process (S121). And, the stop position of the reels R and symbols displayed on the activated pay line L are determined so as to configure the winning combination determined in the winning combination lottery process (S122) (S123). After the symbol determination process (S123) ends, the process returns to the main processing program.

A base game processing program executed on the slot machine 500 will now be described in accordance with FIG. 30. FIG. 30 is a flowchart of the base game processing program. A base game process is performed in S103 of the aforementioned main processing program of FIG. 27.

First, in S131, rotation of the reels R is initiated based on the switch signal which, sent from the START switch 57, the SPIN/REPEAT BET switch 58, or a BET switch such as the 1-BET switch 59, has been received in the aforementioned S114 of FIG. 28 (S131).

When rotational driving of the reels R has been initiated (S131) and symbols are being scrolled in the variable display windows 22 to 24, a stop control process is performed in S132. In the stop control process (S132), the rotation of the reels R is stopped so that symbols determined in the winning combination lottery process (S122) and the symbol determination process (S123) are displayed stopped on the activated pay line L.

And, in S133, coins or the like equivalent to the awards preset based on the lottery table are paid out in accordance with the symbol combination displayed stopped on the activated pay line L in the variable display windows 22 to 24 in S132, i.e., the winning combination determined in the winning combination lottery process (S121). Additionally, after such a process S133, the process returns to the aforementioned main processing program of FIG. 27.

The bonus game on the slot machine 500 of the second embodiment will now be described. The bonus game executed on the slot machine 500 is the game which the player can play without using any coins in the player's possession. And, in the bonus game, as shown in FIG. 10B, five option symbols are displayed on the lower liquid crystal display 4.

The bonus game proceeds as the player presses one of these five option symbols with a finger or the like. Three kinds of bonus contents and two "LOSSES" are related to these option symbols, and the bonus game ends with the fulfillment of any one of the conditions of winning all the three kinds of bonus or selecting a "LOSS". Additionally, the configuration is such that the selected option symbols cannot be selected twice during one round of the bonus game.

In the second embodiment, the aforementioned three kinds of bonus contents include "20 coins won", "10 coins won", and "5 coins won". Accordingly, when the bonus game is played, a maximum of 35 coins can be won. "20 coins won", "10 coins won", and "5 coins won" will henceforth be indicated by "+20", "+10", and "+5", respectively.

Figure 31:
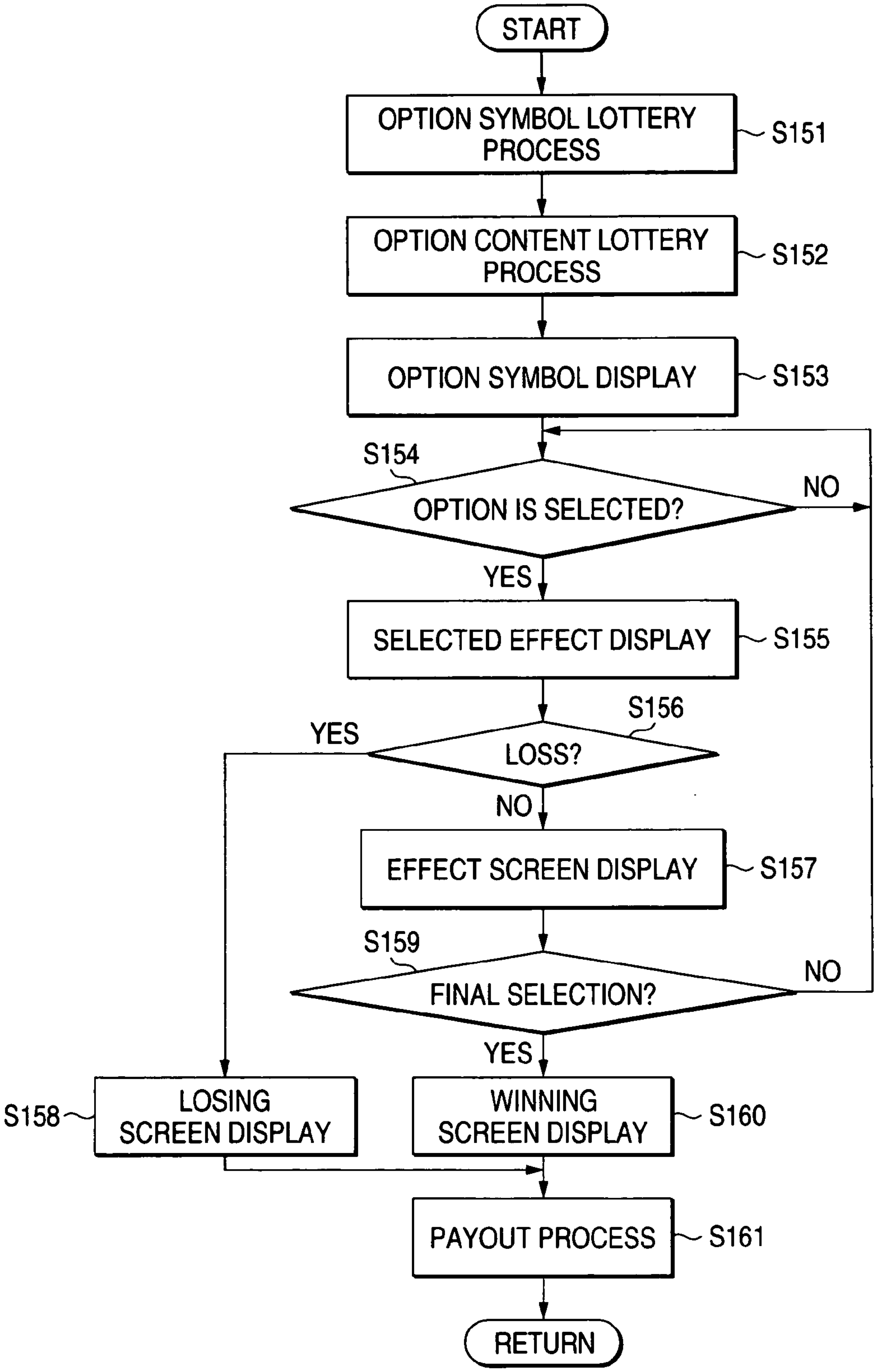
FIG. 31 is a flowchart of a bonus game processing program.

A bonus game processing program executed in S105 of the main processing program will subsequently be described in accordance with FIG. 31. FIG. 31 is a flowchart of the bonus game processing program. When determined in S104 of the main processing program that the trigger to the bonus game has been established (S104: YES), the process proceeds to S10S to perform the bonus game process. On the occasion, first, the process proceeds to S151 of the bonus game processing program to perform an option symbol lottery process.

Option symbols displayed in the bonus game will now be described with reference to the drawings. FIGS. 18 and 19 are illustrations showing examples of the option symbols. Here, the option symbols are stored in the image ROM 82. In the second embodiment, as shown in FIGS. 18 and 19, nine kinds of option symbols exist: "SWORD", "SHIELD", "HELMET", "STAFF", "CRYSTAL BALL", "MAGIC BOOK", "BOW", "ARROW", and "KNIFE". And, in the bonus game, five of these nine option symbols are displayed in a lower portion of the lower liquid crystal display 4. Accordingly, FIGS. 18 and 19 are also display examples of the lower portion of the lower liquid crystal display 4 with the five option symbols displayed therein.

The option symbol lottery process (S151) is the process of first randomly selecting option symbols to be displayed on the lower liquid crystal display 4 during the bonus game and the display position of the option symbols.

For example, to describe the case of FIG. 18 as an example, the sampling circuit 56 is used to randomly select five option symbols "SWORD", "BOW", "ARROW", "HELMET", and "SHIELD" from the aforementioned nine option symbols. Then, the display positions of each of these five option symbols are determined at random. In the case, it is determined that "SWORD", "ARROW", "HELMET", "SHIELD", and "BOW" are displayed in the order named from the left side of a bonus game screen displayed on the lower liquid crystal display 4. After determining the five option symbols to be displayed on the bonus game screen and the display positions of the option symbols, the process proceeds to S152.

In S152, an option content lottery process is performed in which the three kinds of bonus contents ("+20", "+"10", and "+5") and the two "LOSSES" are related to the five option symbols determined in the option symbol lottery process (S151). The option content lottery process will now be described taking the case of FIG. 19 as an example.

In the case, the option symbol lottery process (S151) determines that five option symbols "KNIFE", "CRYSTAL BALL", "MAGIC BOOK", "STAFF", and "HELMET" are to be displayed in the lower portion of the bonus game screen, in the order named from the left side of the screen (see FIG. 19).

On the occasion, first, the sampling circuit 56 is used to determine, by lottery, to which out of the three kinds of bonus contents ("+20", "+10", and "+5") and the two "LOSSES" to relate "KNIFE".

And, supposing that "KNIFE" is related to "+5" on the occasion, it then follows that the "CRYSTAL BALL" will be related to any one of the two kinds of bonus contents ("+20" and "+10"), other than "+5" already related to "KNIFE", and the two "LOSSES". The aforementioned process is thus repeated to relate the five option symbols to the bonus contents or the "LOSSES", and the option content lottery process (S152) is terminated and the process then proceeds to S153.

The second embodiment adopts a configuration such that, after determining the five option symbols, an option content is determined for each one of these option symbols. Alternatively, the configuration may be such that an option content is determined for each of the display positions at which the five option symbols are to be displayed. In the case, the configuration can be such as to determine by lottery a display position pattern in which option contents are related to display positions, which can thus simplify the option content lottery process.

Any one of the three kinds of bonus contents and the two "LOSSES" is related to each of the five kinds of option symbols in the aforementioned manner, and the five kinds of option symbols are thereafter displayed at the display positions thereof (see FIG. 10B) on the lower liquid crystal display 4 (S153). After the five kinds of option symbols are displayed, the process proceeds to S154.

In S154, it is determined whether an option has been selected or not. Specifically, it is determined whether an option has been selected or not by pressing, with a finger or the like, any of the five kinds of option symbols visible through the transparent touch panel 30 disposed in front of the lower liquid crystal display 4. If a portion of the transparent touch panel 30 corresponding to an option symbol has been pressed with a finger to thereby select the option symbol (S154: YES), the process proceeds to an option effect display process (S155). However, if an option symbol has not been selected (S154: NO), the process is held on standby until an option symbol is selected.

In the option effect display process (S155), first, as an option is selected, a premier effect shown in FIG. 16B is performed based on the selected option. Thereafter, based on a selected option symbol, an image corresponding to an option content (any one out of three kinds of bonuses and two losses) related to the selected option symbol in S151 and S152 is displayed. Here, when a bonus is won, the number of coins is stored in the RAM 52 based on the kind of bonus won.

And, in S156, it is determined whether the option content of an option symbol selected by the player is "LOSS" or not. If the option content is "LOSS" (S156: YES), the process proceeds to S158 to perform a losing screen display. Here, in the losing screen display, regardless of the presence/absence of a toy figure 100, a display indicating a failure in winning a bonus, such as "YOU LOSE", is performed in a central portion of the bonus game screen (see FIG. 10B). After the losing screen display (S158) ends, the process proceeds to S161.

Conversely, if the option content is not a "LOSS", i.e., if any one of the three kinds of bonuses is won (S156: NO), the process proceeds to an effect screen display (S157).

In the effect screen display (S157), a screen indicating a success in winning a bonus is displayed in the central portion of the bonus game screen (see FIG. 10B).

After the effect screen display (S157) ends, in S159, it is determined whether the selection is final or not. To describe the "final selection" here, the three kinds of bonuses ("+20", "+10", and "+5") can be won in the bonus game of the second embodiment and, out of five option symbols, the other two are "LOSSES", so that selection of option symbols can be performed a maximum of three times. That is, the "final selection" used in the second embodiment refers to the "third selection".

If the selection is final (S159: YES), the process proceeds to S160. On the contrary, if the selection is not final (S159: NO), the process returns to S154 to repeat the steps.

In S160, a winning screen display is displayed on the lower liquid crystal display 4. To describe the winning screen display here, a winning screen is the "screen displayed when the player has won all the three kinds of bonus in the bonus game." Accordingly, in the winning screen display (S160), as the winning screen, a display indicative of "celebration for winning all the three kinds of bonus", such as "Congratulations!!", is performed on the bonus game screen (see FIG. 10B).

A payout process is performed in S161 to which the process proceeds after the winning screen display (S160) or after the losing screen display (S158). Coins won during the current round of the bonus game are paid out in the payout process (S161). The sum of bonuses (a number of coins) won, which has been stored into the RAM 52 in the selected effect process (S155), is read, and the number of coins read is paid out. After the payout process (S161) ends, the bonus game processing program is terminated, and the process then moves to the IC chip data update process (S106) of the main processing program.

As described in detail above, from the IC chip 101 located in a toy figure 100 on the mounting platform 20, the slot machine 500 of the second embodiment reads, via the IC reader/writer 21, IC chip data including data indicative of the kind of the toy figure 100, and then stores the read IC chip data into the RAM 52. And, by referring to the IC chip data and the lottery table change table, a lottery table to be used in a lottery of the base game on the slot machine 500 is chosen based on the reference result. Accordingly, it follows that the lottery table varies according to the kind of the toy figure 100 which the player sets on the mounting platform 20. Therefore, a game can be played in a variety of modes through the selection and use of a toy figure 100, which can thus provide the player with fresh excitement.

The IC chip data to be stored in the IC chip 101 provided in the toy figure 100 includes data on the frequency of usage of using the toy figure 100 on the slot machine 500. And, the IC chip data is read by the IC reader/writer 21, and by referring to the IC chip data and the lottery table change table, the lottery table to be used in a lottery of the base game on the slot machine 500 is chosen based on the reference result.

The makes it possible, when a toy figure 100 is continuously used, to play in a different mode from that used at the start of using the toy figure 100 and thus to provide the player with fresh entertainment.

In the slot machine 500 of the second embodiment, an accessory 103 can be attached to a toy figure 100 set on the mounting platform 20. An IC chip 104 is provided in the accessory 103, in which is stored accessory data indicative of the kind of the accessory 103.

The toy figure 100 having the accessory attached thereto is set on the mounting platform 20, whereby the IC reader/writer 21 reads and stores the accessory data of the IC chip 104 as well as the IC chip data into the RAM 52. And, by referring to the IC chip data, the accessory data, and the lottery table change table, a lottery table to be used in a lottery of the base game on the slot machine 500 is chosen based on the reference result. Accordingly, the selection of an accessory, in addition to the conditions determined based on the IC chip data on the toy figure 100, makes it possible to play in a variety of modes. The can provide the player with fresh entertainment such as the "selection of an accessory 103" in addition to the entertainment provided by the toy figure 100.

The slot machine 500 as described above as the second embodiment may be modified in various ways without departing from the scope of the present invention.

For example, in the second embodiment, the kind of a toy figure 100 has been described illustrating as an example the three kinds “WARRIOR”, “WIZARD”, and “ARCHER”, but is not limited thereto. Toy figures created along another theme may be used, or a larger number of toy figures 100 may be usable on the slot machine 500.

In the second embodiment, the IC chip data stored in the IC chip 101 includes the type and frequency of usage of the toy figure 100, but is not limited thereto. That is, more detailed data such as “sex”, “race”, and “age” can also be used as data indicative of the type.

The configuration may be such that the lottery table is changed, not based on the frequency of usage of the toy figure 100, but based on the total playing time on the slot machine 500 using the toy figure 100.

And, in the second embodiment, the configuration is such that the effect lottery table is changed at two stages: less than 101 times and 101 times or more in the frequency of usage of the toy figure 100, but is not limited thereto. The configuration may be such as to change the effect lottery table at a greater number of stages based on the frequency of usage of the toy figure 100.

In the second embodiment, an accessory 103 attached to a hand of a toy figure 100 has been illustrated as an example, but the configuration is not limited thereto. For example, the accessory 103 may include an accessory 103 to be attached to the head of the toy figure 100 or an accessory 103 to be attached to the body of the toy figure 100.

Figure 43:
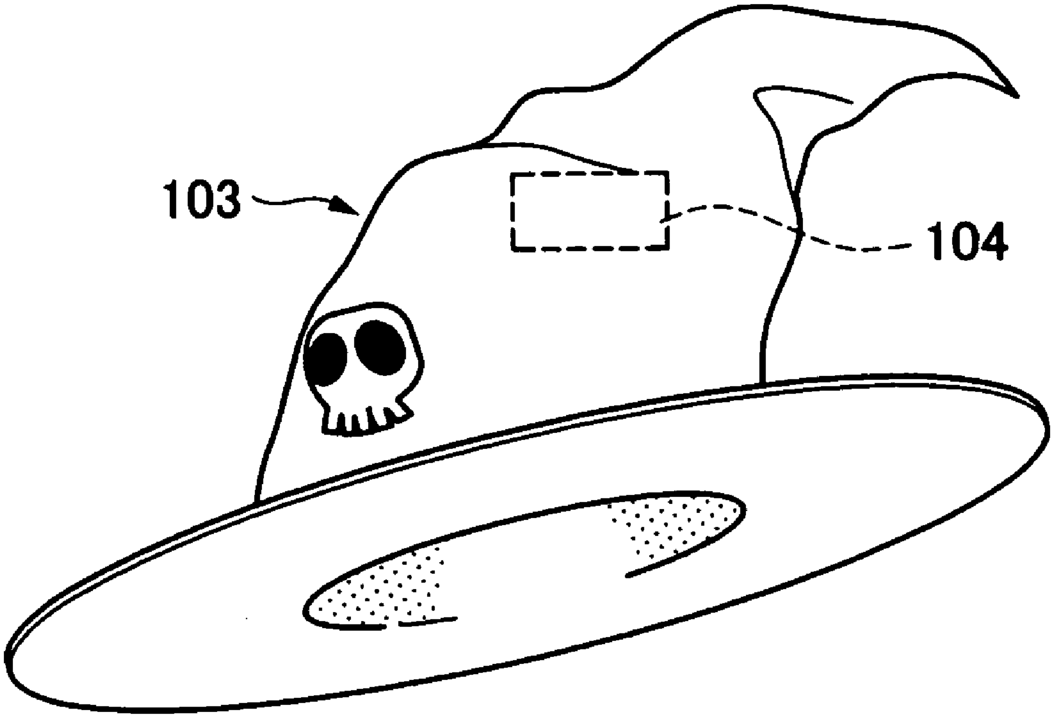
FIG. 43 is an illustration showing an example of an accessory with which the head of a toy figure can be accessorized.

For example, as shown in FIG. 43, a hat accessory representing a cursed hat can also be used as the accessory 103 to be attached to the head of a toy figure 100. An IC chip 104 is provided in the hat toy figure, and data indicative of “cursed hat” is stored in the IC chip 104 as accessory data.

In the above described embodiments, the lower liquid crystal display 4, the LCD drive circuit 75 that drives the liquid crystal display 4, the reels R, the motors 68 that rotates the reels R, and the motor drive circuit 67 that drives the motors 68, serve as a display unit that displays the effects and the options related to the game and variably displays the symbols.

The slot machines 1 and 500 according to the embodiments are described to be provided with mechanical reels configured by the reels R, the motors 68 that rotates the reels R, and the motor drive circuit 67 that drives the motors 68. However, a gaming machine to which the present invention is applied may be provided with a display unit including an image display device such as a liquid crystal display panel, and configured that an image of video reels are variably displayed on the image display device.

In the above description, the two embodiments are described of slot machines that provides a slot game to the player. However, the present invention may be applied to any types of gaming machines that provide games other than the slot game. One example of such gaming machines to which the present invention may be applied is a gaming machine that provides a game of video poker to the player.

In the above description, there are described in detail of two independent embodiments of the first and the second embodiments to which the present invention is applied. However, one skilled in the art may arbitrary combine the subject matters included in the two embodiments to thereby provide a gaming machine having the advantages described above with respect to the two embodiments.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable those skilled in the art to utilize the invention in various embodiments and with various modifications as are suited to the particular use contemplated. It is intended that the scope of the invention be defined by the claims appended hereto, and their equivalents.

What is claimed is:

1. A gaming machine comprising:

an information reading unit that reads object information from a reading object provided with a storage medium in which the object information is stored, the reading object being mountable on the gaming machine;

a game processing unit that performs game processing to provide to a player a game in a plurality of game states including a base game state and a bonus game state in which a greater advantage is provided to the player than in the base game state; and a display unit that displays an effect related to the game, wherein the game processing unit controls a frequency of occurrence of the effect to be displayed on the display unit during the game based on the object information read from the reading object by the information reading unit, the game processing unit determines an advantage provided to the player in the bonus game state, based on the object information read from the reading object by the information reading unit, the reading object is a three-dimensional figure, and the figure is configured to be capable of attaching thereto a subsidiary figure having a subsidiary storage medium in which a subsidiary object information is stored, wherein the information reading unit reads the object information stored in the storage medium of the figure and reads the subsidiary object information stored in the subsidiary storage medium of the subsidiary figure, and wherein the game processing unit determines the advantage provided to the player in the bonus game state, based on the identification information and the subsidiary object information.

2. The gaming machine according to claim 1, wherein the object information includes identification information that indicates kind of the reading object, and wherein the game processing unit controls the frequency of occurrence of the effect based on the identification information.

3. The gaming machine according to claim 1, wherein the object information includes history information that indicates a history of usage of the reading object, and wherein the game processing unit controls the frequency of occurrence of the effect based on the history information.

4. The gaming machine according to claim 3, wherein the history information indicates a number of times the reading object is used for playing the game.

5. The gaming machine according to claim 1 wherein the game processing unit controls the frequency of occurrence of the effect in the base game state and controls the frequency of occurrence of the effect in the bonus game state.

6. The gaming machine according to claim 1, wherein the information reading unit reads the object information from the reading object without contacting the reading object.

7. The gaming machine according to claim 1, wherein the information reading unit writes an updated object information into the storage medium provided in the reading object.

8. The gaming machine according to claim 7, wherein the information reading unit writes the updated object information into the storage medium without contacting the reading object.

9. The gaming machine according to claim 1, wherein the display unit variably displays a plurality of symbols arranged on a plurality of reels.

10. The gaming machine according to claim 9, wherein the display unit is provided with a plurality of mechanical reels as the plurality of reels.

11. The gaming machine according to claim 1, wherein the display unit displays a plurality of options related to the game, wherein the gaming machine further comprises a selection unit that allows the player to select one of the plurality of options displayed on the display unit, and wherein the game processing unit determines the plurality of options to be displayed on the display unit during the game is performed in the bonus gaming state, based on the object information read from the reading object by the information reading unit.

12. The gaming machine according to claim 11, wherein the object information includes identification information that indicates kind of the reading object, and wherein the game processing unit determines the plurality of options to be displayed on the display unit based on the identification information.

13. The gaming machine according to claim 12, wherein the game processing unit determines the plurality of options to be displayed on the display unit, the plurality of options having a close relationship to the identification information.

14. The gaming machine according to claim 1, wherein the game processing unit controls the display unit to display the effect corresponding to the reading object mounted on the gaming machine, based on the object information read from the reading object by the information reading unit.

15. The gaming machine according to claim 14, wherein the object information includes identification information that indicates kind of the reading object, and wherein the game processing unit controls the display unit to display the effect based on the identification information.

16. The gaming machine according to claim 15, wherein the game processing unit controls the display unit to display the effect that is related to an appearance of the reading object.

17. The gaming machine according to claim 14, wherein the object information includes history information that indicates a history of usage of the reading object, and wherein the game processing unit controls the display unit to display the effect based on the history information.

18. The gaming machine according to claim 1, wherein the object information includes identification information that indicates kind of the reading object, and wherein the game processing unit determines the advantage provided to the player in the bonus game state, based on the identification information.

* * * * *